(12) United States Patent
Kim

(10) Patent No.: US 12,519,933 B2
(45) Date of Patent: *Jan. 6, 2026

(54) IMAGE ENCODING/DECODING METHOD AND DEVICE

(71) Applicant: B1 INSTITUTE OF IMAGE TECHNOLOGY, INC., Seoul (KR)

(72) Inventor: Ki Baek Kim, Seoul (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,749

(22) Filed: Jul. 22, 2024

(65) Prior Publication Data

US 2024/0380881 A1 Nov. 14, 2024

Related U.S. Application Data

(60) Continuation of application No. 18/437,885, filed on Feb. 9, 2024, now Pat. No. 12,452,408, which is a
(Continued)

(30) Foreign Application Priority Data

Mar. 25, 2018 (KR) .................. 10-2018-0034174
Mar. 27, 2018 (KR) .................. 10-2018-0034882
Jul. 24, 2018 (KR) .................. 10-2018-0085679

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/176* (2014.11); *H04N 19/186* (2014.11); *H04N 19/30* (2014.11)

(58) Field of Classification Search
CPC ..................................................... H04N 19/00
See application file for complete search history.

(56) References Cited

U.S. PATENT DOCUMENTS 11,956,425 B2 4/2024 Kim
2011/0032987 A1 2/2011 Lee et al.
(Continued)

FOREIGN PATENT DOCUMENTS

CN 103460700 A 12/2013
CN 107079166 A 8/2017
(Continued)

OTHER PUBLICATIONS

Zhang, Xiang, et al. "A Joint Compression Scheme of Video Feature Descriptors and Visual Content." IEEE Transactions on Image Processing 26.2 (2016): 633-647.
(Continued)

*Primary Examiner* — Maryam A Nasri

(57) ABSTRACT

An image prediction method according to the present invention may comprise: identifying a reference pixel region designated for obtaining correlation information; determining a reference pixel processing configuration on the basis of determination of the availability of the reference pixel region; and performing intra prediction according to the determined reference pixel processing. As described above, performing intra prediction on the basis of the availability of a reference pixel according to the present invention can improve encoding performance.

8 Claims, 21 Drawing Sheets

Related U.S. Application Data continuation of application No. 18/366,399, filed on Aug. 7, 2023, now Pat. No. 11,956,425, which is a continuation of application No. 17/874,536, filed on Jul. 27, 2022, now Pat. No. 12,341,949, which is a division of application No. 16/980,680, filed as application No. PCT/KR2019/003443 on Mar. 25, 2019, now Pat. No. 11,438,577.

(51) Int. Cl.
  *H04N 19/176*  (2014.01)
  *H04N 19/186*  (2014.01)
  *H04N 19/30*   (2014.01)

(56) References Cited

U.S. PATENT DOCUMENTS

| | | |
|---|---|---|
| 2014/0105276 A1 | 4/2014 | Nakamura et al. |
| 2015/0063457 A1 | 3/2015 | Gamei et al. |
| 2015/0382009 A1 | 12/2015 | Chen et al. |
| 2016/0182913 A1 | 6/2016 | Joshi et al. |
| 2016/0241861 A1 | 8/2016 | Choe et al. |
| 2017/0332095 A1 | 11/2017 | Zou et al. |
| 2017/0366818 A1 | 12/2017 | Zhang et al. |
| 2018/0063527 A1* | 3/2018 | Chen ................. H04N 19/82 |
| 2018/0077426 A1 | 3/2018 | Zhang et al. |
| 2019/0028731 A1 | 1/2019 | Chuang et al. |
| 2019/0356909 A1 | 11/2019 | Lainema |
| 2020/0177911 A1* | 6/2020 | Aono ................. H04N 19/563 |
| 2021/0329282 A1 | 10/2021 | Lee |

FOREIGN PATENT DOCUMENTS

| | | |
|---|---|---|
| JP | 2013-34163 A | 2/2013 |
| JP | 2013-141187 A | 7/2013 |
| JP | 2023120392 A | 8/2023 |
| KR | 10-1566290 B1 | 11/2015 |
| KR | 10-2016-0045243 A | 4/2016 |
| KR | 10-1633459 B1 | 6/2016 |
| KR | 10-1768173 B1 | 8/2017 |
| RU | 2501161 C2 | 7/2013 |
| RU | 2 491 758 C2 | 8/2013 |
| RU | 2574831 C2 | 2/2016 |
| RU | 2639679 C2 | 12/2017 |
| WO | 2009074089 A1 | 6/2009 |
| WO | 2012165039 A1 | 12/2012 |
| WO | WO 2015/004884 A1 | 1/2015 |
| WO | 2016066028 A1 | 5/2016 |
| WO | 2016100859 A1 | 6/2016 |
| WO | WO 2016/140090 A1 | 9/2016 |
| WO | 2017018664 A1 | 2/2017 |
| WO | 2015005418 A1 | 3/2017 |
| WO | 2017036045 A1 | 3/2017 |
| WO | 2017118411 A1 | 7/2017 |
| WO | WO 2017/118409 A1 | 7/2017 |
| WO | WO 2017/130696 A1 | 8/2017 |
| WO | 2017148345 A1 | 9/2017 |
| WO | 2017165391 A1 | 9/2017 |
| WO | 2017/200771 A1 | 11/2017 |
| WO | 2018012808 A1 | 1/2018 |
| WO | 2018053293 A1 | 3/2018 |

OTHER PUBLICATIONS

Bross, B., et al. "High efficiency video coding (HEVC) text specification draft 8." JCTVC-J1003_d0, 10th Meeting: Stockholm, SE, Jul. 11-20, 2012, (10 pages in English).
Guo, Mei, et al. "Intra Chroma LM Mode with Reduced Line Buffer." Joint Collaborative Team on Video Coding (JCT-VC) of ITU-T SG16 WP3 and ISO/IEC JTC1/SC29/WG11, 6th Meeting: Torino, Italy. vol. 5, Jul. 2011. (5 pages in English and 1 page in Chinese).
International Search Report issued on Jul. 2, 2019 corresponds in International Patent Application No. PCT/KR2019/003443 (2 pages in English and 2 pages in Korean).
Korean Office Action issued on May 8, 2020 corresponds in Korean Patent Application No. 10-2019-0033765 (8 pages in Korean).
Korean Office Action issued on Dec. 18, 2020 corresponds in Korean Patent Application No. 10-2019-0033765 (4 pages in Korean).
Li, Jiahao et al., "Multiple line-based intra prediction", *Joint Video Exploration Team (JVET) of ITU-T SG 16 WP 3 and ISO/IEC JTC 1/SC 29/WG 11*, 3rd Meeting: Geneva, Switzerland, May 26-Jun. 1, 2016. (pp. 1-6).
Rosewarne, C. et al., "High Efficiency Video Coding (HEVC) Test Model 16 (HM 16) Improved Encoder Description Update 7", Joint Collaborative Team on Video Coding (JCT-VC) of ITU-T SG16 WP3 and ISO/IEC JTC1/SC29/WG11, 25th Meeting: Chengdu, People's Republic of China, Oct. 14-21, 2016. (pp. 1-70).
Russian Office Action issued on Dec. 28, 2020 corresponds in Russian Patent Application No. 2020134634 (7 pages in English and 12 pages in Russian).
Seregin, Vadim et al., "Neighbor based intra most probable modes list derivation", Joint Video Exploration Team (JVET) of ITU-T SG 16 WP 3 and ISO/IEC JTC 1/SC 29/WG 11, 3rd Meeting: Geneva, CH, May 26-Jun. 1, 2016. (pp. 1-4).
Suzuki, Teruhiko et al., "Description of SDR and HDR video coding technology proposal by Sony", Joint Video Experts Team (JVET) of ITU-T SG 16 WP 3 and ISO/IEC JTC 1/SC 29/WG 11, 10th Meeting: San Diego, US, Apr. 10-20, 2018. (pp. 1-76).
Van der Auwera et al., "Description of Core Experiment 3: Intra Prediction and Mode Coding", Joint Video Experts Team (JVET) of ITU-T SG 16 WP 3 and ISO/IEC JTC 1/SC 29/WG 11, 10th Meeting: San Diego, USA, Apr. 10-20, 2018. (pp. 1-49).
Zhang, Kai et al., "Enhanced Cross-component Linear Model Intra-prediction", *Joint Video Exploration Team (JVET) of ITU-T SG 16 WP 3 and ISO/IEC JTC 1/SC 29/WG 11*, 4th Meeting: Chengdu, People's Republic of China, Oct. 15-21, 2016. (pp. 1-6).
Zhang, Kai, et al. "Multi-Model Based Cross-Component Linear Model Chroma Intra-Prediction for Video Coding." 2017 IEEE Visual Communications and Image Processing (VCIP) 2017. (4 pages in English).
Zhang, Li et al., "Multiple Direct Modes for chroma intra coding", *Joint Video Exploration Team (JVET) of ITU-T SG 16 WP 3 and ISO/IEC JTC 1/SC 29/WG 11*, 4th Meeting: Chengdu, People's Republic of China, Oct. 15-21, 2016. (pp. 1-4).
Zhang, Tao, et al. "Improving Chroma Intra Prediction for HEVC." 2016 IEEE International Conference on Multimedia & Expo Workshops (ICMEW) Sep. 9, 2021. (6 pages in English).
Zhang, Xingyu, et al. "New Chroma Intra Prediction Modes Based on Linear Model for HEVC." 2012 19th IEEE International Conference on Image Processing, 2012. (4 pages in English).
"Control-Point Representation and Differential Coding Affine-Motion Compensation," Han Huang, et al., IEEE Transactions on Circuits and Systems for Video Technology, vol. 23, No. 10, Oct. 2013, pp. 1651-1660.
Jianle Chen, et al., "Algorithm Description of Joint Exploration Test Model 6 (JEM 6)," Joint Video Exploration Team (JVET) of ITU-T SG 16 WP 3 and ISO/IEC JTC 1/SC 29/WVG 11, 6th Meeting: Hobart, AU, Mar. 31-Apr. 7, 2017.
Han Huang, et al., "Control-Point Representation and Differential Coding Affine-Motion Compensation," IEEE Transactions on Circuits and Systems for Video Technology, vol. 23, No. 10, Oct. 2013.
Li Li, et al, "An Efficient Four-Parameter Affine Motion Model for Video Coding," IEEE Transactions on Circuits and Systems for Video Technology, vol. 28, Issue: 8, Aug. 2018, pp. 1934-1948.
Zhang, et al. "Multi-model Based Cross-component Linear Model Chroma Intra-prediction for Video Coding," 2017 IEEE Visual Communications and Image Processing (VCIP), St. Petersburg, FL, USA, 2017, pp. 1-4.
Zhang, et al. "New Chroma Intra Prediction Modes Based on Linear Model for HEVC," 2012 19th IEEE International Conference on Image Processing, Orlando, FL, USA, 2012, pp. 197-200.
Kei Kawamura, et al. "Non-RCE1: Chroma intra prediction with mode-dependent reduced reference," Joint Collaborative Team on

(56) References Cited

OTHER PUBLICATIONS

Video Coding (JCT-VC) of ITU-T SG 16 WP 3 and ISO/IEC JTC 1/SC 29/WG 11, 14th Meeting: Vienna, AT, Jul. 25-Aug. 2, 2013, JCTVC-N0368_r1.
Jianle Chen, et al. "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting: Hobart, AU, 31 Mar.-Apr. 7, 2017, JVET-F1001-v3.
Han Huang, et al. "Control-Point Representation and Differential Coding Affine-Motion Compensation," IEEE Transactions On Circuits and Systems for Video Technology, vol. 23, No. 10, Oct. 2013, pp. 1651-1660.

\* cited by examiner

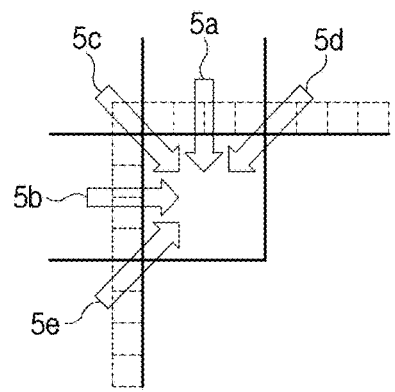
FIG. 5A
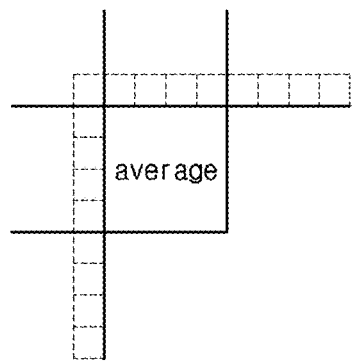
FIG. 5B
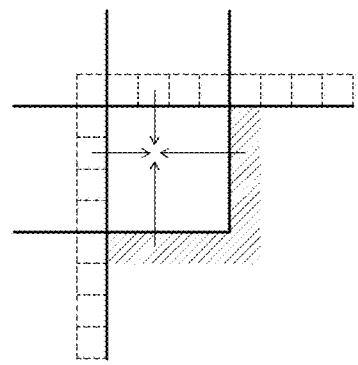
FIG. 5C
FIG. 6
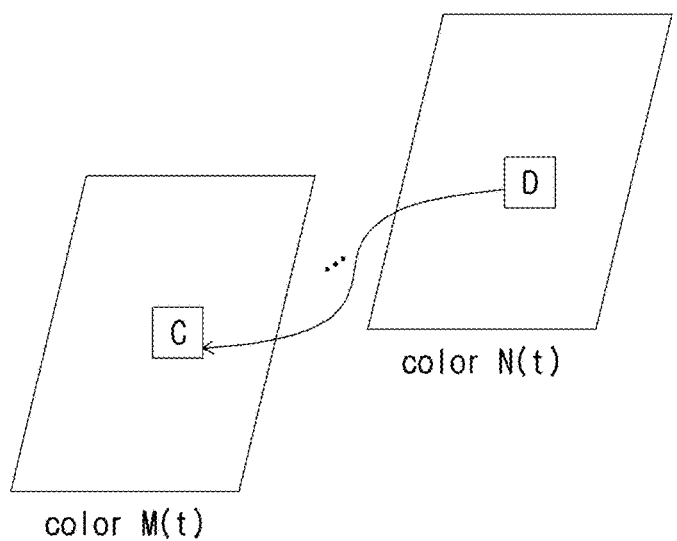

FIG. 10

|  | Ref_T |  |
|---|---|---|
| TL | T0 T1 T2 T3 | R0 R1 R2 R3 |

Ref_TL ... Ref_TR

Ref_L:
| L0 | a | b | c | d |
| L1 | e | f | g | h |
| L2 | i | j | k | l |
| L3 | m | n | o | p | current block

Ref_BL: B0, B1, B2, B3

Ref_C:
| aa | bb | cc | dd |
| ee | ff | gg | hh |
| ii | jj | kk | ll |
| mm | nn | oo | pp |

IMAGE ENCODING/DECODING METHOD AND DEVICE

CROSS REFERENCE TO RELATED APPLICATIONS

This application is a continuation of application Ser. No. 18/437,885 filed on Feb. 9, 2024, which is a continuation of application Ser. No. 18/366,399 filed on Aug. 7, 2023, which is now U.S. Pat. No. 11,956,425, which is a continuation of application Ser. No. 17/874,536 filed on Jul. 27, 2022, which is a division of application Ser. No. 16/980,680 filed on Sep. 14, 2020, which is now U.S. Pat. No. 11,438,577, which is a U.S. National Stage Application of International Application No. PCT/KR2019/003443, filed on Mar. 25, 2019, which claims the benefit under 35 USC 119(a) and 365(b) of Korean Patent Application No. 10-2018-0034174, filed on Mar. 25, 2018, Korean Patent Application No. 10-2018-0034882, filed on Mar. 27, 2018 and Korean Patent Application No. 10-2018-0085679, filed on Jul. 24, 2018 in the Korean Intellectual Property Office, the entire disclosure of which is incorporated herein by reference for all purposes.

TECHNICAL FIELD

The present invention relates to a video encoding/decoding method and apparatus.

BACKGROUND ART

Recently, demand for high-resolution and high-quality images such as high definition (HD) images and ultra high definition (UHD) images is increasing in various application fields, and accordingly, high-efficiency image compression techniques are being discussed.

Various technologies exist, such as the inter prediction technology that predicts pixel values included in a current picture from a picture before or after a current picture using video compression technology, the intra prediction technology that predicts pixel values included in a current picture by using pixel information in a current picture, an entropy encoding technology that allocates a short code to a value with a high frequency of appearance and a long code to a value with a low frequency of appearance. Image data can be effectively compressed by using such image compression technology, and transmitted or stored.

DISCLOSURE

Technical Problem

An object of the present invention for solving the above problems is to provide an image encoding/decoding method and apparatus for performing intra prediction based on an availability of a reference pixel.

An object of the present invention is to provide an inter prediction method and apparatus.

An object of the present invention is to provide a method and apparatus for motion compensation in units of sub-blocks.

An object of the present invention is to provide a method and an apparatus for determining an affine candidate.

Technical Solution

In order to achieve the above object, a method of performing intra prediction according to an embodiment of the present invention may include the steps of checking a reference pixel region designated for obtaining correlation information, determining a reference pixel processing setting based on the determination of availability of the reference pixel region, and performing intra prediction according to the determined reference pixel processing setting.

An image encoding/decoding method and apparatus according to the present invention may generate a candidate list for predicting motion information of a current block, derive a control point vector of the current block based on the candidate list and a candidate index, derive a motion vector of the current block based on the control point vector of the current block, and perform inter prediction on the current block using the motion vector.

In the image encoding/decoding apparatus according to the present invention, the candidate list may include a plurality of affine candidates.

In the image encoding/decoding apparatus according to the present invention, the affine candidate may include at least one of a spatial candidate, a temporal candidate, or a constructed candidate.

In the image encoding/decoding apparatus according to the present invention, the motion vector of the current block may be derived in units of sub-blocks of the current block.

In the image encoding/decoding apparatus according to the present invention, the spatial candidate may be determined based on whether a boundary of the current block is located on a boundary of a coding tree block (CTU boundary).

In the image encoding/decoding apparatus according to the present invention, the constructed candidate may be determined based on a combination of at least two of control point vectors corresponding to corners of the current block.

Advantageous Effects

Coding performance may be improved by using the method of performing intra prediction based on the availability of a reference pixel of the present invention as described above.

According to the present invention, encoding/decoding performance of an image may be improved through inter prediction based on an affine model.

According to the present invention, prediction accuracy may be improved through inter prediction in units of sub-blocks.

According to the present invention, encoding/decoding efficiency of inter prediction can be improved through efficient affine candidate determination.

DESCRIPTION OF DRAWINGS

FIGS. 5A-5C are conceptual diagrams illustrating intra prediction for a directional mode and a non-directional mode according to an embodiment of the present invention.

FIG. 6 is a conceptual diagram illustrating intra prediction regarding a color copy mode according to an embodiment of the present invention.

FIG. 10 is a conceptual diagram illustrating a block adjacent to a target block for intra prediction according to an embodiment of the present invention.

BEST MODE FOR INVENTION

Figure 1:
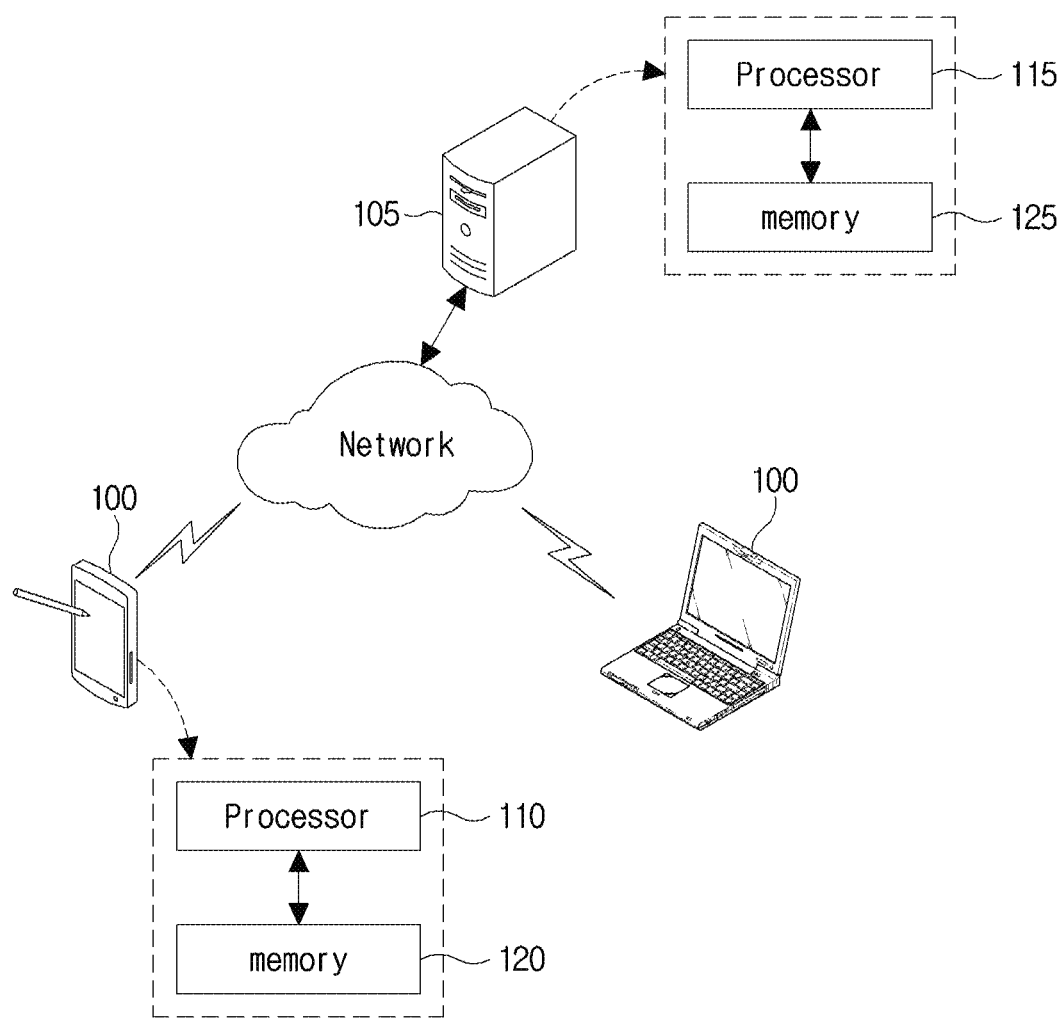
FIG. 1 is a conceptual diagram of an image encoding and decoding system according to an embodiment of the present invention.

An image encoding/decoding method and apparatus according to the present invention may include the steps of checking a reference pixel region designated for obtaining correlation information, determining a reference pixel processing setting based on the determination of availability of the reference pixel region, and performing intra prediction according to the determined reference pixel processing setting.

An image encoding/decoding method and apparatus according to the present invention may generate a candidate list for predicting motion information of a current block, derive a control point vector of the current block based on the candidate list and a candidate index, derive a motion vector of the current block based on the control point vector of the current block, and perform inter prediction on the current block using the motion vector.

In the image encoding/decoding apparatus according to the present invention, the candidate list may include a plurality of affine candidates.

In the image encoding/decoding apparatus according to the present invention, the affine candidate may include at least one of a spatial candidate, a temporal candidate, or a constructed candidate.

In the image encoding/decoding apparatus according to the present invention, the motion vector of the current block may be derived in units of sub-blocks of the current block.

In the image encoding/decoding apparatus according to the present invention, the spatial candidate may be determined based on whether a boundary of the current block is located on a boundary of a coding tree block (CTU boundary).

In the image encoding/decoding apparatus according to the present invention, the constructed candidate may be determined based on a combination of at least two of control point vectors corresponding to corners of the current block.

MODE FOR INVENTION

The present invention can be applied to various changes and can have various embodiments, and specific embodiments will be illustrated in the drawings and described in detail. However, this is not intended to limit the present invention to specific embodiments, and should be understood to include all modifications, equivalents, and substitutes included in the idea and technology scope of the present invention.

Terms such as first, second, A, and B may be used to describe various components, but the components should not be limited by the terms. The terms are used only for the purpose of distinguishing one component from other components. For example, a first component may be referred to as a second component without departing from the scope of the present invention, and similarly, the second component may be referred to as the first component. The term and/or includes a combination of a plurality of related described items or any one of a plurality of related described items.

When an element is said to be "linked" or "connected" to another element, it may be directly linked or connected to other components, but it should be understood that other components may exist in the middle. On the other hand, when a component is said to be "directly linked" or "directly connected" to another component, it should be understood that no other component exists in the middle.

The terms used in the present invention are only used to describe specific embodiments, and are not intended to limit the present invention. Singular expressions include plural expressions unless the context clearly indicates otherwise. In the present invention, terms such as "include" or "have" are intended to indicate that there are features, numbers, steps, operations, components, parts, or combinations thereof described in the specification, and it should be understood that one or more other features or numbers, steps, actions, components, parts, or combinations thereof are not excluded in advance.

Unless otherwise defined, all terms used herein, including technical or scientific terms, mean the same as generally understood by a person skilled in the art to which the present invention pertains. Terms, such as those defined in a commonly used dictionary, should be interpreted as being consistent with meanings in the context of related technologies, and are not to be interpreted as ideal or excessively formal meanings unless explicitly defined in the present invention.

Typically, one or more color spaces may be configured according to a color format of an image. It may be composed of one or more pictures having a certain size or one or more pictures having a different size according to a color format. For example, color formats such as 4:4:4, 4:2:2, 4:2:0, and Monochrome (consisting only of Y) may be supported in the YCbCr color configuration. For example, in the case of YCbCr 4:2:0, it may be composed of one luminance component (Y in this example, Y) and two chrominance components (Cb/Cr in this example). Herein, the composition ratio of the chrominance component and the luminance component may have a horizontal and vertical ratio of 1:2. For example, in the case of 4:4:4, it may have the same aspect ratio horizontally and vertically. When configured as one or more color spaces as in the above example, the picture may be divided into each color space.

Images can be classified into I, P, B, etc. according to the image type (e.g., picture type, slice type, tile type, etc.). Herein, the I image type may mean an image that is self-decoded/decoded without using a reference picture, the P image type may mean an image that is encoded/decoded using a reference picture but only allows forward prediction, and the B image type may mean an image that allows forward/backward prediction by performing encoding/decoding using a reference picture. In addition, depending on encoding/decoding settings, some of the types may be combined (combining P and B) or image types of different configurations may be supported.

FIG. 1 is a conceptual diagram of an image encoding and decoding system according to an embodiment of the present invention.

Referring to FIG. 1, the image encoding apparatus 105 and the decoding apparatus 100 may be a Personal computer (PC), a Notebook Computer, a Personal Digital Assistant (PDA), a Portable Multimedia Player (PMP), a PlayStation Portable (PSP), a Wireless Communication Terminal, a user terminal such as a smart phone or a TV, or a server terminal such as an application server and a service server, and may include a variety of devices having communication devices such as communication modems for communication with various devices or wired and wireless communication, memory (120, 125) for storing various programs and data for inter or intra prediction for encoding or decoding an image, a processor (110, 115) for calculating and controlling through executing a program, or the like.

In addition, an image encoded as a bitstream by the image encoding apparatus 105 may be transmitted to the image decoding apparatus 100 in real-time or non-real-time through the Internet, short-range wireless communication network, wireless LAN network, WiBro network or mobile communication network, or through various communication interfaces such as cable or Universal Serial Bus (USB), and may be decoded, reconstructed as an image, and reproduced in the image decoding apparatus 100. In addition, an image encoded in a bitstream by the image encoding apparatus 105 may be transmitted from the image encoding apparatus 105 to the image decoding apparatus 100 through a computer-readable recording medium.

The above-described image encoding device and image decoding device may be separate devices, but may be made into one image encoding/decoding device depending on implementation. In that case, some components of the image encoding apparatus may be implemented to include at least the same structure or perform at least the same functions as substantially the same technical elements as some components of the image decoding apparatus.

Therefore, in the detailed description of the following technical elements and their operating principle, duplicate description of corresponding technical elements will be omitted. In addition, since the image decoding apparatus corresponds to a computing apparatus that applies an image encoding method performed by the image encoding apparatus to decoding, the following description will focus on the image encoding apparatus.

The computing device may include a memory that stores a program or software module that implements an image encoding method and/or an image decoding method, and a processor that is connected to the memory and performs a program. Herein, the image encoding apparatus may be referred to as an encoder, and the image decoding apparatus may be referred to as a decoder, respectively.

Figure 2:
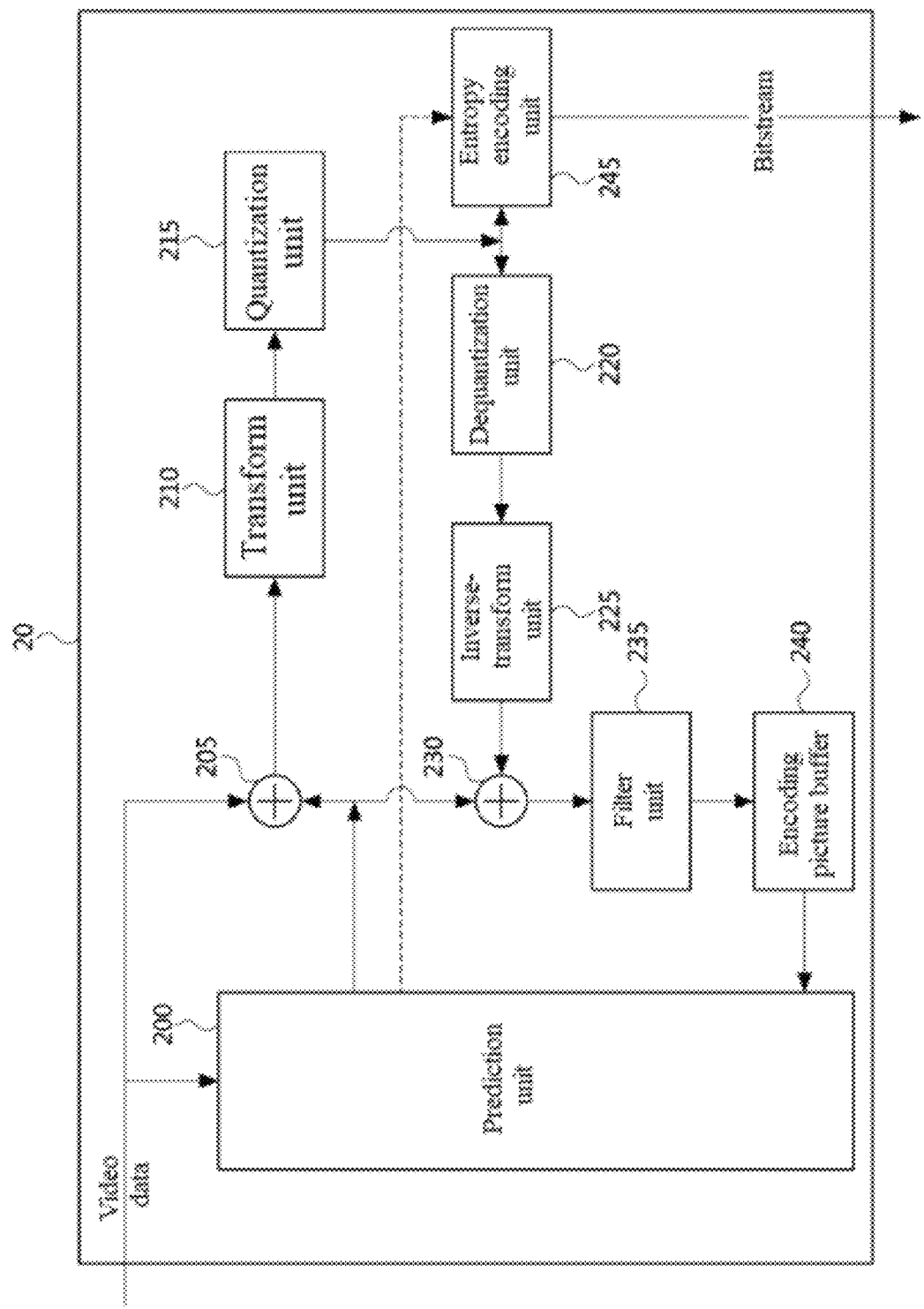
FIG. 2 is a block diagram of an image encoding apparatus according to an embodiment of the present invention.

FIG. 2 is a block diagram of an image encoding apparatus according to an embodiment of the present invention.

Referring to FIG. 2, the image encoding apparatus 20 may include a prediction unit 200, a subtraction unit 205, a transformation unit 210, a quantization unit 215, a dequantization unit 220, and an inverse transformation unit 225, an adder 230, a filter unit 235, an encoded picture buffer 240, and an entropy encoder 245.

The prediction unit 200 may be implemented using a prediction module, which is a software module, and may generate a prediction block by using an intra prediction method or an inter prediction method for blocks to be encoded. The prediction unit 200 may generate a prediction block by predicting a current block to be currently encoded in the image. In other words, the prediction unit 200 may generate a prediction block having a prediction pixel value (predicted pixel value) of each pixel generated by predicting a pixel value of each pixel of the current block to be encoded in an image according to intra or inter prediction. In addition, the prediction unit 200 may transmit information necessary for generating a prediction block, such as information about a prediction mode, such as an intra prediction mode or an inter prediction mode, to the encoding unit, to cause the encoding unit to encode information about the prediction mode. Herein, a processing unit for which prediction is performed, and a processing unit for which the prediction method and specific contents are determined may be determined according to encoding/decoding settings. For example, a prediction method, a prediction mode, and the like are determined in a prediction unit, and prediction may be performed in a transformation unit.

In the inter prediction unit, a translation motion model and a non-translation motion model (affine motion model) may be divided according to a motion prediction method. In the case of the translation motion model, prediction can be performed considering only parallel movement, and in the case of a non-translation movement model, prediction can be performed considering movement such as rotation, perspective, and zoom in/out as well as parallel movement. Assuming unidirectional prediction, one motion vector may be required for the translation motion model, but one or more motion vectors may be required for the non-translation motion model. In the case of the non-translation motion model, each motion vector may be information applied to a preset position of the current block, such as an top left vertex and a top right vertex of the current block, and the position of a region to be predicted of the current block through the corresponding motion vector may be acquired in units of pixels or sub-blocks. In the inter prediction unit, some processes described below may be applied in common and some other processes may be individually applied according to the motion model.

The inter prediction unit may include a reference picture construction unit, a motion estimation unit, a motion compensation unit, a motion information determination unit, and a motion information encoding unit. The reference picture construction unit may include pictures encoded before or after the current picture in reference picture lists L0 and L1. A prediction block may be obtained from the reference picture included in the reference picture list, and a current picture may also be configured as a reference picture according to an encoding setting and included in at least one of the reference picture lists.

In the inter prediction unit, the reference picture construction unit may include a reference picture interpolation unit, and may perform an interpolation process for a decimal pixel unit according to interpolation precision. For example, an 8-tap DCT-based interpolation filter may be applied to a luminance component, and a 4-tap DCT-based interpolation filter may be applied to a chrominance component.

In the inter prediction unit, the motion estimation unit may be a process of searching for a block having a high correlation with a current block through a reference picture, and various methods such as full search-based block matching algorithm (FBMA) and three step search (TSS) may be used. In addition, the motion compensation unit means a process of obtaining a prediction block through a motion estimation process.

In the inter prediction unit, a motion information determination unit may perform a process for selecting optimal motion information of a current block, and the motion information may be encoded by a motion information encoding mode such as Skip Mode, Merge Mode, and Competition Mode. The mode may be configured by combining a supported mode according to a motion model, and a skip mode (translation), a skip mode (other than translation), a merge mode (translation), a merge mode (other than translation), a competition mode (translation), and a competition mode (other than translation) can be an example for it. Depending on an encoding setting, some of the modes may be included in a candidate group.

A motion information encoding mode may obtain a motion information prediction value (motion vector, reference picture, prediction direction, etc.) of a current block from at least one candidate block, and when two or more candidate blocks are supported, optimal candidate selection information can occur. In the skip mode (no residual signal) and the merge mode (there is a residual signal), a prediction value may be used as motion information of the current block, and in the competition mode, difference information between the motion information of the current block and the prediction value may occur.

A candidate group for a motion information prediction value of a current block may be constructed adaptively and variously according to a motion information encoding mode. Motion information of a block (for example, a left, top, top left, top right, bottom left block, etc.) spatially adjacent to the current block may be included in the candidate group, and motion information of a block temporally adjacent to the current block may be included in the candidate group, and mixed motion information of a spatial candidate and a temporal candidate may be included in the candidate group.

The temporally adjacent block may include a block in another image corresponding to the current block, and may mean a block located in a left, right, top, bottom, top left, top right, bottom left, bottom right block, or the like. of the block. The mixed motion information may mean information obtained as an average, a median, etc. through motion information of spatially adjacent blocks and motion information of temporally adjacent blocks.

There may be a priority order for constructing a candidate group of a motion information prediction value. The order included in a configuration of the candidate group of the prediction value may be determined according to the priority order, and the configuration of the candidate group may be completed when the number of candidate groups (determined according to the motion information encoding mode) is filled according to the priority order. Herein, the priority order may be determined in the order of motion information of spatially adjacent blocks, motion information of temporally adjacent blocks, and mixed motion information of spatial candidates and temporal candidates, but other modifications are also possible.

For example, among spatially adjacent blocks, it may be included in a candidate group in the order of left-top-top right-bottom left-top left block, etc., and among the temporally adjacent blocks, it may be included in a candidate group in the order of bottom right-middle-right-bottom block, etc.

The subtraction unit 205 may generate a residual block by subtracting a prediction block from a current block. In other words, the subtraction unit 205 may generate a residual block, which is a residual signal in the form of a block, by calculating a difference between a pixel value of each pixel of the current block to be encoded and a prediction pixel value of each pixel of the prediction block generated through the prediction unit. In addition, the subtraction unit 205 may generate the residual block according to a unit other than a block unit obtained through the block division unit described later.

The transformation unit 210 may convert a signal belonging to a spatial domain into a signal belonging to a frequency domain, and the signal obtained through a transform process is called a transform coefficient (transformed coefficient). For example, a residual block having a residual signal received from the subtraction unit may be transformed to obtain a transform block having a transformed coefficient, and an input signal is determined according to encoding settings, which is not limited to the residual signal.

The transformation unit can transform the residual block using transform techniques such as Hadamard Transform, Discrete Sine Transform (DST Based-Transform), and Discrete Cosine Transform (DCT Based-Transform). However, the present invention may not be limited thereto, and various conversion techniques that improve and modify it may be used.

At least one of the transformation techniques may be supported, and at least one detailed transformation technique may be supported in each transformation technique. In this case, the detailed transformation technique may be a transformation technique in which some of base vectors are configured differently in each transformation technique.

For example, in the case of DCT, one or more detailed transformation techniques of DCT-I to DCT-VIII may be supported, and in the case of DST, one or more detailed transformation techniques of DST-I to DST-VIII may be supported. Some of the detailed transformation techniques may be configured to configure a candidate group for a transformation technique. For example, DCT-II, DCT-VIII, and DST-VII may be configured as the candidate group of the transformation technique to perform transformation.

The transformation can be performed in the horizontal/vertical direction. For example, a pixel value in a spatial domain can be converted into a frequency domain by performing a total two-dimensional transformation which is performing a one-dimensional transformation in the horizontal direction using the transformation technique of DCT-II and a one-dimensional transformation in the vertical direction using the transformation technique of DST-VIII.

Transformation can be performed using one fixed transformation technique, or transformation can be performed by adaptively selecting a transformation technique according to encoding/decoding settings. Herein, in the adaptive case, a transform technique may be selected using an explicit or implicit method. In the explicit case, each transformation technique selection information or transformation technique set selection information applied to the horizontal and vertical directions may occur in a unit such as a block. In the implicit case, an encoding setting may be defined according to an image type (I/P/B), color component, block size, shape, and intra prediction mode, and a predefined transformation technique may be selected accordingly.

In addition, it may be possible that some of the transformations are omitted depending on encoding settings. This means that one or more of the horizontal/vertical units can be omitted, either explicitly or implicitly.

In addition, the transformation unit may transmit information necessary for generating a transform block to the encoding unit to encode it, record the encoded information to a bitstream, and transmit it to a decoder, and a decoding unit of the decoder may parse the transmitted information and use it in the process of an inverse transformation.

The quantization unit 215 may quantize an input signal, and a signal obtained through a quantization process is called a quantized coefficient. For example, a quantization block having a quantized coefficient may be obtained by quantizing a residual block having a residual transformed coefficient received from the transformation unit, and the input signal is determined according to encoding settings, which are not limited to the residual transform coefficient.

The quantization unit may quantize a transformed residual block using a quantization technique such as Dead Zone Uniform Threshold Quantization, Quantization Weighted Matrix, etc., but it may not be limited thereto, and various quantization techniques that improve and modify it may be used.

Depending on encoding settings, a quantization process can be omitted. For example, the quantization process (including its inverse process) may be omitted according to encoding settings (e.g., a quantization parameter is 0. that is, a lossless compression environment). As another example, if compression performance through quantization is not achieved according to characteristics of an image, the quantization process may be omitted. In this case, a region in which the quantization process is omitted among quantization blocks (M×N) may be an entire region or a partial region (M/2×N/2, M×N/2, M/2×N, etc.), and quantization omission selection information may be determined implicitly or explicitly.

The quantization unit may transmit information necessary for generating a quantization block to an encoding unit to encode it, record the encoded information to a bitstream, and transmit it to a decoder, and a decoding unit of the decoder may parse the transmitted information and use it in the process of a dequantization.

Although the above example has been described under the assumption that a residual block is transformed and quantized through the transformation unit and the quantization unit, a residual block having transform coefficients may be generated by transforming a residual signal of the residual block and a quantization process may not be performed. In addition, it is possible not only to perform the quantization process without transforming the residual signal into the transform coefficient, but also not to perform both the transformation and the quantization process. This can be determined according to an encoder setting.

The dequantization unit 220 inversely quantizes a residual block quantized by the quantization unit 215. That is, the dequantization unit 220 inversely quantizes a quantization frequency coefficient sequence to generate a residual block having a frequency coefficient.

The inverse transformation unit 225 inversely transforms a residual block quantized by the dequantization unit 220. That is, the inverse transformation unit 225 inversely transforms the frequency coefficients of the inverse quantized residual block to generate a residual block having a pixel value, that is, a reconstructed residual block. Herein, the inverse transformation unit 225 may perform an inverse transform using the transformation method used by the transformation unit 210 in reverse.

The adder 230 restores a current block by adding the prediction block predicted by the prediction unit 200 and the residual block restored by the inverse transformation unit 225. The reconstructed current block is stored as a reference picture (or reference block) in the encoded picture buffer 240 and may be used as a reference picture when encoding the next block, another block, or another picture in the future.

The filter unit 235 may include one or more post-processing filter processes such as a deblocking filter, sample adaptive offset (SAO), and adaptive loop filter (ALF). The deblocking filter can remove block distortion caused by a boundary between blocks in a reconstructed picture. The ALF may perform filtering based on a value obtained by comparing a reconstructed image after a block is filtered through a deblocking filter with an original image. The SAO may restore an offset difference from an original image in a unit of a pixel for a residual block to which a deblocking filter is applied. These post-processing filters can be applied to the reconstructed picture or block.

The encoded picture buffer 240 may store blocks or pictures reconstructed through the filter unit 235. The reconstructed block or picture stored in the encoded picture buffer 240 may be provided to the prediction unit 200 that performs intra prediction or inter prediction.

The entropy encoding unit 245 scans the generated quantization frequency coefficient sequence according to various scanning methods to generate a quantization coefficient sequence, and outputs it by encoding using an entropy encoding technique, and the like. The scan pattern can be set to one of various patterns such as a zigzag, diagonal, and raster. In addition, it is possible to generate and output encoded data including encoding information transmitted from each component in a bitstream.

Figure 3:
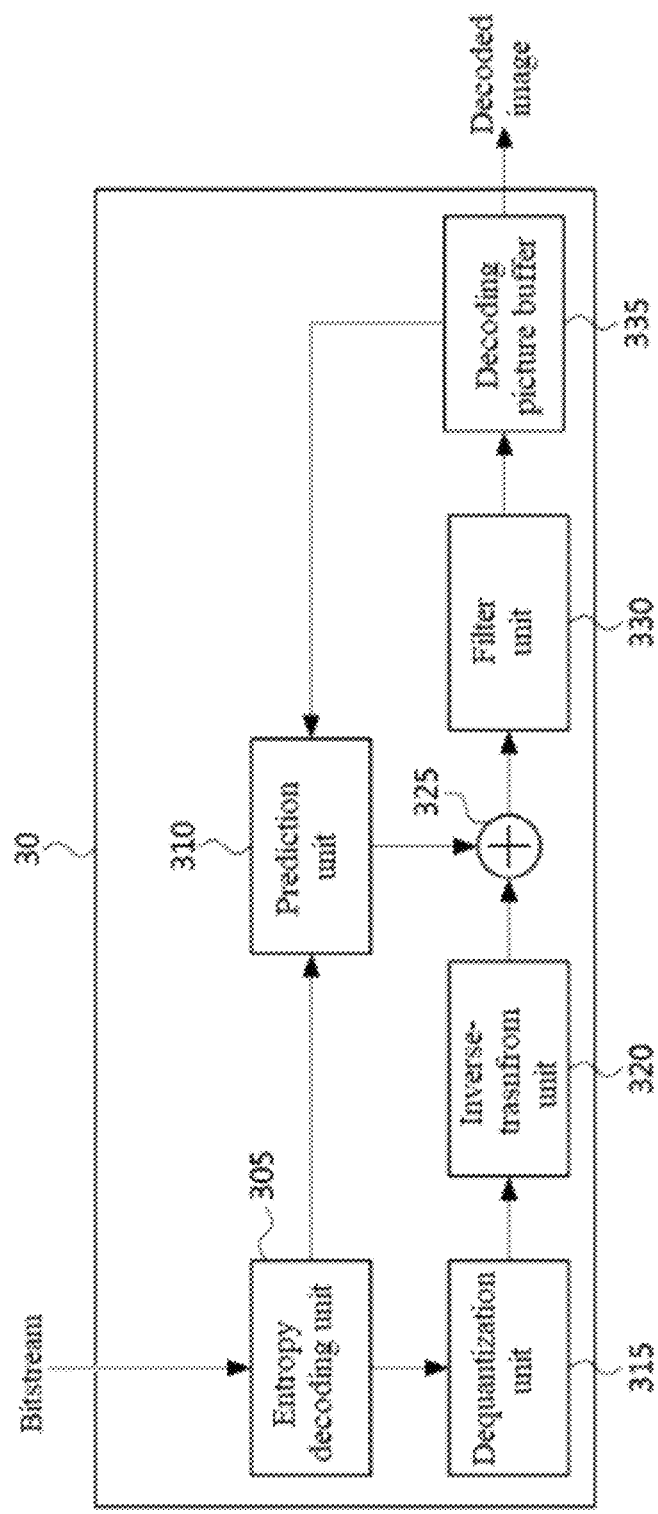
FIG. 3 is a block diagram of an image decoding apparatus according to an embodiment of the present invention.

FIG. 3 is a block diagram of an image decoding apparatus according to an embodiment of the present invention.

Referring to FIG. 3, the image decoding apparatus 30 may be configured to include an entropy decoding unit 305, a prediction unit 310, a dequantization unit 315, an inverse transformation unit 320, an adder/subtractor 325, a filter 330, and a decoded picture buffer 335.

In addition, the prediction unit 310 may include an intra prediction module and an inter prediction module again.

First, when an image bitstream transmitted from the image encoding apparatus 20 is received, it may be delivered to the entropy decoding unit 305.

The entropy decoding unit 305 may decode the bitstream and decode decoding data including quantization coefficients and decoding information transmitted to each component.

The prediction unit 310 may generate a prediction block based on data transmitted from the entropy decoding unit 305. Herein, based on a reference image stored in the decoded picture buffer 335, a reference picture list using a default configuration technique may be constructed.

The inter prediction unit may include a reference picture construction unit, a motion compensation unit, and a motion information decoding unit, and some may perform the same process as the encoder and some may perform the inverse process.

The dequantization unit 315 may inverse quantize quantized transform coefficients provided from a bitstream and encoded by the entropy decoding unit 305.

The inverse transformation unit 320 may generate a residual block by applying inverse DCT, inverse integer transformation, or similar inverse transformation techniques to transform coefficients.

In this case, the dequantization unit 315 and the inverse transformation unit 320 may perform inversely the processes performed by the transformation unit 210 and quantization unit 215 of the image encoding apparatus 20 described above, and may be implemented in various ways. For example, the same process and inverse transformation that are shared with the transformation unit 210 and the quantization unit 215 may be used, and information about the transformation and quantization process (for example, transformation size and transformation shape, quantization type, etc.) from the image encoding apparatus 20 may be used to perform the transformation and quantization processes inversely.

The residual block that has undergone the dequantization and inverse transformation processes may be added to the prediction block derived by the prediction unit 310 to generate a reconstructed image block. The addition may be performed by the adder/subtractor unit 325.

The filter 330 may apply a deblocking filter to remove a blocking phenomenon, if necessary, for a reconstructed image block, and additional loop filters may also be used before and after the decoding process to improve video quality The reconstructed and filtered image blocks may be stored in the decoded picture buffer 335.

Although not shown in the drawing, the picture encoding/decoding device may further include a picture division unit and a block division unit.

The picture division unit may divide (or partition) a picture into at least one processing unit such as a color space (e.g., YCbCr, RGB, XYZ, or the like), tile, slice, or basic coding unit (or maximum coding unit), or the like. The block division unit may divide the basic coding unit into at least one processing unit (e.g., coding, prediction, transformation, quantization, entropy, and in-loop filter units).

The basic coding unit may be obtained by dividing pictures in horizontal and vertical directions at regular intervals. Based on this, partitioning of tiles, slices, or the like may be performed, but it may not be limited thereto. The division unit such as the tile and slice may be composed of an integer multiple of the basic coding block, but an exception may occur in a division unit located at an image boundary. For this, adjustment of the basic coding block size may occur.

For example, a picture may be divided into the division units after being partitioned as a basic coding unit, or a picture may be divided into the basic coding units after being partitioned as the division unit. In the present invention, it is assumed on the assumption that the partitioning and division order of each unit is the former, but may not be limited thereto, and the latter may also be possible depending on encoding/decoding settings. In the latter case, the size of the basic coding unit may be transformed into an adaptive case according to a division unit (tile, etc.). That is, it means that a basic coding block having a different size for each division unit can be supported.

In the present invention, a case in which a picture is partitioned into a basic coding unit is set as a basic setting, and an example described later will be described. The default setting may mean that a picture is not divided into tiles or slices, or a picture is one tile or one slice. However, as described above, when each division unit (tile, slice, etc.) is first partitioned and divided into basic coding units based on the obtained units (i.e., each division unit is not an integer multiple of the basic coding unit, etc.), it should be understood that various embodiments described below may be applied by being the same or changed.

In the case of a slice among the division units, it may be composed of a bundle of at least one consecutive block according to a scan pattern, and in the case of a tile, it may be composed of a bundle of spatially adjacent blocks in a rectangular shape, and it may be configured by the definition of other additional units supported. The slice and the tile may be a division unit supported for the purpose of parallel processing, etc., and for this, the reference between the division units may be limited (that is, cannot be referred).

In case of a slice, information on the start position of consecutive blocks may be generated as division information for each unit. In case of a tile, information on division lines of horizontal and vertical directions or position information (top-left, top-right, bottom-left, bottom-right position) of the tile may be generated.

In this case, a slice and a tile may be divided into a plurality of units according to encoding/decoding settings.

For example, some units <A> may be units including setting information that affects the encoding/decoding process (that is, include tile headers or slice headers), and some units <B> may be units not including setting information. Alternatively, some units <A> may be units that cannot refer to other units in the encoding/decoding process, and some units <B> may be units that can refer to the other units. In addition, some units <A> may have a vertical relationship including other units <B>, or some units <A> may have an equivalent relationship with other units <B>.

Herein, A and B may be a slice and tile (or tiles and slices). Alternatively, A and B may be composed of one of slices and tiles. For example, A may be a slice/tile <type 1> and B may be a slice/tile <type 2>.

Herein, the type 1 and the type 2 may each be one slice or tile. Alternatively, the type 1 (including the type 2) may be a plurality of slices or tiles (a set of slices or a set of tiles), and the type 2 may be a single slice or tile.

As described above, the present invention is described on the assumption that a picture is composed of one slice or tile, but when two or more division units occur, the above description may be applied to and understood in the embodiments described below. In addition, A and B are examples of characteristics that the division unit may have, and examples in which A and B of each example are mixed are also possible.

Meanwhile, it may be divided into blocks of different sizes through the block division unit. Herein, the blocks may be composed of one or more blocks according to a color format (for example, one luminance block and two chrominance blocks, etc.), and the size of the block may be determined according to the color format. Hereinafter, for convenience of description, description will be made based on a block according to one color component (luminance component).

It should be understood that the contents described below are targeted to one color component, but can be applied to other color components in proportion to a ratio (for example, in the case of YCbCr 4:2:0, the ratio of the horizontal length to the vertical length of the luminance component and the chrominance component is 2:1) according to the color format. In addition, although it is possible to perform block division dependent on other color components (for example, depending on a block division result of Y in Cb/Cr), it should be understood that independent block division may be possible for each color component. In addition, although one common block division setting (considering proportion to a length ratio) can be used, it is necessary to consider and understand that individual block division settings are used according to color components.

The block may have a variable size such as M×N (M and N are integers such as 4, 8, 16, 32, 64, and 128), and may be a unit (coding block) for performing encoding. In detail, it may be a unit that is a basis for prediction, transformation, quantization, and entropy encoding, and is generally referred to as a block in the present invention. Herein, the block does not only mean a block of a square, but can be understood as a wide concept including various types of regions such as a triangle and a circle, and the present invention will be mainly described in the case of a square.

The block division unit may be set in relation to each component of an image encoding device and decoding device, and a size and shape of a block may be determined through this process. Herein, the block to be set may be defined differently according to a component, and a prediction block in a prediction unit, a transformation block in a transformation unit, and a quantization block in a quantization unit may correspond to this. However, the present invention may not be limited thereto, and a block unit according to other components may be additionally defined. In the present invention, it is assumed on the assumption that the input and output are blocks (i.e., rectangular) in each component, but in some components, input/output of other shapes (e.g., square, triangle, etc.) may be possible.

A size and shape of the initial (or starting) block of the block division unit may be determined from the higher unit. For example, in the case of a coding block, the basic coding block may be an initial block, and in the case of a prediction block, the coding block may be an initial block. In addition, in the case of a transform block, a coding block or a prediction block may be an initial block, and this may be determined according to encoding/decoding settings.

For example, if an encoding mode is intra, a prediction block may be the higher unit of the transform block, and if the encoding mode is inter, the prediction block may be a unit independent of the transform block. The initial block, which is the starting unit of division, may be divided into small-sized blocks, and if the optimal size and shape according to the division of the block are determined, the block may be determined as the initial block of the lower unit. The initial block, which is the starting unit of division, can be considered as the initial block of the higher unit. Herein, the higher unit may be a coding block, and the lower unit may be a prediction block or a transform block, but is not limited thereto. When the initial block of the lower unit is determined as in the above example, a dividing process for finding the optimal size and shape of the block as the higher unit may be performed.

In summary, the block division unit may divide a basic coding unit (or the maximum coding unit) into at least one coding unit (or lower coding unit). In addition, a coding unit may be divided into at least one prediction unit, and may be divided into at least one transformation unit. A coding unit may be divided into at least one coding block, the coding block may be divided into at least one prediction block, and divided into at least one transform block. A prediction unit may be divided into at least one prediction block, and a transformation unit may be divided into at least one transformation block.

In this case, some blocks may be combined with other blocks to perform one dividing process. For example, when a coding block and a transform block are combined as one unit, a dividing process is performed to obtain the optimal block size and shape, which may be not only the optimal size and shape of the coding block, but also the optimal size and shape of the transform block. Alternatively, a coding block and a transform block may be combined in one unit, a prediction block and a transform block may be combined in one unit, and a coding block, a prediction block, and a transform block may be combined in one unit. In addition, combinations of other blocks may be possible. However, the combination is not applied collectively within an image (picture, slice, tile, etc.), but may be adaptively determined according to detailed conditions in units of blocks (e.g., image type, coding mode, block size/shape, prediction mode information, etc.).

As described above, when the optimal size and shape of a block is found, mode information (for example, division information, etc.) may be generated. The mode information may be stored in a bitstream together with information (for example, prediction-related information, transformation-related information, etc.) generated by a component to which a block belongs and transmitted to a decoder, and may be parsed in a unit of the same level in the decoder and used in an image decoding process.

Hereinafter, a division method will be described, and for convenience of description, it is assumed that an initial block is in the form of a square. However, the initial block may be applied in the same or similar manner even in the form of a rectangle, but is not limited thereto.

Various methods for block division may be supported, but the present invention will focus on tree-based division, and at least one tree division may be supported. In this case, a quad tree (Quad Tree. QT), a binary tree (BT), a ternary tree (TT), and the like may be supported. When one tree method is supported, it can be referred to as a single tree division and when two or more tree methods are supported, it can be referred to as a multiple tree method.

The quad-tree division means that a block is divided into two in the horizontal and vertical direction respectively, the binary tree division means that a block is divided into two in either the horizontal or vertical direction, and the ternary-tree division means that a block is divided into three in either the horizontal or vertical direction.

In the present invention, if a block before division is M×N, it is assumed that the block is divided into four M/2×N/2 in the case of the quad-tree division, the block is divided into M/2×N or M×N/2 in the case of the binary-tree division, and the block is divided into M/4×N/M/2×N/M/4×N or M×N/4/M×N/2/M×N/4 in the case of the ternary-tree division. However, the division result is not limited to the above case, and examples of various modifications may be possible.

Depending on encoding/decoding settings, one or more of tree division methods may be supported. For example, quad tree division can be supported, quad tree division and binary tree division can be supported, quad tree division and ternary tree division can be supported, or quad tree division, binary tree division, and ternary tree division can be supported.

The above example is an example of a case where the basic division method is the quad tree, and binary tree division and ternary tree division are included in additional division modes depending on whether other trees are supported, but various modifications may be possible. Herein, information on whether other trees are supported (bt_enabled_flag, tt_enabled_flag, bt_tt_enabled_flag, etc. it may have a value of 0 or 1, if 0: not supported, and if 1: supported) may be determined implicitly according to encoding/decoding settings, or may be explicitly determined in a unit of a sequence, picture, slice, tile, or the like.

The division information may include information on whether to divide (tree_part_flag. or, qt_part_flag, bt_part_flag, tt_part_flag, bt_tt_part_flag. it may have a value of 0 or 1, and if 0: not divided and if 1: divided). In addition, information on a division direction (dir_part_flag. or, bt_dir_part_flag, tt_dir_part_flag, bt_tt_dir_part_flag. it may have a value of 0 or 1, if 0: <horizontal> and if 1: <vertical>) may be added according to a division method (binary tree, ternary tree), which may be information that can be generated when division is performed.

When multiple tree division is supported, various division information configurations may be possible. The following will be described assuming an example of how division information is configured at one depth level (i.e., recursive division may be possible because the supported division depth is set to one or more, but for convenience of explanation).

As an example (1), information on whether to divide is checked. Herein, if the division is not performed, the division is ended.

If the division is performed, division information for a division type (For example, tree_idx. if 0: QT, if 1: BT, if 2: TT) is checked. In this case, division direction information is additionally checked according to the selected division type, and the process proceeds to the next step (if additional division is possible for reasons such as when the division depth has not reached the maximum value, etc., the division is restarted, and if division is not possible, the division is ended.)

As an example (2), information on whether to divide for some tree methods (QT) is checked, and the process goes to the next step. Herein, if division is not performed, information on whether to divide for some tree methods (BT) is checked. Herein, if division is not performed, information on whether to divide for some tree methods (TT) is checked. Herein, if division is not performed, the division process is ended.

If division of some tree method (QT) is performed, the process goes to the next step. In addition, if division of some tree methods (BT) is performed, division direction information is checked and the process goes to the next step. In addition, if division of some tree methods (TT) is performed, division direction information is checked and the process goes to the next step.

As an example (3), information about whether to divide for some tree methods (QT) is checked. Herein, if division is not performed, information on whether to divide for some tree methods (BT and TT) is checked. Herein, if division is not performed, the division process is ended.

If division of some tree methods (QT) is performed, the process goes to the next step. In addition, if division of some tree methods (BT and TT) is performed, division direction information is checked and the process goes to the next step.

The above example may be a case where the priority of tree division exists (examples 2 and 3) or does not exist (example 1), but examples of various modifications may be possible. In addition, in the above example, the division of the current stage is an example for explaining the case that is not related to a division result of a previous stage, but it may also be possible to set the division of the current stage depending on the division result of the previous stage.

For example, in the case of Examples 1 to 3, if division of some tree methods (QT) is performed in a previous step and the process is passed to a current step, division of the same tree methods (QT) may be supported in the current step.

On the other hand, if division of some tree methods (QT) is not performed in a previous step and division of other tree methods (BT or TT) is performed and the process is passed to a current step, it may also be possible that division of some tree methods (BT and TT), except for division of some tree methods (QT), are supported in subsequent steps including the current step.

In the above case, it means that tree configurations supported for block division may be adaptive, and thus, the above-described division information configurations may also be configured differently. (assuming the example to be described later is the third example) That is, in the above example, if the division of some tree methods (QT) was not performed in the previous step, the division process may be performed without considering some tree methods (QT) in the current stage. In addition, it may be configured by removing division information regarding related tree methods (for example, information about whether to divide, information about a division direction, etc. in this example <QT>, information about whether to divide).

The above example is for adaptive division information configuration for a case where block division is allowed (for example, a block size is within the range between the maximum and minimum values, a division depth of each tree method does not reach the maximum depth <allowed depth>, etc.), and adaptive division information configuration may be possible even when block division is limited (for example, a block size is not in the range between the maximum and minimum values, a division depth of each tree method reaches the maximum depth, etc.).

As already mentioned, tree-based division in the present invention can be performed using a recursive method. For example, when a division flag of a coding block having a division depth k is 0, encoding of the coding block is performed in the coding block having the division depth k, and when the division flag of the coding block having the division depth k is 1, encoding of the coding block is performed in N sub-coding blocks having a division depth of k+1 according to a division method (wherein N is an integer of 2 or more such as 2, 3, 4).

The sub-coding block may be set again as a coding block (k+1) and divided into sub-coding blocks (k+2) through the above process, and such a hierarchical division method may be determined according to division settings such as a division range and a division allowable depth.

Herein, a bitstream structure for representing division information can be selected from one or more scan methods. For example, a bitstream of division information may be configured based on a division depth order, or the bitstream of the division information may be constructed based on whether division is performed.

For example, in the case of a division depth order criterion, it means a method of obtaining division information at a current level depth based on an initial block and obtaining division information at the next level depth. In addition, in the case of a criterion on whether division is performed, it means a method of preferentially acquiring additional division information in a block divided based on an initial block, and other additional scanning methods may be considered. In the present invention, it is assumed that a bitstream of division information is configured based on whether division is performed.

As described above, various cases of block division have been described, and a fixed or adaptive setting for block division may be supported.

Herein, a setting related to block division may explicitly include related information in a unit such as a sequence, a picture, a slice, and a tile. Alternatively, the block division setting may be determined implicitly according to encoding/decoding settings, wherein the encoding/decoding settings may be configured according to one or a combination of two or more of various encoding/decoding elements such as an image type (I/P/B), color component, division type, and division depth.

In an image encoding method according to an embodiment of the present invention, intra prediction may be configured as follows. The intra prediction of the prediction unit may comprise constructing a reference pixel, generating a prediction block, determining a prediction mode, and encoding a prediction mode. In addition, the image encoding apparatus may be configured to comprise a reference pixel configuration unit, a prediction block generation unit, and a prediction mode encoding unit that implement a reference pixel configuration step, a prediction block generation step, a prediction mode determination step, and a prediction mode encoding step. Some of the above-described processes may be omitted or other processes may be added. In addition, it may be changed in an order other than the order described above.

Figure 4:
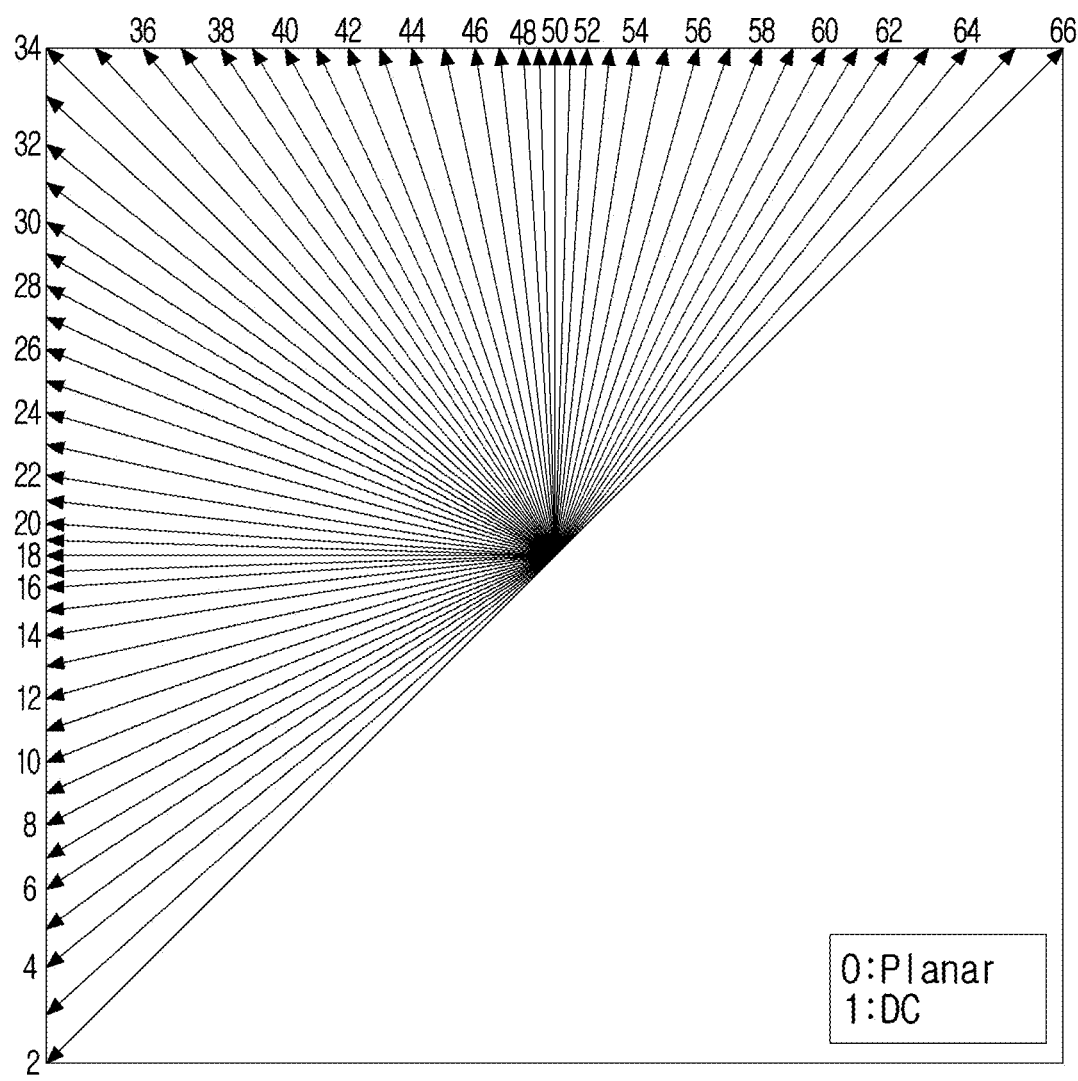
FIG. 4 is an exemplary diagram illustrating an intra prediction mode according to an embodiment of the present invention.

FIG. 4 is an exemplary diagram illustrating an intra prediction mode according to an embodiment of the present invention.

Referring to FIG. 4, it is explained assuming that 67 prediction modes are configured as a prediction mode candidate group for intra prediction and 65 of which are directional modes and 2 of which are non-directional modes (DC, Planar). However, it may not be limited to this, and various configurations may be possible. Herein, the directional mode may be divided into slope (e.g., dy/dx) or angle information (degree). In addition, all or part of the prediction modes may be included in a prediction mode candidate group of a luminance component or a chrominance component, and other additional modes may be included in the prediction mode candidate group.

In the present invention, a direction of a directional mode may mean a straight line, and a curved directional mode may also be configured as a prediction mode. In addition, in the case of a non-directional mode, it may include a DC mode for obtaining a prediction block with the average (or weighted average, etc.) of pixels of adjacent neighboring blocks (for example, left, top, top left, top right, and bottom left blocks) of the current block, and a Planar mode for obtaining a prediction block through linear interpolation of pixels of the neighboring blocks, etc.

Herein, in the DC mode, a reference pixel used for generating the prediction block may be obtained from blocks grouped in various combinations such as left, top, left+top, left+bottom left, top+top right, left+top+bottom left+top right, etc. In addition, a block position at which the reference pixel is obtained may be determined according to encoding/decoding settings defined by an image type, color component, block size/shape/position, and the like.

Herein, in the planar mode, a pixel used for generating a prediction block may be obtained in a region composed of a reference pixel (e.g., left, top, top left, top right, bottom left, or the like.) and a region not composed of a reference pixel (e.g., right, bottom, bottom right, etc.). In the case of a region not composed of a reference pixel (that is, it is not encoded), it can be obtained implicitly by using one or more pixels (for example, copy as it is, weighted average, etc.) in a region composed of a reference pixel, or information on at least one pixel in the region not composed of the reference pixel may be generated explicitly. Therefore, a prediction block may be generated using the region composed of the reference pixel and the region not composed of the reference pixel as described above.

FIGS. 5A-5C are conceptual diagrams illustrating intra prediction for a directional mode and a non-directional mode according to an embodiment of the present invention.

Referring to FIG. 5A, intra prediction according to modes in the vertical (5a), horizontal (5b), and diagonal (5c to 5e) directions is illustrated. Referring to FIG. 5B, intra prediction according to the DC mode is illustrated. Referring to FIG. 5C, intra prediction according to the planar mode is illustrated.

In addition to the above description, an additional non-directional mode may be included. In the present invention, linear directional modes and non-directional modes of a DC mode and a planar mode are mainly described, but a change to other cases may also be applied.

FIG. 4 may be prediction modes that are fixedly supported regardless of a size of a block. In addition, prediction modes supported according to a block size may be different from FIG. 4.

For example, the number of prediction mode candidate groups may be adaptive (e.g., an angle between the prediction modes is equally spaced, but the angle is set differently. the number of the directional modes is 9, 17, 33, 65, 129, etc.), or the number of prediction mode candidate groups may be fixed, but may have different configurations (e.g., directional mode angle, non-directional type, etc.).

In addition, FIG. 4 may be prediction modes that are fixedly supported regardless of a block type. In addition, prediction modes supported according to a block type may be different from FIG. 4.

For example, the number of prediction mode candidate groups may be adaptive (e.g., set the number of prediction modes derived from the horizontal or vertical direction depending on the horizontal/vertical ratio of the block larger or shorter), or the number of prediction mode candidate groups may be fixed, but may have different configurations (e.g., set the prediction modes derived from the horizontal or vertical direction depending on the horizontal/vertical ratio of the block more specifically).

Alternatively, prediction modes of the longer block length may support a larger number, and prediction modes of the shorter block length may support a smaller number. In the case of a long block, a prediction mode interval may support a mode located on the right side of mode 66 (e.g., a mode having an angle of +45 degrees or more based on the 50th mode, that is, a mode having a number such as 67 to 80) or a mode located on the left side of mode 2 (e.g., a mode having an angle of −45 degrees or more based on the 18th mode. that is, a mode having a number such as −1 to −14) in FIG. 4. This may be determined according to the ratio of the horizontal length to the vertical length of the block, and vice versa.

In the present invention, a prediction mode is mainly described as a case where the prediction mode is a fixedly supported prediction mode (regardless of any encoding/decoding element) as shown in FIG. 4, but it may also be possible to set an adaptively supported prediction mode according to encoding settings.

In addition, when classifying prediction modes, horizontal and vertical modes (18 and 50 modes), and some diagonal modes (Diagonal up right <2>, Diagonal down right <34>, Diagonal down left <66>, etc.) can be a standard, and this may be a classification method performed based on some directionality (or angle. 45 degrees, 90 degrees, etc.).

In addition, some modes (2 and 66 modes) located at both ends of the directional mode may be a mode that is the basis for the prediction mode classification, which is an example that is possible when the intra prediction mode is configured as illustrated in FIG. 4. That is, when a prediction mode configuration is adaptive, an example in which the reference mode is changed may also be possible. For example, mode 2 can be replaced by a mode having a number less than or greater than 2 (−2, −1, 3, 4, etc.), or mode 66 can be replaced by a mode having a number less than or greater than 66 (64, 66, 67, 68, etc.).

In addition, an additional prediction mode for color components may be included in a prediction mode candidate group. The following describes a color copy mode and a color mode as examples of the prediction mode.

(Color Copy Mode)

A prediction mode related to a method of obtaining data for generating a prediction block from regions located in different color spaces may be supported.

For example, a prediction mode for a method of acquiring data for generating a prediction block in another color space using a correlation between color spaces may be an example of this.

FIG. 6 is a conceptual diagram illustrating intra prediction regarding a color copy mode according to an embodiment of the present invention. Referring to FIG. 6, the current block C of the current color space M may perform prediction using data of a corresponding region D of a different color space N at the same time t.

In this case, a correlation between color spaces may refer to a correlation between Y and Cb, Y and Cr, and Cb and Cr when YCbCr is taken as an example. That is, in the case of the chrominance component (Cb or Cr), a reconstructed block of the luminance component Y corresponding to the current block can be used as a prediction block of the current block (chrominance vs. luminance is a default setting of an example described later). Alternatively, a reconstructed block of some chrominance component (Cb or Cr) corresponding to the current block of some chrominance component (Cr or Cb) may be used as a prediction block of the current block.

Herein, in some color formats (e.g., YCbCr 4:4:4, etc.), a region corresponding to the current block may have the same absolute position in each image. Alternatively, in some color formats (e.g., YCbCr 4:2:0, etc.), relative positions in each image may be the same. The corresponding position may be determined according to the ratio of the horizontal length to the vertical length according to a color format, and corresponding pixels in a color space different from pixels of the current image may be obtained by multiplying or dividing each component of the coordinates of the current pixel by a ratio of the horizontal length to the vertical length according to a color format For convenience of description, the description will be mainly focused on the case of some color formats (4:4:4), but it should be understood that the location of the corresponding region of other color space can be determined according to the ratio of the horizontal length to the vertical length according to the color format.

In the color copy mode, a reconstructed block of a different color space may be used as a prediction block or a block obtained by considering a correlation between color spaces may be used as a prediction block. The block obtained by considering the correlation between color spaces means a block that can be obtained by performing correction on an existing block. Specifically, in the formula of {P=a*R+b}, a and b mean values used for correction, and R and P mean values obtained in different color spaces and prediction values of the current color space, respectively. Herein, P means a block obtained by considering the correlation between color spaces.

In this example, it is assumed that data obtained by using a correlation between color spaces is used as a prediction value of the current block, but it may also be possible when the data is used as a correction value applied to the prediction value of the existing block. That is, the prediction value of the current block can be corrected using a residual value of a different color space.

In the present invention, it is assumed on the assumption of the former case, but the present invention may not be limited thereto, and the same or changed application to a case that the data is used as a correction value may be applicable.

In the color copy mode, whether to support it explicitly or implicitly may be determined according to encoding/decoding settings. Herein, the encoding/decoding settings may be defined according to one or a combination of two or more of an image type, color component, block position/size/shape, and block width/length ratio. In addition, in an explicit case, related information may be included in a unit of a sequence, picture, slice, or tile. In addition, depending on encoding/decoding settings, whether the color copy mode is supported may be determined implicitly in some cases, and related information may be explicitly generated in some cases.

In the color copy mode, correlation information (a, b, etc.) between color spaces may be explicitly generated or implicitly obtained according to encoding/decoding settings.

In this case, a region to be compared (or referenced) to obtain correlation information may be the current block (C in FIG. 6) and a corresponding region (D in FIG. 6) of a different color space. Alternatively, it may be an adjacent region (left, top, top left, top right, bottom left blocks, etc., of C in FIG. 6) of the current block and an adjacent region (left, top, top left, top right, bottom left blocks, etc., of D in FIG. 6) of a corresponding region of a different color space.

In the above description, in the former case, since correlation information must be obtained directly using data of a block corresponding to the current block, it may correspond to an example of explicitly processing related information. That is, it may be a case in which correlation information should be generated because the data of the current block has not yet been coded. In the latter case, since the correlation information can be obtained indirectly using data of an adjacent region of a block corresponding to an adjacent region of the current block, this may correspond to an example of implicitly processing related information.

In summary, in the former case, correlation information is obtained by comparing the current block and the corresponding block, and in the latter case, correlation information is obtained by comparing regions adjacent to the current block and the corresponding block, respectively. In addition, data obtained by applying correlation information to the corresponding block may be used as a prediction pixel of the current block.

Herein, in the former case, the correlation information can be encoded as it is, or the correlation information obtained by comparing adjacent regions can be used as a predictive value to encode information about the difference. The correlation information may be information that can occur when a color copy mode is selected as a prediction mode.

Herein, the latter case can be understood as an example of an implied case that there is no additionally generated information except that a color copy mode is selected as an optimal mode in the prediction mode candidate group. That is, this may be an example possible under a configuration in which one correlation information is supported.

In a setting in which two or more correlation information is supported, selection information for the correlation information may be required in addition to the color copy mode being selected as the optimal mode. As in the above example, a configuration in which an explicit case and an implicit case are mixed may also be possible according to encoding/decoding settings.

In the present invention, a description will be given focusing on the case where correlation information is obtained indirectly, and the obtained correlation information may be N or more (N is an integer of 1 or more such as 1, 2, 3). Setting information on the number of correlation information may be included in a unit such as a sequence, picture, slice, tile, and the like. It should be understood that in some of the examples described below, when k or more correlation information is supported, it may have the same meaning as when k or more color copy modes are supported.

Figure 7:
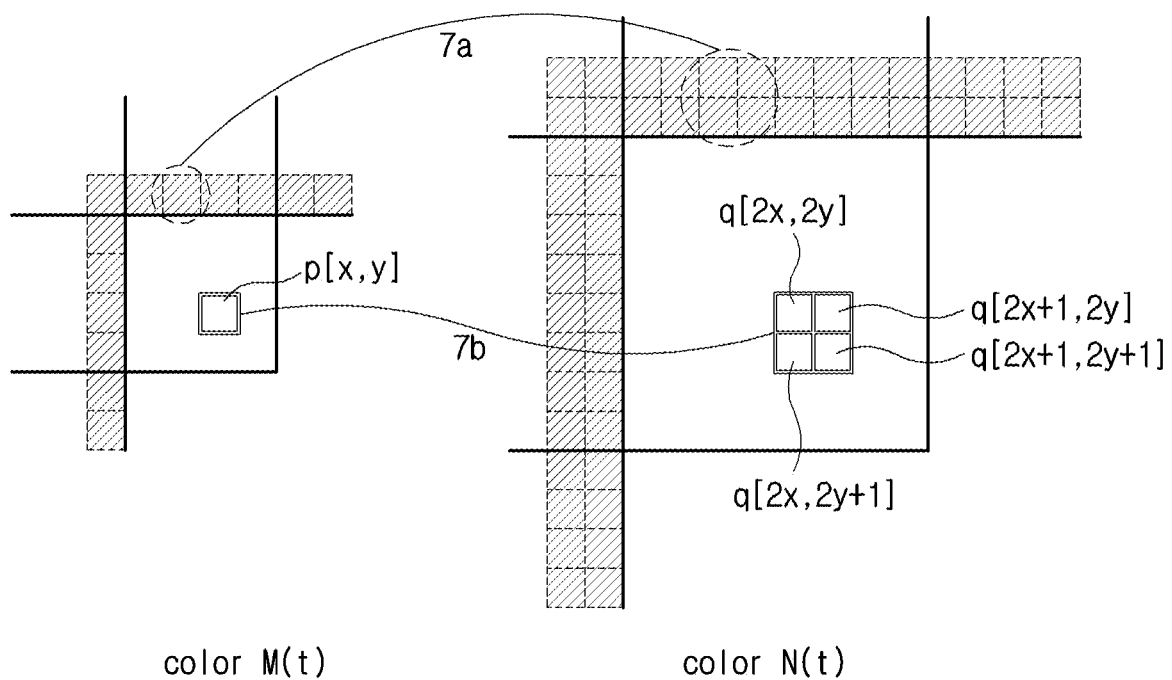
FIG. 7 is an exemplary diagram illustrating a corresponding block of each color space and a region adjacent thereto in relation to a color copy mode according to an embodiment of the present invention.

FIG. 7 is an exemplary diagram illustrating a corresponding block of each color space and a region adjacent thereto in relation to a color copy mode according to an embodiment of the present invention. Referring to FIG. 7, an example of pixel-to-pixel correspondence (p and q) in the current color space (M) and the different color space (N) is shown, and it may be understood as an example where it may occur in some color formats (4:2:0). In addition, the corresponding relationship (7a) for obtaining correlation information and the corresponding relationship (7b) for applying a prediction value can be confirmed.

The following continues the description related to obtaining correlation information in a color copy mode. In order to obtain correlation information, pixel values of pixels in a predetermined region (all or part of regions adjacent to each of the current block and a block corresponding to the current block) of each color space may be compared (or used), (i.e., 1:1 pixel value comparison process is performed). In this case, the pixel value to be compared can be obtained based on a corresponding pixel position in each color space. The pixel value may be a value derived from at least one pixel in each color space.

For example, in some color formats (4:4:4), a pixel value of one pixel in a chrominance space and a pixel value of one pixel in a luminance space may be used as pixel values corresponding to a correlation information acquisition process. Alternatively, in some color formats (4:2:0), a pixel value of one pixel in the chrominance space and a pixel value derived from one or more pixels in the luminance space (that is, obtained through a down-sampling process) may be used as pixel values corresponding to the correlation information acquisition process.

Specifically, in the former case, p [x, y] of a chrominance space can be compared with q [x, y] of a luminance space. In this case, as a pixel value, a brightness value of one pixel may be used as it is. In the latter case, p [x, y] in the chrominance space may be compared with q [2x, 2y], q [2x, 2y+1], q [2x+1, 2y], q [2x+1, 2y+1], etc. in the luminance space.

Herein, since the 1:1 pixel value comparison has to be performed, in the case of the luminance space, one of a plurality of pixels may be used as a value for comparing a pixel value of a chrominance pixel. That is, a brightness value of one pixel among the plurality of pixels is used as it is. Alternatively, one pixel value may be derived from two or more pixels (k, k is an integer of 2 or more, such as 2, 4, 6, etc.) among the plurality of pixels and used as a value to be compared. That is, a weighted average (weights may be equally allocated or non-uniformly allocated to each pixel) may be applied to two or more pixels.

When a plurality of corresponding pixels exist as in the above example, a pixel value of a predetermined pixel or a pixel value derived from two or more pixels may be used as a value to be compared. In this case, one of the two methods for deriving a pixel value to be compared in each color space according to encoding/decoding settings may be used alone or in combination.

The following may be a description on the assumption that a pixel value of one pixel is used for comparison in a current color space, and one or more pixels in other color spaces can be used to derive a pixel value. For example, assume that the color format is YCbCr 4:2:0, the current color space is a chrominance space, and the other color space is a luminance space. The method for deriving the pixel value will be described focusing on different color spaces.

For example, it may be determined according to a shape of a block (ratio of the horizontal length to the vertical length). As a detailed example, p [x, y] of a chrominance space adjacent to the longer side of the current block (or a block to be predicted) may be compared with q [2x, 2y] of a luminance space, and p [x, y] of the chrominance space adjacent to the shorter side can be compared with the average of q [2x, 2y] and q [2x+1, 2y] in the luminance space.

In this case, adaptive settings such as the above may be applied to some block types (rectangular) regardless of a ratio of the horizontal length to the vertical length or may be applied only when the ratio of the horizontal length to the vertical length is greater than or equal to/greater than a certain ratio (k:1 or 1:k. k is 2 or more, e.g. 2:1, 4:1, etc.).

For example, it may be determined according to a size of a block. As a detailed example, when a size of the current block is greater than or equal to/greater than a certain size (M×N. For example, $2^m \times 2^n$ where m and n are integers greater than or equal to 1, such as 2 to 6), p [x, y] of a chrominance space can be compared with q [2x+1, 2y] of a luminance space, and when it is less than or equal to/less than a certain size, p [x, y] of the chrominance space can be compared with the average of q [2x, 2y], q [2x, 2y+1] of the luminance space.

Herein, one or more of the boundary values for size comparison may be present, or adaptive settings such as two or more ($M_1 \times N_1$, $M_2 \times N_2$, etc.) may be possible.

The above examples are some cases that can be considered in terms of computational quantity, and examples of various modifications are possible, including cases opposite to the above examples.

For example, it may be determined according to a position of a block. As a detailed example, when the current block is located inside a preset region (assuming the largest coding block in this example), p [x, y] of a chrominance space can be compared with the average of q [2x, 2y], q [2x+1, 2y], q [2x, 2y+1], q [2x+1, 2y+1] of a luminance space, and when located at the boundary of the preset region (assuming the top left boundary in this example), p [x, y] of the chrominance space may be compared with q [2x+1, 2y+1] of the luminance space. The preset region may mean a region set based on a slice, tile, block, or the like. Specifically, it can be obtained based on an integer multiple of a slice, tile, and the maximum coding/prediction/transformation block.

As another example, when a current block is located at some boundary of a region (assuming an top boundary in this example), P[x, y] of the chrominance space adjacent to some boundary (top) can be compared with q [2x+1, 2y+1] of the luminance space, and P [x, y] of the chrominance space adjacent to the interior (left) of the region may be compared with the average of q [2x, 2y], q [2x+1, 2y], q [2x, 2y+1], q [2x+1, 2y+1].

The above examples are some cases that can be considered in terms of memory, and examples of various modifications are possible including cases opposite to the above examples.

Through the above-described examples, various cases of pixel value derivation compared in each color space have been described. As in the above example, a pixel value derivation setting for obtaining the correlation information may be determined in consideration of various encoding/decoding elements as well as a size/shape/position of a block.

Through the above example, a case where one or two reference pixel lines of the block corresponding to the current block is used respectively as a region to be compared for obtaining correlation information has been described. That is, in the case of YCbCr 4:4:4, one reference pixel line is used respectively, and in other formats, in some color spaces, it means a case in which two reference pixel lines are used as in some color spaces <color N> in FIG. 7. In addition, it may not be limited to this, and examples of various modifications may be possible.

The following will be described with focus on a reference pixel line in the current color space, and it should be understood that in other color spaces, a reference pixel line may be determined according to a color format. For example, the same number of reference pixel lines may be used, or twice the number of reference pixel lines may be used.

In a color copy mode of the present invention, k reference pixel lines (where k is an integer of 1 or more such as 1 and 2) may be used (or compared) for obtaining correlation information. In addition, k reference pixel lines may be used fixedly or adaptively. In the following, various examples of setting the number of reference pixel lines will be described.

For example, it may be determined according to a shape of a block (ratio of the horizontal length to the vertical length). As a detailed example, two reference pixel lines adjacent to the longer side of the current block may be used, and one reference pixel line adjacent to the shorter side of the current block may be used.

In this case, the above may be applied to some block types (rectangular) regardless of the ratio of the horizontal length to the vertical length, or may be applied only when the horizontal/vertical length ratio is greater than or equal to a certain ratio (k:1 or 1:k. k is 2 or more, e.g. 2:1, 4:1, etc.). In addition, there are two or more boundary values for the ratio of the horizontal length to the vertical length, in the case of 2:1 or 1:2, two reference pixel lines adjacent to the longer side (or the shorter side) are used, and in the case of 4:1 or 1:4, extension may be possible, such as using three reference pixel lines adjacent to the longer side (or the shorter side).

In the above example, according to the ratio of the horizontal length to the vertical length, the longer side (or shorter side) uses s reference pixel lines, and the shorter side (or longer side) uses t reference pixel lines. In this case, it may be an example for a case where s is greater than or equal to t (i.e., s and t are integers greater than or equal to 1).

For example, it may be determined according to a size of a block. As a detailed example, two reference pixel lines may be used when a size of a current block is greater than or equal to/greater than a certain size (M×N. For example, $2^m \times 2^n$ where m and n are integers greater than or equal to 1 such as 2 to 6), and one reference pixel line may be used when the size is less than or equal to/less than a predetermined size.

Herein, one boundary value for size comparison may exist as in the above example, or adaptive settings such as two or more ($M_1 \times N_1$, $M_2 \times N_2$, etc.) may be possible.

For example, it may be determined according to a position of a block. As a detailed example, two reference pixel lines may be used when a current block is located inside a preset region (derivable from the previous description related to obtaining the correlation information. assuming the largest coding block in this example.), and one reference pixel line may be used when located at the boundary of the preset region (assuming the top left boundary in this example).

As another example, when a current block is located at some boundary of the region (assuming the top boundary in this example), one reference pixel line adjacent to some boundary (top) may be used, and two reference pixel lines adjacent to the inside (left) of the region may be used.

The above examples are some cases that can be considered in terms of accuracy and memory of correlation information, and examples of various modifications are possible, including cases opposite to the above examples.

Through the above-described examples, various cases of setting reference pixel lines used to obtain correlation information in each color space have been described. As in the above example, a reference pixel line setting for obtaining correlation information may be determined in consideration of various encoding/decoding elements as well as a size/shape/position of a block.

The following describes another case for a region to be compared (or referenced) to obtain correlation information. Pixels adjacent to positions of the left, top, top left, top right, bottom left, or the like adjacent to the current block in a current color space may be targeted for the region to be compared.

In this case, the region to be compared can be set including all of the blocks in the left, top, top left, top right, and bottom left positions. Alternatively, a reference pixel region may be configured by a combination of blocks at some locations. For example, the region to be compared can be configured by a combination of adjacent blocks such as left/top/left+top/left+top+top left/left+bottom left/top+top right/left+top left+bottom left/top+top left+top right/left+top+top right/left+top+bottom left block.

Figure 8A:
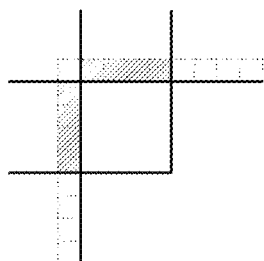
FIGS. 8A-8J are exemplary diagrams of setting a region for obtaining correlation information in a color copy mode according to an embodiment of the present invention.
Figure 8B:
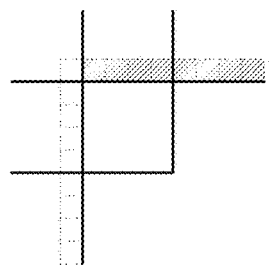
Figure 8C:
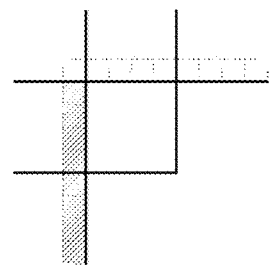
Figure 8D:
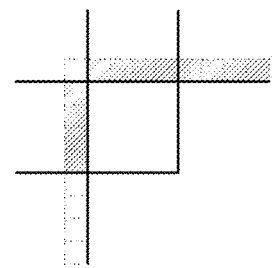
Figure 8E:
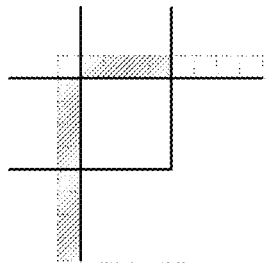
Figure 8F:
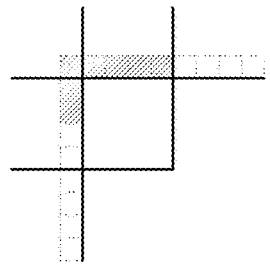
Figure 8G:
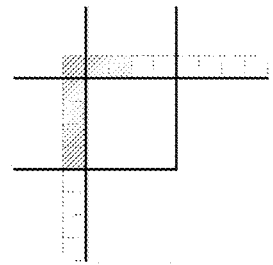
Figure 8H:
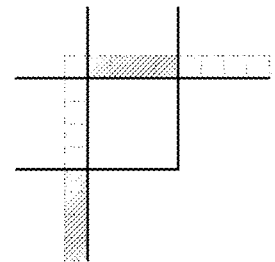
Figure 8I:
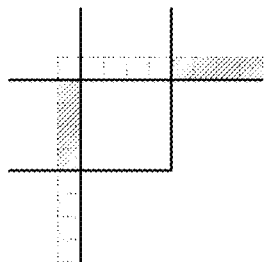
Figure 8J:
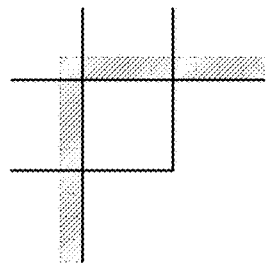

FIGS. 8A-8J are exemplary diagrams of setting a region for obtaining correlation information in a color copy mode according to an embodiment of the present invention. FIG. 8A to 8E may correspond to the above-described examples (left+top, top+right-top, left+bottom-left, left+top+top-right, left+top+bottom-left), and a block at some positions may be divided into sub-blocks and some of them may be set as a region for obtaining correlation information (FIGS. 8F and 8G). That is, a region for obtaining correlation information may be set as one or more sub-blocks located in some directions. Alternatively, a region for obtaining correlation information may be set as one or more blocks located in some directions (a) and one or more subblocks located in some directions (b) (where a and b mean different directions). In addition, a region for obtaining correlation information may be set by using non-consecutive blocks (FIGS. 8H and 8I).

In summary, the region to be compared for obtaining correlation information may be configured as a predetermined region. Alternatively, it may be configured in various combinations of some regions. That is, the region to be compared may be fixed or adaptively configured according to encoding/decoding settings.

In the following, we will look at various examples of what direction adjacent regions are configured as reference regions of a current block in a current color space. Herein, it is assumed that in a corresponding block of a different color space, what direction adjacent regions are configured as reference regions is determined according to a configuration of a reference region of a current color block. In addition, it is assumed that the basic reference region is composed of the left and top blocks.

For example, it may be determined according to a shape of the block (horizontal/vertical length ratio). As a detailed example, if the current block is long horizontally, the left, top, and top right blocks may be set as reference regions, and if the current block is long vertically, the left, top, and bottom left blocks may be set as reference regions.

In this case, the above may be applied to some block shapes (rectangular) regardless of a horizontal/vertical length ratio, or may be applied only when the horizontal/vertical length ratio is greater than or equal to/greater than a certain ratio (k:1 or 1:k. k is 2 or more, e.g. 2:1, 4:1, etc.). In addition, there are two or more boundary values for the horizontal/vertical length ratio, in the case of 2:1 (or 1:2), the left, top, and top right (or the left, top, and bottom left) blocks are set as reference regions, and in the case of 4:1 (or 1:4), an extension such as the top and top right (or the left and bottom left) blocks may be set as reference regions.

For example, it may be determined according to a size of a block. As a detailed example, when a size of a current block is greater than or equal to/greater than a certain size (M×N. For example, $2^m \times 2^n$ where m and n are integers greater than or equal to 1 such as 2 to 6), the left and top blocks may be set as reference regions, and when the size of the current block is less than or equal to/less than the certain size, the left, top, and top left blocks may be set as reference regions.

In this case, one boundary values for size comparison may be present, or adaptive settings such as two or more ($M_1 \times N_1$, $M_2 \times N_2$, etc.) may be possible.

For example, it may be determined according to a position of a block. As a detailed example, when a current block is located inside a preset region (derivable from the previous description related to obtaining correlation information. assuming the largest coding block in this example.), the left, top, top left, top right, and bottom left blocks are set as reference regions, and when the current block is located at the boundary (assuming the top left boundary in this example) of the preset region, the left and top blocks are set as reference regions.

As another example, when a current block is located at some boundary (assuming the top boundary in this example) of the region, except for blocks adjacent to some boundary (top boundary), the left and bottom left blocks adjacent to the region may be set as reference regions. That is, the left and bottom left blocks may be set as reference regions.

The above examples are some cases that can be considered in terms of computational quantity, memory, and the like, and examples of various modifications are possible, including cases opposite to the above examples.

Through the above-described examples, various cases of setting reference regions used to obtain correlation information in each color space have been described. As in the above example, the reference region setting for obtaining correlation information may be determined in consideration of various encoding/decoding elements as well as a size/shape/location of a block.

In addition, the region to be compared may be a pixel adjacent to the current block in the current color space. Herein, all of the reference pixels may be used to obtain correlation information, or some of them may be used.

For example, when a current block (based on color M in FIG. 7) is a block having a pixel range of (a, b) to (a+7, b+7) (i.e., 8×8), it is assumed that the region to be compared (because the corresponding block can be explained according to a color format, it is omitted) is one reference pixel line of the left and top blocks of the current block.

In this case, all pixels within the range of (a, b−1) to (a+7, b−1) and (a−1, b) to (a−1, b+7) may be included in the region to be compared. Alternatively, (a, b−1), (a+2, b−1), (a+4, b−1), (a+6, b−1), and (a−1, b), (a−1, b+2), (a−1, b+4), (a−1, b+6), which are some pixels in the above range, may be included. Alternatively, (a, b−1), (a+4, b−1), and (a−1, b), (a−1, b+4), which are some pixels in the above range, may be included.

The above example may be applicable for the purpose of reducing the amount of computational quantity required to obtain correlation. Various encoding/decoding elements such as a size/shape/position of a block may be considered in a setting of reference pixel sampling of the compared region for obtaining correlation information together with the many examples already described above. In addition, examples of related applications from the previous example can be derived, and thus detailed description is omitted.

Through the various examples described above, various elements (derivation of a corresponding pixel value, number of reference pixel lines, reference region direction setting, reference pixel sampling, etc.) influencing acquisition of correlation information were examined. A number of different cases may be possible where the above examples alone or in combination affect the acquisition of correlation information.

The above description can be understood as a preset process for obtaining one correlation information. In addition, as already mentioned, one or more correlation information may be supported according to encoding/decoding settings. In this case, two or more correlation information may be supported by placing two or more of preset settings (that is, a combination of elements affecting the acquisition of the correlation information).

In summary, parameter information based on correlation information can be derived from an adjacent region of a current block and an adjacent region of a corresponding block. That is, at least one parameter (e.g., <a1, b1>, <a2, b2>, <a3, b3>, etc.) may be generated based on the correlation information, and it can be used as a value that is multiplied or added to a pixel of a reconstructed block in a different color space.

The following continues a description of a linear model applied in a color copy mode. Prediction based on the following linear model can be performed by applying the parameters obtained through the above process.

$$\text{pred\_sample\_C}(i, j) = a \times \text{rec\_sample\_D}(i, j) + b$$

In the above equation, pred_sample_C means a prediction pixel value of a current block in a current color space, and rec_sample_D means a reconstructed pixel value of a corresponding block in another color space. a and b can be obtained by minimizing regression error between an adjacent region of the current block and an adjacent region of the corresponding block, and can be calculated by the following equation.

$$a = \frac{N \times \sum (D(n) \times C(n)) - \sum D(n) \times \sum C(n)}{N \times \sum (D(n) \times C(n)) - \sum D(n) \times \sum C(n)}$$

$$b = \frac{\sum C(n) - a \times \sum D(n)}{N}$$

In the above equation, D(n) means an adjacent region of the corresponding block, C(n) means an adjacent region of the current block, and N means a value (in this example, it is assumed that it is twice the minimum value of the horizontal or vertical length.) set based on the horizontal or vertical length of the current block.

In addition, various methods such as straight-line model (Straight-Line Equation) for obtaining correlation information based on the minimum and maximum values of adjacent regions of each color space can be used. In this case, as a model for obtaining correlation information, one preset model may be used, or one of a plurality of models may be selected. Herein, the meaning of selecting one of the plurality of the models means that model information may be considered as encoding/decoding elements for parameter information based on correlation information. That is, when a plurality of parameters are supported, it may mean that the remaining correlation information related settings may be classified into different parameter information according to different models for obtaining correlation even though they are the same.

In some color formats (if not 4:4:4), one pixel of a current block may correspond to one or more (2, 4, etc.) pixels of a corresponding block. For example, in the case of 4:2:0, p [x, y] in a chrominance space may correspond to q [2x, 2y], q [2x, 2y+1], q [2x+1, 2y], q [2x+1, 2y+1, etc. in a luminance space.

In order to obtain one prediction pixel value, one pixel value may be derived from a pixel value (or prediction value) of a predetermined pixel or two or more pixels among the corresponding plurality of pixels (7b). That is, in order to obtain one predicted pixel value, a reconstructed value prior to applying the correlation information to corresponding one or more pixels in another color space may be obtained. Depending on encoding/decoding settings, various cases may be possible, and a detailed description thereof will be omitted because a related description can be derived from a section on deriving a corresponding pixel value to obtain correlation information (7a). However, 7a and 7b may have the same or different settings.

(Color Mode)

A prediction mode related to a method of obtaining a prediction mode for generating a prediction block from regions located in different color spaces may be supported.

For example, a prediction mode for a method of obtaining a prediction mode for generating a prediction block in another color space using correlation between color spaces may be an example. That is, a color mode may be a mode that is adaptively determined according to a prediction mode of a block corresponding to a different color space by using existing prediction directions and methods, rather than having any specific prediction direction or prediction method.

In this case, it may be possible that various color modes are obtained according to a block division setting.

For example, in a setting (i.e., when a block division of a luminance component is explicitly determined) in which block division for some color components (chrominance) is implicitly determined according to a result of block division for some color components (luminance), one block of some color components (chrominance) may correspond to one block of some color spaces (luminance). Therefore, (assuming 4:4:4. for other formats, explanation of this example can be derived depending on the ratio of the horizontal length to the vertical length) if a current block (chrominance) has a pixel range of (a, b) to (a+m, b+n), even if it points to any pixel position within the pixel range of (a, b) to (a+m, b+n) of the corresponding block (luminance), since it points to one block, one prediction mode may be obtained in a block including the corresponding pixel.

Alternatively, in the case where individual block division is supported according to each color component (i.e., block division of each color space is explicitly determined), one block of some color components (chrominance) may correspond to one or more blocks of some color spaces (luminance). Therefore, even if the current block (chrominance) has the same pixel range as the above example, the corresponding block (luminance) may be composed of one or more blocks according to the result of block division. Therefore, different prediction modes (i.e., one or more modes) may be obtained from corresponding blocks indicated by the corresponding pixels according to the position of pixels within a pixel range of the current block.

If one color mode is supported by intra prediction mode candidate groups for chrominance components, it can be set where to get the prediction mode from the corresponding block.

For example, a prediction mode may be obtained at the location of the center-top left-top right-bottom left-bottom right, etc. of a corresponding block. That is, if a prediction mode is obtained in the above order, but the corresponding block is not available (e.g., the encoding mode is inter, etc.), a prediction mode of a position corresponding to the next order can be obtained. Alternatively, a prediction mode having a high frequency (two or more times) in the blocks at the location may be obtained.

Alternatively, when supporting multiple color modes, it is possible to set where to obtain a prediction mode according to the priority. Alternatively, a combination may be possible in which some prediction modes are obtained according to the priority and some prediction modes having high frequencies in blocks at the location are obtained. Herein, the priority is an example, and examples of various modifications may be possible.

A color mode and a color copy mode may be prediction modes that can be supported for chrominance components. For example, a prediction mode candidate group for chrominance components may be configured including horizontal, vertical, DC, planar, diagonal mode, etc. Alternatively, an intra prediction mode candidate group may be configured including the color mode and the color copy mode.

That is, a configuration may be directional+non-directional+color mode or directional+non-directional+color copy mode, or directional+non-directional+color mode+color copy mod. In addition, a mode for additional chrominance components may be included and configured.

Whether to support a color mode and a color copy mode may be determined according to encoding/decoding settings, implicit or explicit processing may be possible in this case. Alternatively, a mixed configuration of explicit+implicit processing may be possible. This includes detailed settings related to the color mode and color copy mode (for example, the number of supported modes, etc.), so that implicit or explicit processing may be possible.

For example, the related information may be explicitly included in a unit of a sequence, picture, slice, tile, block, or the like, or may be determined implicitly according to various encoding/decoding elements (for example, image type, block location, block size, block shape, block width/length ratio, etc.). Alternatively, depending on the encoding/decoding elements, some conditions may be implicitly determined, or related information may be explicitly generated in some conditions.

Figure 9:
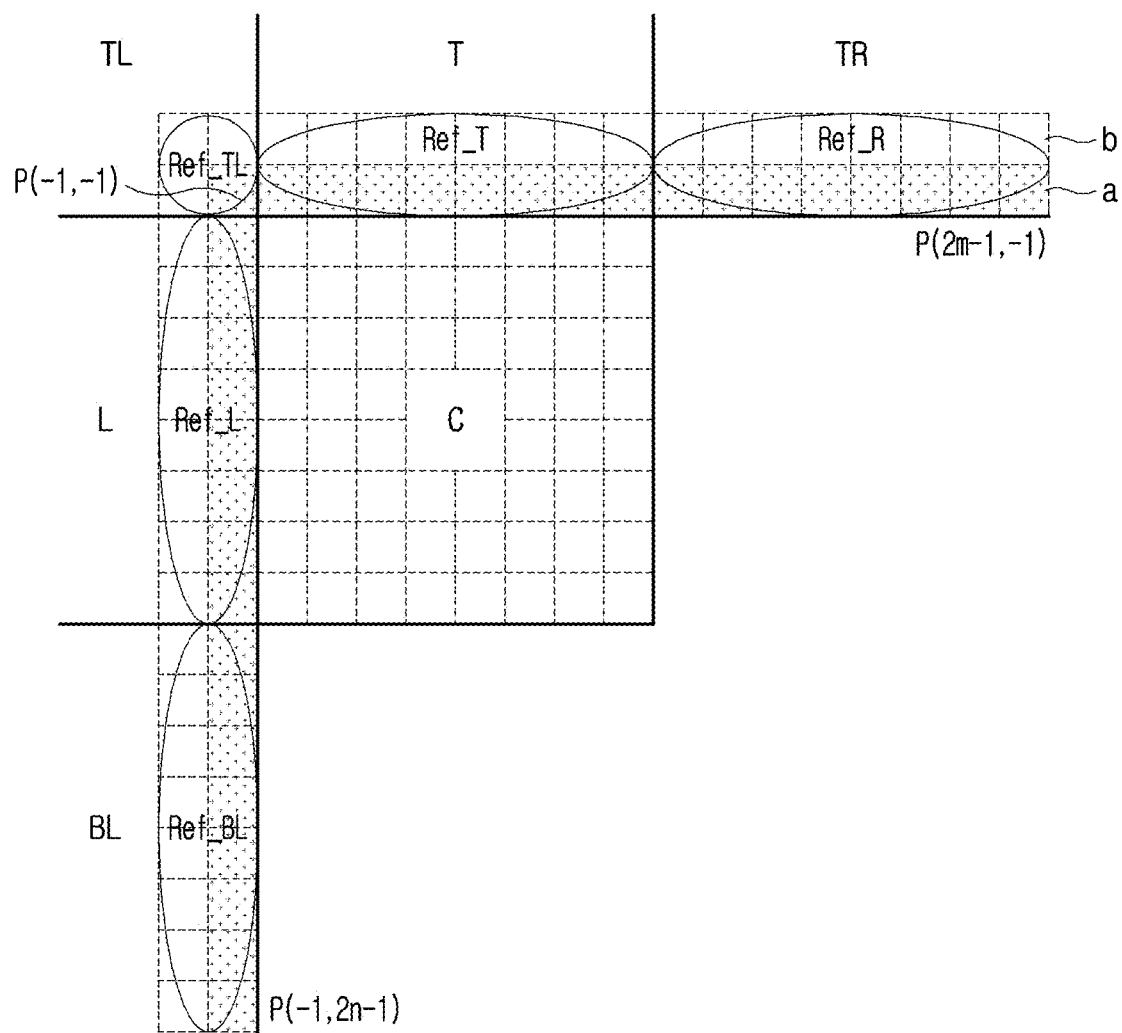
FIG. 9 is an exemplary diagram for explaining a reference pixel configuration used for intra prediction according to an embodiment of the present invention.

FIG. 9 is an exemplary diagram for explaining a reference pixel configuration used for intra prediction according to an embodiment of the present invention. A size and shape (M×N) of a prediction block may be obtained through a block division unit.

Block range information defined as the minimum block and maximum block size for intra prediction may include related information in a unit such as a sequence, picture, slice, tile, etc. In general, the horizontal and vertical lengths are specified (for example, 32×32, 64×64, etc.), so that the size information may be set, but the size information may also be set in the form of the product of the horizontal and vertical lengths. For example, when the product of horizontal and vertical is 64, the minimum block size may correspond to 4×16, 8×8, 16×4, or the like.

In addition, by specifying the horizontal and vertical lengths, setting size information or setting size information in the form of a product may be mixed and used. For example, for the maximum block size, if the product of the horizontal and vertical lengths is 4096 and the maximum value of one of the two lengths is 64, 64×64 may correspond to the maximum block size.

As in the above example, in addition to the minimum block and maximum block size information, block division information is mixed to finally determine a size and shape of a prediction block. In the present invention, the prediction block must have the product of the horizontal and vertical lengths greater than or equal to s (for example, s is a multiple of 2, such as 16, 32) and one of the horizontal/vertical lengths greater than or equal to k (for example, k is 4, 8, etc.). In addition, although the horizontal and vertical lengths of the block may be defined under a setting equal to or less than v and w (e.g., v and w are multiples of 2, such as 16, 32, 64, etc.), respectively. In addition, it may not be limited thereto, and various block range settings may be possible.

Intra prediction may be generally performed in a unit of a prediction block, but may be performed in a unit of a coding block, transform block, or the like according to a setting of the block division unit. After checking block information, the reference pixel configuration unit may configure a reference pixel used for prediction of a current block. In this case, a reference pixel may be managed through temporary memory (for example, an array. 1st, 2nd array, etc.), generated and removed for each intra prediction process of a block, and the size of the temporary memory may be determined according to the configuration of the reference pixel.

In this example, it described assuming that the left, top, top left, top right, and bottom left blocks are used for prediction of a current block, but it may not be limited thereto, and a block candidate group having a different configuration may be used for prediction of the current block. For example, a candidate group of neighboring blocks for the reference pixel may be an example of following a raster or Z scan, and some of the candidate group may be removed according to a scan order or may be configured including other block candidates (For example, right, bottom, bottom right blocks, etc.).

In addition, if some prediction mode (color copy mode) is supported, some regions of different color spaces can be used for prediction of a current block, and it can also be considered as a reference pixel. The existing reference pixels (spatial adjacent regions of the current block) and the additional reference pixels may be managed as one or separately (for example, the reference pixel A and the reference pixel B. That is, the reference pixel memory may be separately named as if the temporary memory is used separately).

For example, the temporary memory of the basic reference pixel may have a size of <2×blk_width+2×blk_height+1> (based on one reference pixel line), and the temporary memory of the additional reference pixel may have a size of <blk_width×blk_height> (when 4:4:4) (blk_width/2× blk_height/2 is required when 4:2:0). The temporary memory size is one example and is not limited thereto.

In addition, it may be managed as a reference pixel including adjacent regions of the current block to be compared (or referenced) to obtain correlation information and a corresponding block. That is, additional reference pixels may be managed according to a color copy mode.

In summary, an adjacent region of a current block may be included as a reference pixel for intra prediction of the current block, and a corresponding block of a different color space and its adjacent region may be included as a reference pixel according to the prediction mode.

FIG. 10 is a conceptual diagram illustrating a block adjacent to a target block for intra prediction according to an embodiment of the present invention. In detail, the left side of FIG. 10 shows a block adjacent to the current block in the current color space, and the right side shows a corresponding block in another color space. For convenience of description, the following description will be made on the assumption that a block adjacent to the current block in the current color space is a basic reference pixel configuration.

As illustrated in FIG. 9, reference pixels used for prediction of the current block may be configured as adjacent pixels (ref_L, Ref_T, Ref_TL, Ref_TR, Ref_BL in FIG. 9) of the left, top, top left, top right, and bottom left blocks. In this case, the reference pixel is generally composed of pixels of the neighboring block closest to the current block (a of FIG. 9 as a reference pixel line), but other pixels (b of FIG. 9 and pixels on other outer lines) may also be configured in the reference pixel.

Pixels adjacent to a current block may be classified into at least one reference pixel line, and the pixel closest to the current block may be classified into ref_0 {e.g., pixels having a distance of 1 between a boundary pixel of the current block and the pixel. p(−1, −1) to p(2m−1, −1), p(−1,0) to p(−1,2n−1)}, the next adjacent pixel to ref_1 {e.g., the distance between the boundary pixel of the current block and the pixel is 2. p(−2, −2) to p(2m, −2), p(−2, −1) to p(−2,2n)}, and the next adjacent pixel to ref_2 {e.g., the distance between the boundary pixel of the current block and the pixel is 3. p(−3, −3) to p(2m+1, −3), p(−3, −2) to p(−3, 2n+1)}. That is, it can be classified as a reference pixel line according to a pixel distance adjacent to the boundary pixel of the current block.

Herein, the number of reference pixel lines supported may be N or more, and N may be an integer of 1 or more, such as 1 to 5. In this case, it is generally included in the reference pixel line candidate group sequentially from the reference pixel line closest to the current block, but is not limited thereto. For example, the candidate groups may be sequentially configured as <ref_0, ref_1, ref_2> when N is 3, or it may also be possible that the candidate group is configured with a configuration that excludes closest reference pixel lines or a non-sequential configuration such as <ref_0, ref_1, ref_3>, <ref_0, ref_2, ref_3>, <ref_1, ref_2, ref_3>.

Prediction may be performed using all reference pixel lines in the candidate group, or prediction may be performed using some reference pixel lines (one or more).

For example, one of a plurality of reference pixel lines may be selected according to encoding/decoding settings, and intra prediction may be performed using the reference pixel line. Alternatively, two or more of the plurality of reference pixel lines may be selected to use the corresponding reference pixel line (for example, a weighted average is applied to the data of each reference pixel line) to perform intra prediction.

Herein, the reference pixel line selection may be determined implicitly or explicitly. For example, in the implicit case, it means that it is determined according to encoding/decoding settings defined according to one or a combination of two or more elements such as an image type, color component, and a size/shape/position of a block. In addition, the explicit case means that reference pixel line selection information may be generated in a unit such as a block.

Although the present invention mainly describes a case in which intra prediction is performed using the closest reference pixel line, it should be understood that various embodiments described below may be applied to the same or similar application when multiple reference pixel lines are used.

The reference pixel configuration unit of the intra prediction of the present invention may include a reference pixel generation unit, a reference pixel interpolation unit, and a reference pixel filter unit, and may include all or part of the above configuration.

The available reference pixel and the unavailable reference pixel may be classified by checking the availability of the reference pixel in the reference pixel configuration unit. Herein, it is determined that the availability of the reference pixel is unavailable when at least one of the following conditions is satisfied. Of course, the availability of the reference pixel may be determined based on additional conditions not mentioned in the examples to be described later, but in the present invention, it is assumed that it is limited to the conditions in the examples to be described later.

For example, if any of the below cases are satisfied, it may be determined as unavailable: if it is located outside the picture boundary, if it does not belong to the same division unit (e.g., units that cannot be referenced to each other, such as slices and tiles. However, if a unit such as a slice or tile has characteristics that can be referred to each other, an exception is handled even if the unit is not the same division unit.) as the current block, and if encoding/decoding is not completed. That is, when none of the above conditions are satisfied, it may be determined as available.

In addition, it is possible to limit the use of the reference pixel based on encoding/decoding settings. For example, the use of the reference pixel may be limited according to whether limited intra prediction (e.g., constrained_intra_pred_flag) is performed, even if it is determined to be usable according to the above conditions. The limited intra prediction may be performed when error-resistant encoding/decoding is performed on an external factor such as a communication environment, or when a block referenced and reconstructed from another image is prohibited to be used as a reference pixel.

When the limited intra prediction is disabled (e.g., I picture type. or constrained_intra_pred_flag=0 in P or B picture type), the reference pixel candidate block may be available (however, when the above conditions are satisfied, such as being located inside the picture boundary).

Alternatively, when limited intra prediction is activated (for example, constrained_intra_pred_flag is set to 1 in a P or B picture type), it may be determined whether to use the reference pixel candidate block according to an encoding mode (Intra or Inter). In general, it may be used in the Intra mode and may not be used in the Inter mode. In the above example, it is assumed that whether to use is determined according to the encoding mode, but whether to use may be determined according to various other encoding/decoding factors.

Since the reference pixel is composed of one or more blocks, when an availability of the reference pixel is confirmed and classified, it can be classified into three cases: <all usable>, <some usable>, and <not all usable>. In all cases other than the case of <all usable>, a reference pixel at an unavailable candidate block position may be filled or generated (A). Alternatively, the reference pixel at the unavailable candidate block position may not be used in the prediction process, and prediction mode encoding/decoding may be performed excluding a prediction mode in which prediction is performed from the reference pixel at the position (B).

When a reference pixel candidate block is available, a pixel at a corresponding position may be included in a reference pixel memory of a current block. In this case, the pixel data may be copied as it is or may be included in the reference pixel memory through processes such as reference pixel filtering and reference pixel interpolation.

When the reference pixel candidate block is not available, it may be processed under reference pixel processing A or B setting. An example of processing when a reference pixel candidate block is unavailable according to each setting will be described below.

(A) When the reference pixel candidate block is not available, a pixel at a corresponding location obtained through a reference pixel generation process may be included in the reference pixel memory of the current block.

The following describes a method of generating a reference pixel at an unavailable position as an example of a reference pixel generation process.

For example, a reference pixel may be generated using an arbitrary pixel value. Here, an arbitrary pixel value means one pixel value (e.g., a minimum value, a maximum value, a median, etc. of the pixel value range) belonging to the pixel value range (for example, the pixel value range based on the bit depth or the pixel value range according to the pixel distribution in the image). In detail, the example may be applied when all of the reference pixel candidate blocks are not available, but is not limited thereto, and may be applied even when only some of the reference pixel candidate blocks are not available.

Alternatively, a reference pixel may be generated from an region in which image encoding/decoding has been completed. In detail, a reference pixel may be generated based on at least one available block (or available reference pixel) adjacent to the unavailable block. In this case, at least one of extrapolation, interpolation, and copying may be used.

(B) When the reference pixel candidate block is not available, the use of the prediction mode using the pixel at the corresponding location may be restricted. For example, in FIG. 9, when the reference pixel at the TR location is unavailable, the use of modes 51 to 66 (FIG. 4) that perform prediction using the pixel at the corresponding location is restricted, and the use of modes 2 to 50 (vertical mode) that perform prediction using reference pixels at positions T, TL, L, and BL rather than the reference pixel at the TR location may be allowed (in this example, only the directional mode is described).

As another example, when reference pixels at all locations are unavailable, there may not be an allowed prediction mode. In this case, a prediction block may be generated using an arbitrary pixel value, as in some configurations of the A setting, and a pre-set prediction mode (e.g., DC mode, etc.) for referencing in a process of encoding/decoding a prediction mode of the following block may be set as a prediction mode of the corresponding block. That is, the process of encoding/decoding the prediction mode may be implicitly omitted.

The above example relates to a case associated with the process of encoding/decoding the prediction mode. The prediction mode encoding/decoding unit of the present invention will be described later on the assumption that A setting is supported. If the B setting is supported, a partial configuration of the prediction mode encoding/decoding unit may be changed. Since the case where the reference pixels at all positions are not available has been described above, a case where the reference pixels at some positions are not available will be described later.

For example, assume that the prediction mode of the neighboring block is included in the MPM candidate group. When the prediction mode of the neighboring block is a prediction mode using a reference pixel at a block position that is not available for the current block, a process of excluding the corresponding mode from the MPM candidate group may be added. That is, a process of checking a unavailable mode may be added to a process of checking redundancy to be described later in the prediction mode encoding/decoding unit. Here, the unavailable mode may be designated by various definitions, but in this example, it is assumed that it is a prediction mode using a reference pixel at an unavailable block position. Therefore, the MPM candidate group configuration process of the prediction mode is performed according to the priority, but whether to include in the MPM candidate group may be determined through a process of checking redundancy and/or a process of checking a unavailable mode. Here, if the prediction mode of the current priority does not pass the checking process, the prediction mode of the next priority may be a candidate in the MPM candidate group configuration process.

Alternatively, it is assumed that when the reference pixels of the TR, T, and TL positions of FIG. 9 is not available, the use of modes 19 to 66 that perform prediction by using the pixels at the positions is limited. In this case, modes 2 to 18 that perform prediction using reference pixels at L and BL positions may be available prediction modes. In this case, assuming that the number of MPM candidates included in the MPM candidate group is 6, the number of non-MPM candidates included in the non-MPM candidate group may be 12. In this case, maintaining the number of MPM candidates at 6 (the large number compared to all modes) may be inefficient. As such, when the use of the prediction mode is limited due to unavailable reference pixels, entropy encoding/decoding settings such as adjustment of the number of MPM candidates (for example, p→q, p>q) and binarization (for example, variable length binarization A→variable length binarization B, etc.) may be changed. That is, adaptive prediction mode encoding/decoding may be supported, and a detailed description thereof will be omitted.

In addition, since, in the non-MPM candidate group, it is the same that there is no possibility of occurrence of a prediction mode in which use is restricted by a reference pixel that is not available, it may not be necessary to include the corresponding mode in the candidate group. This means that in the setting of entropy encoding/decoding such as adjustment of the number of non-MPM candidates (e.g., s→t. s>t) and binarization (e.g., fixed length binarization-→variable length binarization, etc.), adaptive prediction mode encoding/decoding like the MPM candidate group may be supported.

Through the above example, various examples of processing when a reference pixel is not available have been described. This may occur in the case of a color copy mode as well as a general prediction mode.

Next, when the color copy mode is supported, classification is performed, based on the availability of a reference pixel, into an available reference pixel and an unavailable reference pixel, and examples of various processing thereof will be described.

FIGS. 11A-11D are exemplary diagrams for explaining an availability of a reference pixel in a color copy mode according to an embodiment of the present invention. FIGS. 11A-11D assume a case where the left and top blocks of the current block (current color space) and the corresponding block (different color space) refer to an region used for obtaining correlation information, and a case of a partial color format (YCbCr 4:4:4).

It has already been mentioned that the availability of the reference pixel may be determined based on the position of the current block (e.g., whether it is located outside the picture boundary, etc.). FIGS. 11A-11D show various examples of the availability of a reference pixel based on the position of a current block.

In FIGS. 11A-11D, the availability of the reference pixel of the current block means the same case (result) as the corresponding block. However, it is assumed that it is divided into the same division unit (tile, slice, etc.) as the current color space in another color space (however, it is necessary to consider the component ratio of the color format).

Figure 11A:
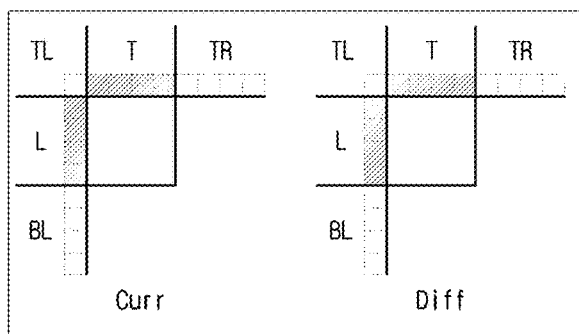
FIGS. 11A-11D are exemplary diagrams for explaining an availability of a reference pixel in a color copy mode according to an embodiment of the present invention.
Figure 11B:
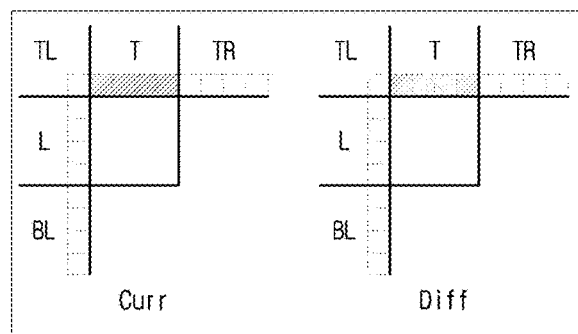
Figure 11C:
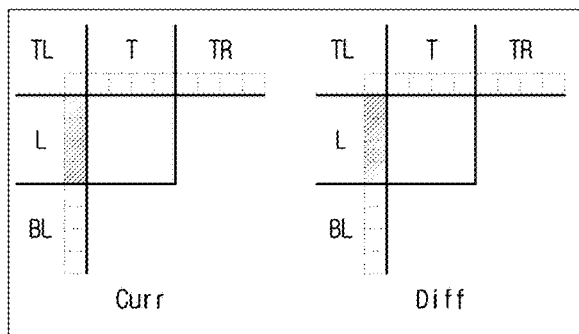
Figure 11D:
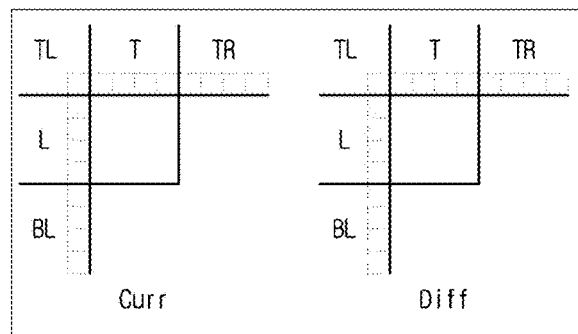

FIG. 11A shows a case where all reference pixels are available, FIG. 11B and FIG. 11C shows a case where some of the reference pixels are available (top block and left block, respectively), and FIG. 11D shows a case where all reference pixels are unavailable.

Except for FIG. 11A, since at least one reference pixel is unavailable, processing is required for this. According to the reference pixel processing A setting, a process of filling an unavailable region may be performed through a reference pixel generation process. In this case, the reference pixel of the current block may be processed through the above-described reference pixel generation process (general intra prediction).

The reference pixel of the corresponding block may be processed the same as or different from the current block. For example, if a reference pixel at the L2 position (refer to FIG. 10) among the reference pixels of the current block is not available, it may be generated through an arbitrary pixel value or through an available reference pixel. Specifically, the available reference pixel may be located in the left/right or top/bottom direction (L1, L3, etc. in this example) of the unavailable reference pixel, or on the same reference pixel line (R3, etc. in this example).

On the other hand, the reference pixel of the corresponding block may also be generated through an arbitrary pixel value or through an available reference pixel. However, the location of the available reference pixel may be the same as or different from the current block. In detail, the available reference pixel may be located in various directions such as top-left, top-right, bottom-left, and bottom-right as well as left/right/top/bottom directions of the unavailable reference pixel. Since the encoding/decoding of the current block has not been completed yet, the pixels a to p of FIG. 10 do not belong to the available reference pixels. However, since the encoding/decoding of the corresponding block has been completed, the pixels aa to pp of FIG. 10 may also belong to the available reference pixels. Therefore, a reference pixel at an unavailable position may be generated by using various methods such as interpolation, extrapolation, copying, or filtering of the available reference pixels.

Through the above process, a reference pixel at an unavailable location such as b to d of FIG. 11 may be generated and included in the reference pixel memory, and a reference pixel at the corresponding location may be used to obtain correlation information as shown in FIG. 11A.

The following continues the description of the case according to the reference pixel processing B setting. It is possible to limit the use of reference pixels at unavailable positions. In addition, it is possible to limit the use of a prediction mode in which prediction is performed from a reference pixel at an unavailable position (adaptive prediction mode encoding/decoding, etc. is applied). Or other processing may be possible.

First, a case of restricting the use of the reference pixel at the unavailable position will be described. As shown in FIG. 11A, the left and top blocks of each of the current block and the corresponding block are used to obtain correlation information, but FIGS. 11B and 11C correspond to cases in which some reference pixels are not available. In this case, the unavailable reference pixel is not used, and correlation information may be obtained by using the available reference pixel. On the other hand, it may be necessary to consider a case where there is insufficient data for obtaining correlation information.

For example, when the left (N) and top (M) blocks of the current block (M×N) are an region for obtaining the correlation information and the number of the available reference pixels is greater than or equal to k (0<k<=(M+N)), the reference pixels may be used in a process of obtaining the correlation information. If the number of available reference pixels is less than or equal to k, the reference pixels may not be used in the process of obtaining correlation information.

Or, when the number of available reference pixels in the left block is greater than or equal to p(0<p<=N) and the number of available reference pixels in the top block is greater than or equal to q(0<q<=M), the reference pixels may be used in a process of obtaining the correlation information. If the number of available reference pixels in the left block is less than or equal to p or the number of available reference pixels in the top block is less than or equal to q, the reference pixels may not be used in the process of obtaining correlation information.

The former case may be classification according to a boundary value condition in the entire region for obtaining the correlation information. The latter case may be classification according to the boundary value condition in some (partial) region for obtaining the correlation information. In the latter case, it may be an example of classifying the neighboring region for obtaining correlation information into left, top, top-left, top-right, and bottom-left positions, but it may be applicable when classified based on various neighboring region division (for example, classification into left and top positions. In this case, the top+top-right blocks are classified as top* and the left+bottom-left blocks are classified as left*).

In the latter case, the boundary value setting may be the same or different for each region. For example, when all the reference pixels (N) are available in the left block, the reference pixel may be used in the process of obtaining correlation information, and when at least one reference pixel is available in the top block (i.e., some reference pixels is available), the reference pixel may be used in the process of obtaining correlation information.

In addition, in the above example, the same or different settings may be supported depending on the color copy mode (e.g., when FIG. 8A to 8C are supported). Related settings may be defined differently according to other encoding/decoding settings (e.g., image type, block size, shape, location, block division type, etc.).

When the correlation information acquisition process is not performed (that is, even one reference pixel is not used in the correlation information acquisition process), the correlation information may be implicitly obtained. For example, in the color copy mode equation, a and b may be set to 1 and 0, respectively (i.e., data of a corresponding block is used as a prediction value of the current block as it is). Alternatively, correlation information of a block that has been encoded/decoded in a color copy mode or pre-set correlation information may be used.

Alternatively, the prediction value of the current block may be filled with an arbitrary value (e.g., a bit depth or a minimum value, a median value, a maximum value, etc. of a pixel value range). That is, it may be a case similar to the method performed when all reference pixels are not available in general intra prediction.

The case where the correlation information as in the above example is implicitly obtained or the case where the prediction value is filled with an arbitrary value may be an example applicable to the case as shown in FIG. 11D. That is, this is because even one reference pixel is not used in the process of obtaining correlation information.

The following describes a case of limiting the use of a prediction mode in which prediction is performed from a reference pixel at an unavailable location.

FIGS. 12A-12D are exemplary diagrams for explaining an availability of a reference pixel in a color copy mode according to an embodiment of the present invention. In an example to be described later, it is assumed that the left, top, top-right, and bottom-left blocks of the current block and the corresponding block are region used to obtain correlation information. In addition, three color copy modes (mode_A, mode_B, and mode_C) are supported, and it is assumed that each mode obtains the correlation information from the left+top, top+top-right, and left+bottom-left blocks of each block.

Figure 12A:
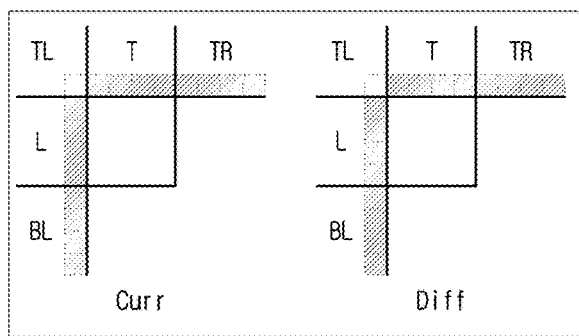
FIGS. 12A-12D are exemplary diagrams for explaining an availability of a reference pixel in a color copy mode according to an embodiment of the present invention.
Figure 12B:
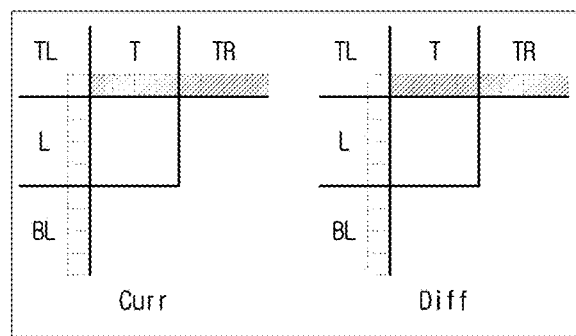
Figure 12C:
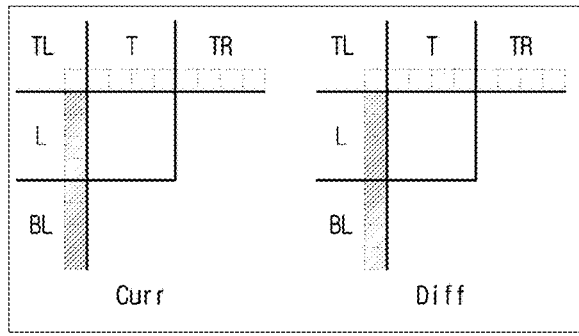
Figure 12D:
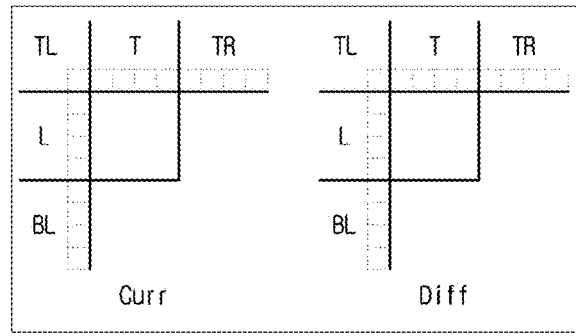

Referring to FIGS. 12A-12D, FIG. 12A shows a case where a current block is located inside an image (picture, slice, tile, etc.), and FIG. 12B shows a case where a current block is located at a left boundary of the image. FIG. 12C shows a case where the current block is located at the top boundary of the image, and FIG. 12D shows a case where the current block is located at the top and left boundaries of the image. That is, it is assumed that the availability of the reference pixel is determined based on the position of the current block.

Referring to FIGS. 12A-12D, mode_A, mode_B, and mode_C may be supported in FIG. 12A, mode_B may be supported in FIG. 12B, mode_C may be supported in FIG. 12C, and No mode may be supported in FIG. 12D. That is, if even one reference pixel used for obtaining correlation information is not available, the corresponding mode may be not supported.

For example, when constructing an intra prediction mode candidate group for a chrominance component, a directional and non-directional mode, a color mode, and a color copy mode may be included. In this case, it is assumed that a total of 7 prediction modes are included in the candidate group with 4 prediction modes such as DC, Planar, vertical, horizontal, and diagonal modes, 1 color mode, and 3 color copy modes.

As in the above example, a color copy mode in which correlation information is obtained from an unavailable reference pixel may be excluded. In FIG. 12C, a candidate group for a chrominance component may be constructed with the remaining six prediction modes except for mode_c. That is, the number of prediction mode candidates may be adjusted from m to n (m>n. n is an integer greater than or equal to 1). It may be required to change the entropy encoding/decoding such as setting of the prediction mode index and binarization, etc.

In FIG. 12D, mode_A, mode_B, and mode_C may be excluded, and a total of four candidates may be constructed with the remaining prediction modes, such as directional and non-directional modes and the color mode.

As in the above example, an intra prediction mode candidate group may be constructed by restricting the use of a prediction mode based on an unavailable reference pixel.

When the reference pixel processing B setting is applied as in the above example, various processing methods may be supported. Depending on the encoding/decoding setting, reference pixel processing and intra prediction may be performed implicitly or explicitly based on one processing method.

In the above example, the availability of a reference pixel in an adjacent region is determined based on the position of the current block. That is, the current block and the corresponding block have the same position in the image (picture, slice, tile, maximum coding block, etc.), and thus, if a specific block (current block or corresponding block) is adjacent to the image boundary, the corresponding block is also located at the image boundary. Therefore, the same result is produced when the availability of a reference pixel is determined based on the position of each block.

In addition, as a criterion for determining the probability of a reference pixel, the restricted intra prediction, etc. has been described above. The probability of a reference pixel in an adjacent region of the current block and the corresponding block may not be the same.

FIGS. 13A-13F are exemplary diagrams for explaining an availability of a reference pixel in a color copy mode according to an embodiment of the present invention. In an example to be described later, it is assumed that the left and top blocks of the current block and the corresponding block are regions used for obtaining correlation information. That is, it may be a description of mode_A of FIGS. 12A-12D, and it is premised that in other color copy modes, the following descriptions may be applied in the same or similar manner.

Referring to FIGS. 13A-13F, it may be divided into a case where all adjacent regions of both blocks (current block and corresponding block) are available (i), a case where only some of them is available (ii), and a case where all are not available (iii). Here, the case where only some is available (ii) may be divided into a case where a common available region exists in both blocks (ii-1) and a case where a common available region does not exist in both blocks (ii-2). Here, the case where a common available region exists in both blocks (ii-1) may be divided into a case where the region is perfectly matched in both blocks (ii-1-1) and a case where the region is only partially matched (ii-1-2).

Figure 13A:
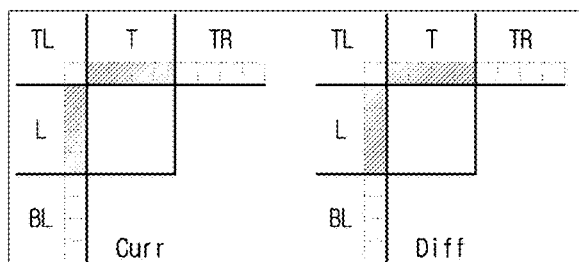
FIGS. 13A-13F are exemplary diagrams for explaining an availability of a reference pixel in a color copy mode according to an embodiment of the present invention.
Figure 13B:
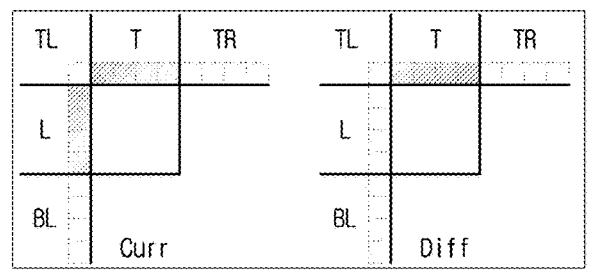
Figure 13C:
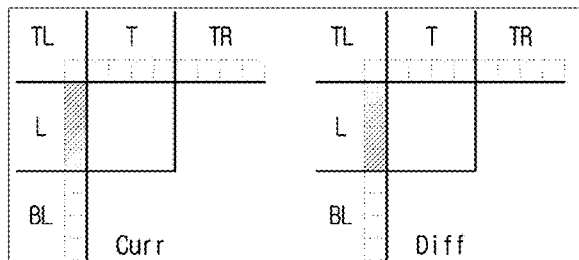
Figure 13D:
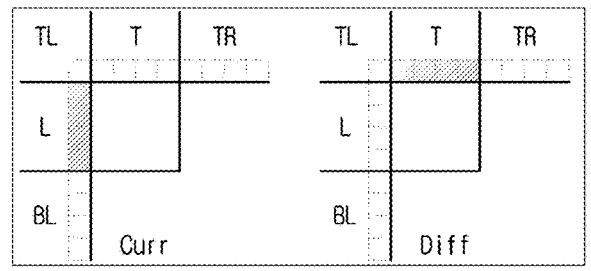
Figure 13E:
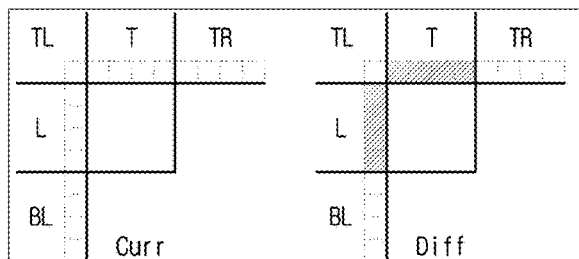
Figure 13F:
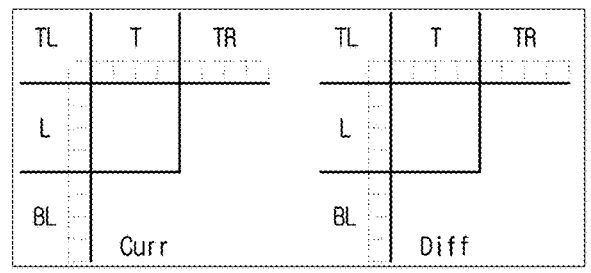

Referring to FIGS. 13A-13F, in the classification, i and iii correspond to FIG. 13A and FIG. 13F, ii-2 corresponds to FIG. 13D and FIG. 13E, and ii-1-1 corresponds to FIG. 13C, and ii-1-2 corresponds to FIG. 13D. Here, compared to the case of determining the possibility of a reference pixel based on the position of the current block (or corresponding block), ii-2 and ii-1-2 may be cases to be newly considered.

The process may be included in the step of determining the possibility of a reference pixel in the color copy mode. According to the determination result, an intra prediction setting of a color copy mode including processing on a reference pixel may be determined. An example of reference pixel processing and intra prediction based on the availability of each adjacent region of the current block and the corresponding block will be described below.

In the case of the reference pixel processing A setting, the reference pixel at the unavailable position may be filled through various methods described above. However, detailed settings may be set differently according to classification according to availability of adjacent regions of both blocks. The following describes the cases of ii-2 and ii-1-2, and the description of other cases may be duplicated with the above description of the present invention, so a detailed description thereof will be omitted.

For example, FIG. 13D (ii-2) may be a case in which there is no common available region in the current block and the corresponding block. In addition, FIG. 13B (ii-1-2) may be a case in which available adjacent regions in the current block and the corresponding block partially overlap. In this case, a process of filling data in an adjacent region of an unavailable position (e.g., filling from an available region) may is used in a process of obtaining correlation information.

Alternatively, FIG. 13E (ii-2) may be a case in which all adjacent region of the current block or the corresponding block are not available. That is, one of both blocks has no data to be used in the process of obtaining correlation information, and the region may be filled with various data.

Here, the region may be filled using an arbitrary value, and a minimum value, a median value, a maximum value, etc. based on a pixel value range (or bit depth) of the image may be used.

Here, the region may be filled through a method such as copying from an available adjacent region of another color space. In this case, since adjacent regions of both blocks have the same image characteristics (i.e., the same data) through the above process, pre-set correlation information may be obtained. For example, in the correlation-related equation, a is set to 1 and b is set to 0. This corresponds to a case where data of a corresponding block is copied as a prediction value of a current block, and other various correlation information may be set.

In the case of the reference pixel processing B setting, use of a reference pixel at an unavailable position or use of a corresponding color copy mode may be restricted through various methods described above. However, detailed settings may be set differently according to the classification of the availability. The following describes the cases ii-2 and ii-1-2, and the description of other cases may be duplicated with the above description of the present invention, so a detailed description thereof will be omitted.

For example, FIGS. 13D and 13E (ii-2) may be a case in which there is no common available region in the current block and the corresponding block. Since there is no overlapping region in both blocks that may be compared to obtain correlation information, the use of the corresponding color copy mode may be restricted. Alternatively, the prediction value of the current block may be filled with an arbitrary value or the like. That is, it may mean that the process of obtaining the correlation information is not performed.

Alternatively, FIG. 13B (ii-1-2) may be a case in which available adjacent regions in the current block and the corresponding block partially overlap. Therefore, it is possible to perform the process of obtaining correlation information even only in some of available adjacent regions.

Figure 14:
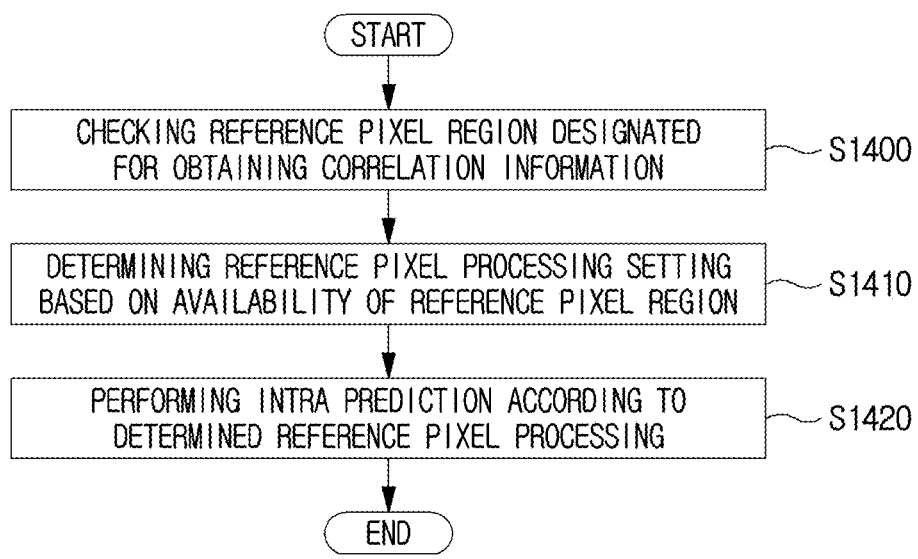
FIG. 14 is a flowchart illustrating an intra prediction method of a color copy mode according to an embodiment of the present invention.

FIG. 14 is a flowchart illustrating an intra prediction method of a color copy mode according to an embodiment of the present invention. Referring to FIG. 14, a reference pixel region designated for obtaining correlation information may be checked (S1400). Further, the processing setting for the reference pixel may be determined based on the determination of the availability of the designated reference pixel region (S1410). In addition, intra prediction may be performed according to the determined processing setting for the reference pixel (S1420). Here, a prediction block according to a color copy mode may be generated by obtaining correlation information based on data of an available reference pixel region according to a reference pixel processing setting, or a prediction block filled with an arbitrary value may be generated.

In summary, when a color copy mode is supported for intra prediction of a chrominance component, a comparison region for obtaining correlation information designated by the color copy mode may be checked. Unlike the general intra prediction mode, the color copy mode may check not only the adjacent region of the current block (especially, the region used for correlation information comparison) but also the availability of reference pixels of the corresponding block. Reference pixel processing and intra prediction according to various examples described above may be performed according to one of a pre-set reference pixel processing setting or a plurality of reference pixel processing settings and the availability of the reference pixel.

Here, the reference pixel processing setting may be implicitly determined according to the image type, color component, size/position/shape of the block, the horizontal/vertical length ratio of the block, the encoding mode, and the intra prediction mode (e.g., the range, position, number of pixels, etc. of the region to be compared to obtain the correlation information of the color copy mode) or a restricted intra prediction setting, or related information may be explicitly generated in units such as a sequence, picture, slice, tile, etc., In this case, the reference pixel processing setting may be defined limited to the state information of the current block (or current image) or the state information of the corresponding block (or other color image), or may be defined by combining a plurality of state information.

Although reference pixel processing settings A and B have been described separately through the above example, the two settings may be used alone or in combination, and this may also be determined based on the state information or explicit information.

After reference pixel construction is completed in the reference pixel interpolation unit, a reference pixel in a decimal unit may be generated through linear interpolation of the reference pixel. Alternatively, the reference pixel interpolation process may be performed after the reference pixel filter process described below.

In this case, the interpolation process may not be performed in the case of horizontal, vertical, some diagonal modes (e.g., modes of 45 degrees difference in vertical/horizontal such as Diagonal top right, Diagonal bottom right, Diagonal bottom left mode. corresponding to mode 2, 34, and 66 in FIG. 4), non-directional mode, color copy mode, etc., and the interpolation process may be performed in other modes (other diagonal modes).

A pixel position (i.e., which decimal unit is interpolated. it is determined from ½ to 1/64, etc.) where interpolation is performed may be determined according to a prediction mode (e.g., directionality of the prediction mode, dy/dx, etc.) and positions of a reference pixel and a prediction pixel. In this case, one filter (e.g., assume a filter with the same equation used to determine filter coefficients or a length of filter taps. however, it is assumed that only the coefficients are adjusted according to the precision <for example, 1/32, 7/32, 19/32> of a decimal unit) may be applied regardless of the precision of a decimal unit, or one of a plurality of filters (e.g., assume a filter with a separate equation used to determine filter coefficients or a length of filter tabs.) may be selected and applied according to the decimal unit.

The former case may be an example of using an integer unit pixel as an input for interpolation of a decimal unit pixel, and the latter case may be an example of different input pixels step by step (for example, in the case of a ½ unit, integer pixels are used. in the case of a ¼ unit, integer and ½ unit pixels are used, etc.), but it is not limited thereto, and in the present invention, the former case will be mainly described.

For reference pixel interpolation, fixed filtering or adaptive filtering may be performed, and this may be determined according to encoding/decoding settings (for example, one or a combination of two or more of an image type, a color component, a block position/a size/a shape, a block width/height ratio, a prediction mode, etc.).

The fixed filtering may perform reference pixel interpolation using one filter, and the adaptive filtering may perform reference pixel interpolation using one of a plurality of filters.

Herein, in the case of the adaptive filtering, one of a plurality of filters may be determined implicitly or explicitly according to encoding/decoding settings. Herein, a type of a filter can be composed of a 4-tap DCT-IF filter, a 4-tap cubic filter, a 4-tap Gaussian filter, a 6-tap Wiener filter, and an 8-tap Kalman filter. In addition, it may also be possible to define different filter candidate groups supported according to color components (for example, some types of filters are the same or different, and a length of filter tabs is short or long, etc.).

The reference pixel filter unit may perform filtering on a reference pixel for the purpose of improving prediction accuracy by reducing remaining deterioration through an encoding/decoding process. The filter used in this case may be a low-pass filter, but is not limited thereto. Whether filtering is applied may be determined according to encoding/decoding settings (which can be derived from the above description). In addition, when filtering is applied, fixed filtering or adaptive filtering may be applied.

The fixed filtering means that reference pixel filtering is not performed or reference pixel filtering is applied using one filter. The adaptive filtering means that whether filtering is applied is determined according to encoding/decoding settings, and if there are two or more supported filter types, one of them can be selected.

In this case, a plurality of filters classified by various filter coefficients such as 3-tap filter like [1, 2, 1]/4, 5-tap filter like [2, 3, 6, 3, 2]/16, etc., filter tap lengths, and the like as the filter type may be supported.

The reference pixel interpolation unit and the reference pixel filter unit introduced in the reference pixel construction step may be necessary components for improving prediction accuracy. The two processes may be independently performed, but a configuration in which the two processes are mixed (that is, treated as one filtering) may also be possible.

The prediction block generation unit may generate a prediction block according to at least one prediction mode, and use a reference pixel based on the prediction mode. In this case, depending on the prediction mode, the reference pixel may be used in a method (directional mode) such as extrapolation, and may be used in a method (non-directional mode) such as interpolation, average (DC), or copy.

The following describes reference pixels used according to the prediction mode.

In the case of the directional mode, reference pixels of the bottom left and left blocks (Ref_BL, Ref_L in FIG. 10) may be used for modes between horizontal and some diagonal modes (diagonal up right) (modes 2 to 17 in FIG. 4), reference pixels of the left block may be used for the horizontal mode, reference pixels of the left, top left, and top blocks (Ref_L, Ref_TL, Ref_T in FIG. 10) may be used for modes between horizontal and vertical modes (modes 19 to 49 in FIG. 4), reference pixels of the top block (Ref_L in FIG. 10) may be used for the vertical mode, and reference pixels of the top and top right blocks (Ref_T, Ref_TR in FIG. 10) may be used for modes between the vertical and some diagonal modes (Diagonal down left) (modes 51 to 66 in FIG. 4).

In addition, in the case of the non-directional mode, reference pixels located in one or more of the blocks of the bottom left, left, top left, top, and top right blocks (Ref_BL, Ref_L, Ref_TL, Ref_T, Ref_TR in FIG. 10) may be used. For example, it can be used for intra prediction in the form of various reference pixel combinations such as left, top, left+top, left+top+top left, left+top+top left+top right and bottom left, etc., and this may be determined according to the non-directional mode (DC, Planar, etc.). In the example to be described later, it is assumed that left+top blocks are used in the DC mode, and left+top+bottom left+top right blocks are used for prediction as a reference pixel in the planar mode.

In addition, in the case of a color copy mode, a reconstructed block (Ref_C in FIG. 10) of another color space can be used as a reference pixel. In the example described later, a case where a block corresponding to the current block is used for prediction as reference pixels will be described.

In this case, reference pixels used for intra prediction may be classified into a plurality of concepts (or units). For example, reference pixels used for intra prediction may be classified into one or more categories, such as a first reference pixel and a second reference pixel. For convenience of explanation, it is divided into a first reference pixel and a second reference pixel, but it may be understood that other additional reference pixel is also supported.

Here, the first reference pixel may be a pixel used directly for generating prediction values of a current block, and the second reference pixel may be a pixel used indirectly for generating prediction values of the current block. Alternatively, the first reference pixel may be a pixel used to generate prediction values of all pixels in the current block, and the second reference pixel may be a pixel used to generate prediction values of some pixels in the current block. Alternatively, the first reference pixel may be a pixel used to generate the first prediction value of the current block, and the second reference pixel may be a pixel used to generate the second prediction value of the current block. Alternatively, the first reference pixel may be a pixel positioned based on the start point (or origin) of the prediction direction of the current block, and the second reference pixel may be a pixel positioned regardless of the prediction direction of the current block.

As described above, performing prediction using the second reference pixel may be referred to as a prediction block (or correction) process. That is, a prediction block correction unit may be added to the prediction block generation unit of the present invention.

In this case, the reference pixels used in the prediction block generation unit and the prediction block correction unit are not limited to the first and second reference pixels in each configuration. That is, the prediction block generation unit may perform prediction using the first reference pixel or using the first reference pixel and the second reference pixel. And the prediction block correction unit may perform prediction (or correction) using the second reference pixel or using the first reference pixel and the second reference pixel. In the present invention, for convenience of description, it is necessary to understand that it is explained by dividing into a plurality of pixels.

In the intra prediction of the present invention, it is possible not only to perform prediction using the first reference pixel, but also to perform prediction (i.e., performing correction) using the second reference pixel, which may be determined according to the encoding/decoding setting. First, information about whether the second reference pixel is supported (i.e., whether prediction value correction is supported) may be generated in units such as a sequence, picture, slice, tile, etc., Also, even if it is determined that the second reference pixel is explicitly or implicitly supported, whether it is supported for all blocks or for some blocks, and detailed settings related to the second reference pixel in the supported block (refer to the following description for related contents), etc. may be determined based on the encoding/decoding setting defined according to the image type, color component, size/shape/position of the block, the horizontal/vertical length ratio of the block, the encoding mode, the intra prediction mode, the restricted intra prediction setting, etc., Alternatively, related setting information may be explicitly determined in units such as a sequence, picture, slice, tile, etc.

Here, the number of first and second reference pixels used for the prediction value of one pixel may be m and n, respectively, and m and n have a pixel number ratio of (1:1), (1:2 or more), (2 or more: 1), (2 or more: 2 or more). It may be determined according to the prediction mode, the size/shape/position of the current block, the pixel position, etc., That is, m may be an integer of 1 or more, such as 1, 2, 3, etc., and n may be an integer of 1 or more, such as 1, 2, 3, 4, 5, 8, etc.

When the weights applied to the first and second reference pixels (assuming that one pixel is used in this example each) are p and q, p may be greater than or equal to q, and p may have a positive value. q may have a positive or negative value.

In the following, a case where a prediction block is generated using a first reference pixel and a second reference pixel is additionally used together to perform prediction will be described.

For example, (refer to FIG. 10) in the diagonal up right direction mode, prediction may be performed using <Ref_BL+Ref_L> blocks or <Ref_BL+Ref_L+Ref_T+Ref_TR> blocks. Also, in the horizontal mode, prediction may be performed using a Ref_L block or <Ref_L+Ref_T+Ref_TL> blocks. In addition, in the diagonal down right direction mode, prediction may be performed using <Ref_TL+Ref_T+Ref_L> blocks or <Ref_TL+Ref_T+Ref_L+Ref_TR+Ref_BL> blocks. Further, in the vertical mode, prediction may be performed using a Ref_T block or <Ref_T+Ref_L+Ref_TL> blocks. Also, in the diagonal down left direction mode, prediction may be performed using <Ref_TR+Ref_T> blocks or <Ref_TR+Ref_T+Ref_L+Ref_BL> blocks.

As another example, the DC mode may perform prediction using <Ref_T+Ref_L> blocks or <Ref_T+Ref_L+Ref_TL+Ref_TR+Ref_BL> blocks. In addition, in the Planar mode, prediction may be performed using <Ref_T+Ref_L+Ref_TR+Ref_BL> blocks or <Ref_T+Ref_L+Ref_TR+Ref_BL+Ref_TL> blocks.

In addition, the color copy mode may perform prediction using a Ref_C block or <Ref_C+(Ref_T or Ref_L or Ref_TL or Ref_TR or Ref_BL)> blocks. Alternatively, prediction may be performed using the <Ref_C+ (Def_T or Def_B or Def_L or Def_R or Def_TL or Def_TR or Def_BL or Def_BR)> blocks. Here, Def is not shown in FIG. 10, but is a term used to refer to a block adjacent to Ref_C (block corresponding to the current block), and Def_T to Def_BR may be adjacent blocks in top, bottom, left, right, top-left, top-right, bottom-left, bottom-right directions. That is, in the color copy mode, prediction may be performed using the Ref_C block, a reference pixel adjacent to a current block or a reference pixel adjacent to Ref_C (a corresponding block).

The above examples show some examples of performing prediction using a first reference pixel or performing prediction using a first reference pixel and a second reference pixel, but are not limited thereto, and various examples of modifications may be possible.

Generating or correcting a prediction block using a plurality of reference pixels may be performed for the purpose of compensating for a disadvantage of an existing prediction mode.

For example, in the case of the directional mode, it may be a mode supported for the purpose of increasing the accuracy of prediction by assuming that there is an edge in a specific direction of the current block. However, as only the reference pixels located at the starting point of the prediction direction may not accurately reflect the change in the block, the accuracy of the prediction may be decreased. Alternatively, in the case of the color copy mode, it is intended to perform prediction by reflecting correlation information from other color images at the same time, but the deterioration at the boundary of a block in another color image may be reflected, so the accuracy of prediction may be decreased. In order to solve the above problem, a second reference pixel may be additionally used to improve prediction accuracy.

Next, a case of performing prediction using a plurality of reference pixels in a color copy mode will be described. Parts not described in the drawings of examples to be described later may be derived with reference to FIG. 10. Here, it is assumed that the process of obtaining the correlation information in the color copy mode may be performed in a previous process or in a later process, and the explanation focuses on the conceptual part. In addition, the intra prediction in a color copy mode to be described later may be applied in the same or similar manner to other intra prediction mode, except for obtaining a prediction value from another color space.

Figure 15:
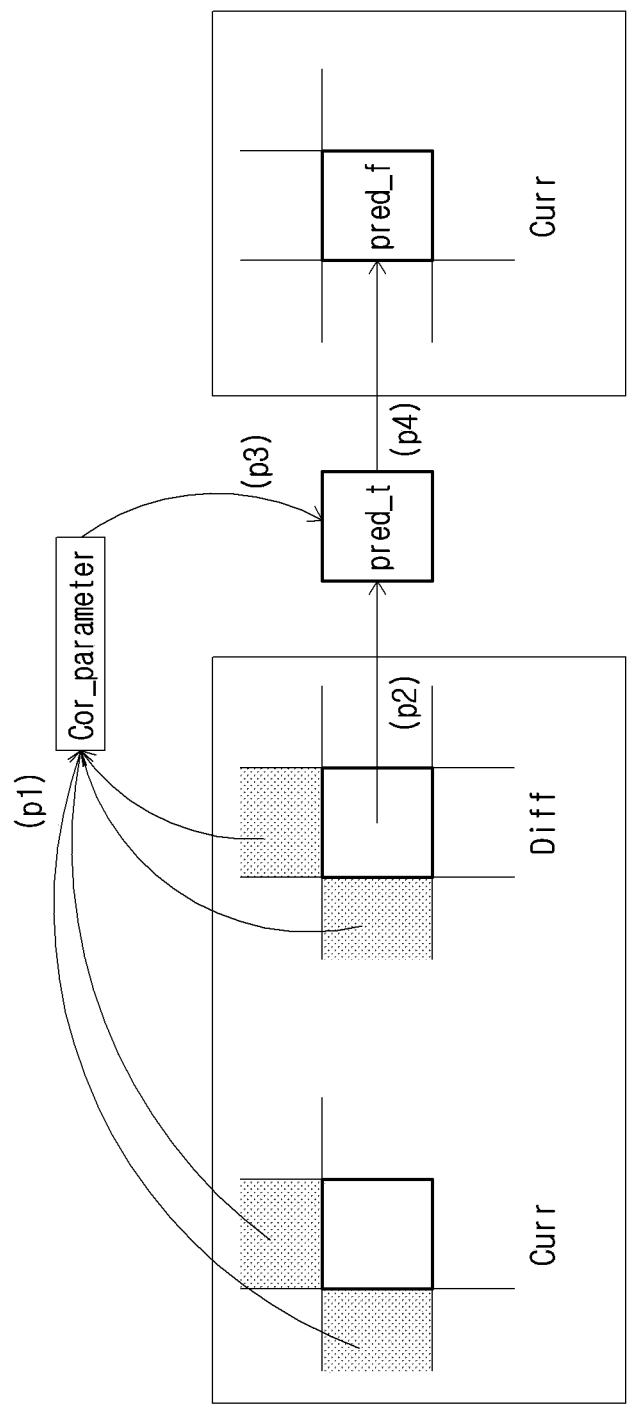
FIG. 15 is an exemplary diagram for explaining prediction in a color copy mode according to an embodiment of the present invention.

FIG. 15 is an exemplary diagram for explaining prediction in a color copy mode according to an embodiment of the present invention. Referring to FIG. 15, a prediction block may be generated using the reference pixel of a corresponding block in a color copy mode.

In detail, correlation information may be obtained from an adjacent region (designated by a color copy mode) of each of the current block and the corresponding block (p1). In addition, a prediction block (pred_t) may be obtained by obtaining data from the corresponding block (p2) and applying the previously obtained correlation information (p3). This may be compensated (p4) with the prediction block (pred_f) of the current block.

Since the above example may be derived a related description in the above-described color copy mode, a detailed description will be omitted.

Figure 16:
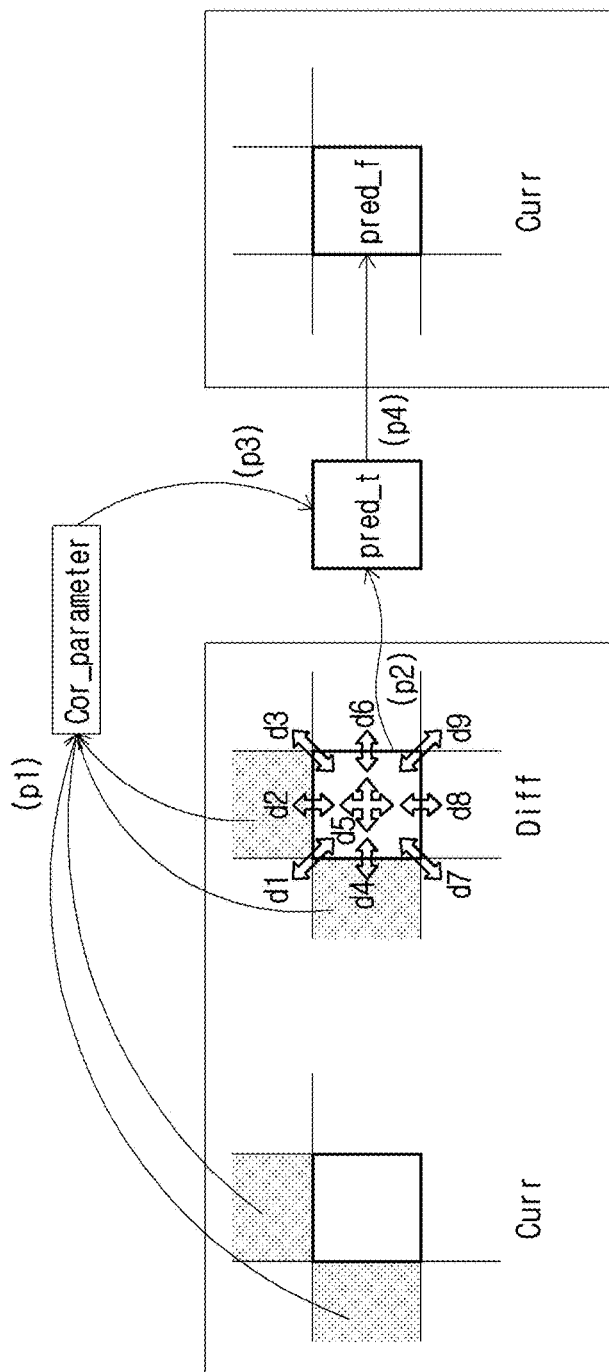
FIG. 16 is an exemplary diagram for explaining prediction in a color copy mode according to an embodiment of the present invention.

FIG. 16 is an exemplary diagram for explaining prediction in a color copy mode according to an embodiment of the present invention. Referring to FIG. 16, in a color copy mode, a prediction block may be generated and corrected using a corresponding block and a reference pixel adjacent thereto.

In detail, correlation information may be obtained from an adjacent region of each of the current block and the corresponding block (p1). In addition, correction may be performed on data of the corresponding block. In this case, the correction may be limited inside the corresponding block (d5), or may be limited to a block boundary adjacent to the corresponding block (d1 to d9 excluding d5), or may be performed across the inner and outer boundary of the corresponding block (d1 To d9). That is, data of a corresponding block and an adjacent region of the corresponding block may be used for correction. In this case, the outer boundary on which the correction is performed may be one or more (all can be included) of top, bottom, left, right, top-left, top-right, bottom-left, or bottom-right directions (d1 to d9, respectively, excluding d5).

In addition, a prediction block (pred_t) may be obtained by obtaining data (p2) through a correction process of a corresponding block and applying the previously obtained correlation information (p3). This may be compensated (p4) with the prediction block (pred_f) of the current block.

Figure 17:
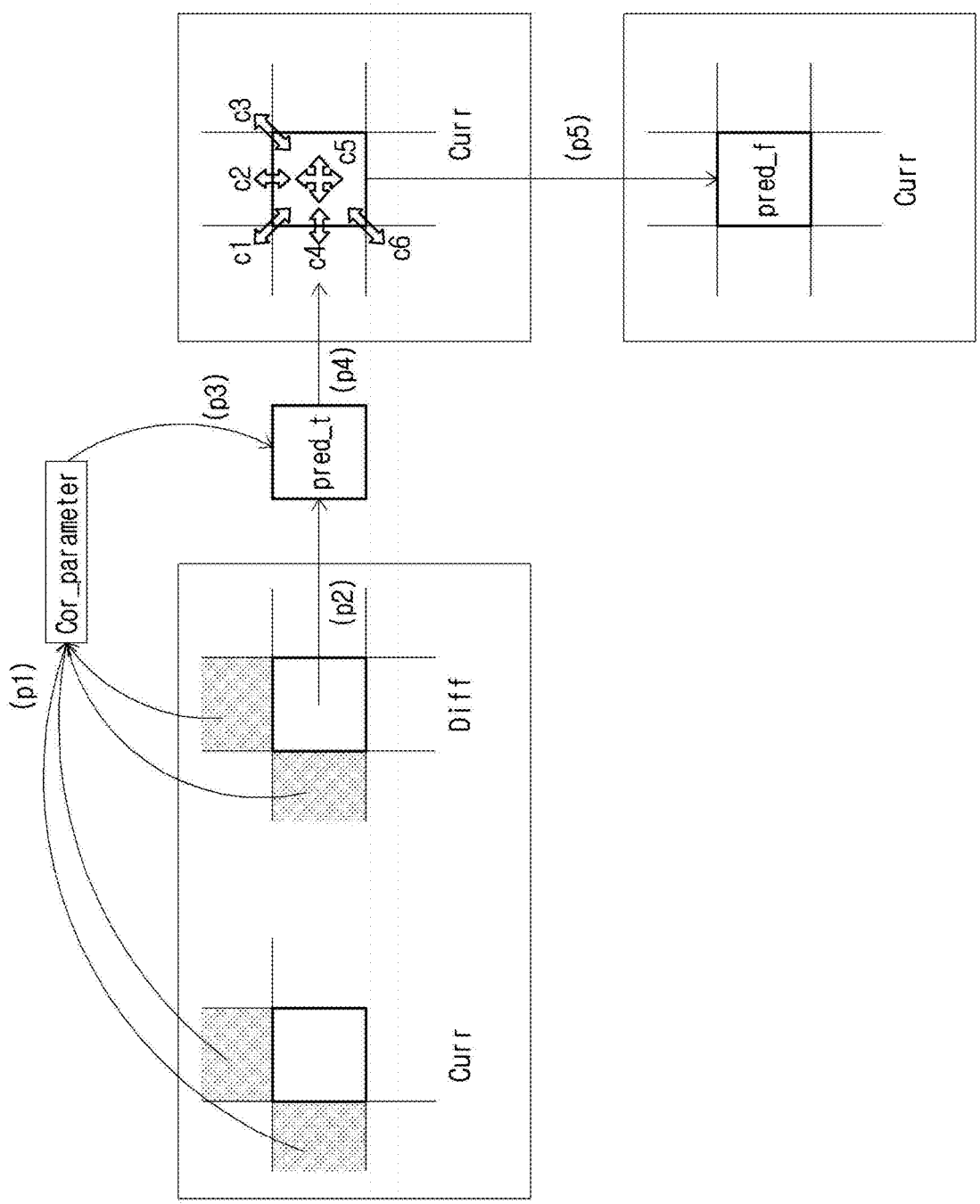
FIG. 17 is an exemplary diagram for explaining prediction in a color copy mode according to an embodiment of the present invention.

FIG. 17 is an exemplary diagram for explaining prediction in a color copy mode according to an embodiment of the present invention. Referring to FIG. 17, in a color copy mode, a prediction block may be generated and corrected using reference pixels adjacent to a corresponding block and the current block.

In detail, correlation information may be obtained from an adjacent region of each of the current block and the corresponding block (p1). In addition, a prediction block (pred_t) may be obtained by obtaining data from the corresponding block (p2) and applying the previously obtained correlation information (p3). This may be compensated with the first prediction block of the current block (p4), and correction may be performed on the first prediction block (referred to as a prediction block). In this case, the correction may be limited inside the prediction block (c5), or may be limited to a block boundary adjacent to the prediction block (c1 to c6 excluding c5), or may be performed across the inner and outer boundary of the prediction block (c1 to c6). That is, data of the prediction block (that is, data based on the corresponding block. Here, the expression of 'based on' is used because correlation information is applied) and data adjacent to the prediction block (data in the region adjacent to the current block) may be used for correction. In this case, the outer boundary on which the correction is performed may be one or more (all can be included) of top, left, top-left, top-right, and bottom-left directions (each c1 to c6, but excluding c5).

The data obtained through the correction process of the prediction block may be compensated (p5) with the (secondary or final) prediction block (pred_f) of the current block.

Figure 18:
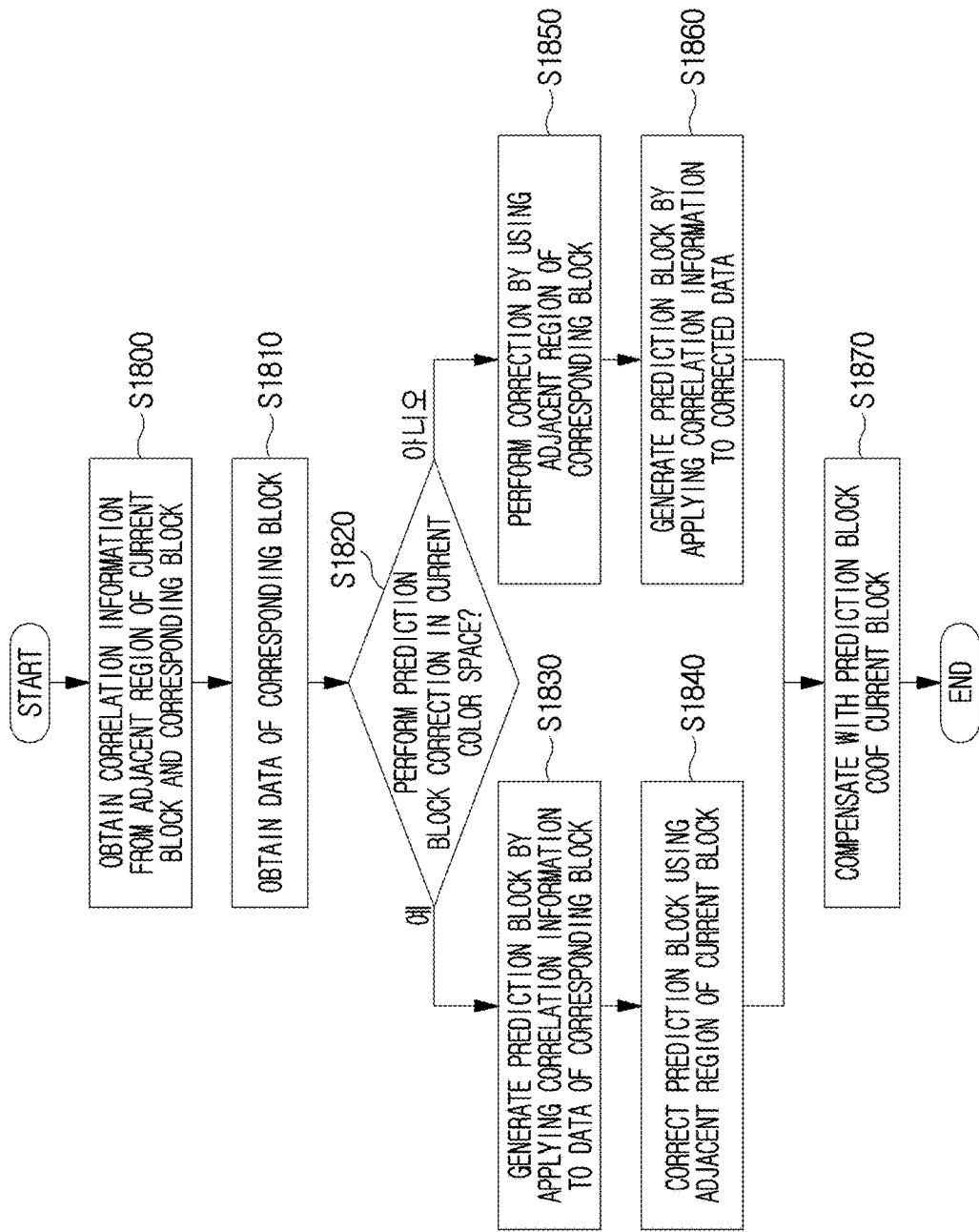
FIG. 18 is a flowchart of a process of performing correction in a color copy mode according to an embodiment of the present invention.

FIG. 18 is a flowchart of a process of performing correction in a color copy mode according to an embodiment of the present invention. In detail, a process of performing correction by selecting one of the correction processes described with reference to FIGS. 16 and 17 is shown.

Referring to FIG. 18, correlation information may be obtained from an adjacent region of the current block and the corresponding block (S1800). In addition, data of a corresponding block may be obtained (S1810). The following description assumes that it is implicitly or explicitly determined that correction of the prediction block is performed. It is possible to check whether to perform the prediction block correction in the current color space or the prediction block correction in another color space (S1820).

If the prediction block is corrected in the current color space, the prediction block may be generated by applying correlation information to data of the corresponding block (S1830). This may be the same as a process of a general color copy mode. In addition, the prediction block may be corrected using a region adjacent to the current block (S1840). In this case, not only an adjacent region of the current block, but also obtained data inside the prediction block may be used.

If a prediction block is corrected in a different color space, the corresponding block may be corrected using an adjacent region of the corresponding block (S1850). In this case, not only an adjacent region of the corresponding block, but also data inside the corresponding block may be used. In addition, a prediction block may be generated by applying the correlation information to the corrected corresponding block (S1860).

The data obtained through the above process may be compensated with the prediction block of the current block (S1870).

The application examples of FIGS. 16 and 17 are not incompatible due to the classification according to the color space in the above example. That is, it may be possible to mix the application examples of FIGS. 16 and 17. For example, a prediction block of the current block may be obtained through a correction process of a corresponding block as shown in FIG. 16, and a final prediction block may be obtained through a correction process of the obtained prediction block as shown in FIG. 17.

Performing correction in the intra prediction of the present invention may mean applying filtering to a pixel to be corrected and other pixels (adjacent pixels in this example). In this case, the filtering may be performed according to one pre-set filtering setting, or one of a plurality of filtering settings. Here, the filtering setting may be content included in the detailed setting related to the second reference pixel described above.

The filtering setting includes whether or not filtering is applied, and may include a filter type, a filter coefficient, a pixel position used for the filter, and the like. Here, the unit to which the filtering setting is applied may be a block or pixel unit. Here, the encoding/decoding setting may be defined according to the image type, color component, color format (i.e., composition ratio between color components), encoding mode (Intra/Inter), size/shape/position of a block, width/vertical length ratio of a block, pixel position within a block, the intra prediction mode, the restricted intra prediction and the like, and may be used for the filtering setting. Here, the block is described assuming the current block, but may be understood as a concept including a block adjacent to the current block or a block adjacent to a corresponding block in the color copy mode. In other words, it means that the status information of the current block and other blocks may be used as input variables for filtering settings. In addition, information on filtering settings may be explicitly included in units such as a sequence, a picture, a slice, a tile, and a block.

The following describes the filter type among the filtering setting. Filtering may be applied (i.e., one-dimensional) to adjacent pixels of the correction target pixel on one of horizontal, vertical, or diagonal lines. Alternatively, filtering may be applied (i.e., two-dimensional) to spatially adjacent pixels of the correction target pixel in the left, right, top, bottom, top-left, top-right, bottom-left, and bottom-right directions. In other words, filtering may be applied to pixels adjacent to the correction target pixel within M×N. In an example to be described later, it is assumed that both M and N are 3 or less, but M or N may have a value greater than 3. In general, the adjacent pixels may have a symmetrical shape or an asymmetrical shape around the correction target pixel.

FIGS. 19A-19G are exemplary diagrams for explaining the filter type applied to a correction target pixel according to an exemplary embodiment of the present invention. In detail, an example of a case in which a filter is applied symmetrically around the correction target pixel (a thick line in the drawing) is shown.

Referring to FIGS. 19A-19G, FIGS. 19A and 19B denote a 3-tap filter in horizontal and vertical directions. In addition, FIGS. 19C and 19D denote a 3-tap filter in a diagonal direction (angles inclined by −45 and +45 degrees with respect to the vertical line). In addition, FIGS. 19E and 19F denote a 5-tap filter having a (+) or (x) shape. In addition, FIG. 19G denotes a square 9-tap filter.

As an example of applying filtering, FIG. 19A to 19G may be applied to the inside or outside (or boundary) of the block.

Figure 19A:
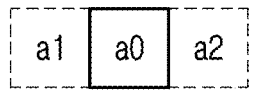
FIGS. 19A-19G are exemplary diagrams for explaining the filter type applied to a correction target pixel according to an exemplary embodiment of the present invention.
Figure 19B:
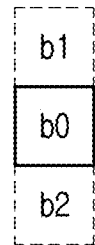
Figure 19C:
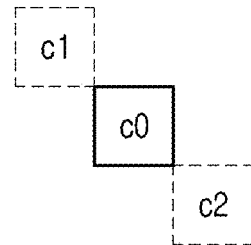
Figure 19D:
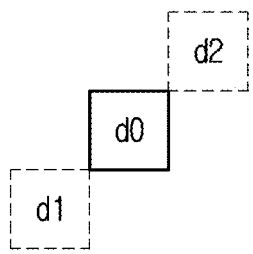
Figure 19E:
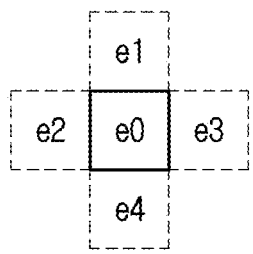
Figure 19F:
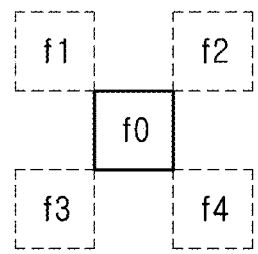
Figure 19G:
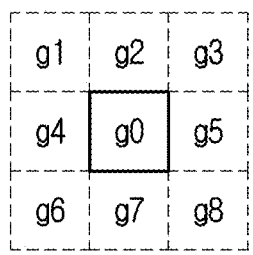

As another example, FIG. 19E to 19G may be applied inside the block. Alternatively, FIG. 19A to 19D may be applied to the boundary of the block. In detail, FIG. 19A may be applied at the left boundary of the block and FIG. 19B may be applied at the top boundary of the block. FIG. 19C may be applied at the top-left boundary of the block, and FIG. 19D may be applied at the top-right and bottom-left boundaries of the block.

The above examples are some cases of selecting a filter based on the position of a correction target pixel, but is not limited thereto and various application examples including an opposite case may be possible.

FIGS. 20A-20J are exemplary diagrams for explaining the filter type applied to a correction target pixel according to an embodiment of the present invention. In detail, an example of a case in which a filter is applied asymmetrically around the correction target pixel is shown.

Figure 20A:
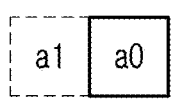
FIGS. 20A-20J are exemplary diagrams for explaining the filter type applied to a correction target pixel according to an embodiment of the present invention.
Figure 20B:
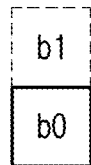
Figure 20C:
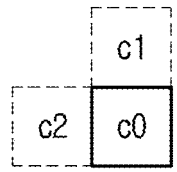
Figure 20D:
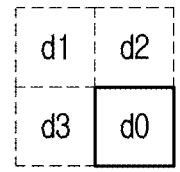
Figure 20E:
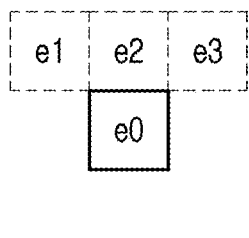
Figure 20F:
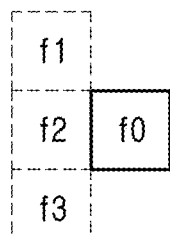
Figure 20G:
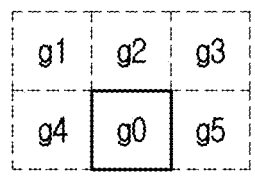
Figure 20H:
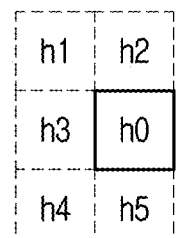
Figure 20I:
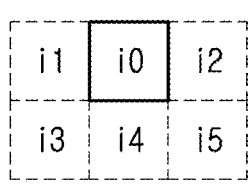

Referring to FIGS. 20A-20J, FIGS. 20A and 20B denote a 2-tap filter using only a left pixel and a top pixel, respectively, and FIG. 20C denote a 3-tap filter using left and top pixels. FIG. 20D to 20F denote a 4-tap filter in a top-left direction, a top direction, and a left direction, respectively. FIG. 20G to 20J denote a 6-tap filter in the top, left and right directions, the top, left and bottom directions, the bottom, left and right directions and the top, bottom and right directions, respectively.

As an example of applying filtering, FIG. 20A to 20J may be applied to the inside or outside of the block.

As another example, FIG. 20G to 20J may be applied inside the block. Alternatively, FIG. 20A to 20F may be applied to the boundary of the block. In detail, FIG. 20A to 20F may be applied at the left boundary of the block, and FIG. 20B to 20E may be applied at the top boundary of the block. FIG. 20C to 20D may be applied at the top-left boundary of the block.

The above examples are some cases of selecting a filter based on the position of a correction target pixel, but is not limited thereto and various application examples including an opposite case may be possible.

Figure 20J:
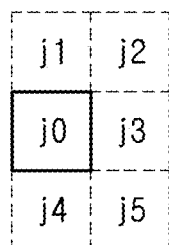

The filter coefficients of FIGS. 19 to 20J may be variously set. For example, in case of a 2-tap filter, weights of 1:1 or 1:3 ratio (where 1 and 3 are the weights for the correction target pixel) may be applied. In case of a 3-tap filter, weights of 1:1:2 ratio (where 2 is the weight for the correction target pixel) may be applied. In the case of a 4-tap filter, weights of 1:1:1:5 or 1:1:2:4 ratio (where 4 and 5 are the weights for the correction target pixel) may be applied. In the case of a 5-tap filter, weights of 1:1:1:1:4 ratio (where 4 is the weight for the correction target pixel) may be applied. In case of a 6-tap filter, weights of 1:1:1:1:2:2 ratio (where 2 is the weight for the correction target pixel) may be applied. In case of a 9-tap filter, weights of 1:1:1:1:1:1:1:1:8 or 1:1:1:1:2:2:2:2:4 ratio (Here, 8 and 4 is the weight for the correction target pixel) may be applied. In the above example, the pixel to which the largest weight is applied among the remaining weights excluding the weight for the correction target pixel may be a pixel that has a short distance to the correction target pixel (adjacent to the vertical or horizontal direction), or a pixel located at the center such as the correction target pixel in a symmetric structure. The above examples are merely only some cases regarding weight setting, but are not limited to thereto and various examples of modifications may be possible.

A filter used for correction may be implicitly determined according to an encoding/decoding setting, or may be explicitly included in units such as a sequence, a picture, a slice, or a tile. Here, the description for defining the encoding/decoding setting may be derived from the above-described various examples of the present invention.

In this case, information indicating whether a plurality of filters is supported may be generated in the unit. If a plurality of filters are not supported, a pre-set filter may be used, and if a plurality of filters are supported, filter selection information may be additionally generated. In this case, the filter shown in FIGS. 19 to 20J or other filters may be included in the candidate group.

Next, it is assumed that correction is performed in a different color space as shown in FIG. 16, and for this purpose, FIG. 10 is referred to (i.e., the correction target block is Ref_C). In an example to be described later, it is assumed that a filter used for a block is determined through a previous process, and the filter is applied to all or most of the pixels of the block.

A batch filter is supported based on state information of a region adjacent to the correction target block, but an adaptive filter based on a position of a correction target pixel may also be supported.

For example, a 5-tap filter (FIG. 19E) may be applied to aa to pp of Ref_C around a correction target pixel. In this case, the same filter may be applied regardless of the position of the correction target pixel. In addition, the region adjacent to the block on which the correction is performed may have no restrictions on applying filtering.

Alternatively, a 5-tap filter may be applied to ff, gg, jj, and kk of Ref_C (i.e., inside a block) around the correction target pixel, and the filtering may be applied for other pixels (the boundary of the block) based on the state of the adjacent block. In detail, when it is determined that the pixel is not available, such as the left block of Ref_C is located outside the picture or the encoding mode is an inter mode (i.e., when the restricted intra prediction setting is activated), a filter in a vertical direction (e.g., FIG. 19B) may be applied to aa, ee, ii, and mm of Ref_C. Alternatively, when the top block of Ref_C is unavailable, a filter in a horizontal direction (e.g., FIG. 19A) may be applied to aa to dd of Ref_C. The availability of the pixel may be determined as described in the part to determine the availability of the reference pixel of the present invention.

A batch filter is supported based on the intra prediction mode, but an adaptive filter based on the position of a correction target pixel may also be supported.

For example, in a mode of obtaining correlation information from left and top blocks among the color copy modes, a 9-tap filter (FIG. 19G) may be applied to aa to pp of Ref_C. In this case, the same filter may be applied regardless of the position of the correction target pixel.

Alternatively, in a mode of obtaining correlation information from the left and bottom-left blocks among the color copy modes, a 9-tap filter may be applied to ee to pp of Ref_C, and a filtering may be applied for other pixels (top boundary) based on the prediction mode setting. In this example, since correlation information is obtained from the left and bottom-left blocks, it is possible to estimate that the correlation with the top block will be low. Therefore, a filter in the bottom, left, and right directions (e.g., FIG. 20I) may be applied to aa to dd of Ref_C.

In the present invention, the color copy mode of some color formats (4:4:4) is mainly described. Depending on the color format, there may be differences in detailed configurations related to correction. In this example, it is assumed that correction is performed in a different color space.

In the color copy mode, correlation information and prediction values are obtained directly from the corresponding pixel because one pixel of the current color space corresponds to one pixel of another color space in some color formats (4:4:4).

On the other hand, in some color formats (4:2:0), one pixel of the current color space corresponds to one or more pixels (four in this example) of another color space. If one pre-set pixel is selected and related data is not obtained from the pixel, a down-sampling process of obtaining related data from a plurality of corresponding pixels may be required.

The following describes the process of predicting and correcting under the color copy mode according to each color format. In an example to be described later, it is assumed that a down-sampling process is performed for some formats (4:2:0). In addition, blocks corresponding to the current block are referred to as blocks A and B, respectively.

<1> Intra prediction in 4:4:4 format
<1-1> obtaining a pixel value in an adjacent region of block A
<1-2> obtaining a pixel value corresponding to the pixel of <1-1> from an adjacent region of block B
<1-3> obtaining correlation information based on a pixel value of the adjacent region in each color space
<1-4> extracting a pixel of block B and a pixel adjacent thereto
<1-5> block B correction by applying filtering to the pixels of <1-4>
<1-6> obtaining a pixel value of block B (M×N) corresponding to a pixel of block A (M×N)
<1-7> generating a prediction pixel by applying correlation information to a pixel value of <1-6>
<2> Intra prediction in 4:2:0 format (1)
<2-1> obtaining a pixel value in an adjacent region of block A
<2-2> extracting a pixel corresponding to the pixel of <2-1> and a pixel adjacent thereto from the adjacent region of block B
<2-3> applying down-sampling to the pixel of <2-2> to obtain a pixel value corresponding to the pixel of <2-1> in the adjacent region of the block B
<2-4> obtaining correlation information based on a pixel value of the adjacent region in each color space
<2-5> extracting a pixel of block B and a pixel adjacent thereto
<2-6> block B correction by applying filtering to the pixel of <2-5>
<2-7> extracting a pixel of block B (2M×2N) corresponding to the pixel of block A (M×N) and a pixel adjacent thereto
<2-8> applying down-sampling to the pixel of <2-7> to obtain the pixel value of block B
<2-9> generating a prediction pixel by applying correlation information to the pixel value of <2-8>

Referring to the processes of <1> and <2>, in <1>, one filtering is applied in <1-5>, whereas in <2>, multiple filtering is applied in <2-6> and <2-8>. <2-6> may be a process for correcting data used to obtain the prediction pixel, and <2-8> may be a down-sampling process for obtaining the prediction pixel, and the filter in each process is also configured differently. Of course, encoding performance may be improved due to each process, but redundant filtering effects may appear. In addition, the increase in complexity due to an increase in the number of filtering may not be suitable for some profiles. For this, in some color formats, it may be necessary to support filtering that integrates them.

<3> Intra prediction in 4:2:0 format (2)
<3-1> obtaining a pixel value in an adjacent region of block A
<3-2> extracting a pixel corresponding to the pixel of <3-1> and a pixel adjacent thereto from the adjacent region of block B
<3-3> applying down-sampling to the pixels of <3-2> to obtain a pixel value corresponding to the pixel of <3-1> in the adjacent region of block B
<3-4> obtaining correlation information based on a pixel value of an adjacent region in each color space
<3-5> extracting a pixel of block B and pixels adjacent thereto
<3-6> block B correction by applying filtering to the pixel of <3-5>
<3-7> obtaining a pixel value of block B (2M×2N) corresponding to a pixel of block A (M×N)
<3-8> generating a prediction pixel by applying correlation information to a pixel value of <3-7>
<4> Intra prediction in 4:2:0 format (3)
<4-1> obtaining a pixel value in an adjacent region of block A
<4-2> extracting a pixel corresponding to the pixel of <4-1> and a pixel adjacent thereto from the adjacent region of block B
<4-3> applying down-sampling to the pixels of <4-2> to obtain a pixel value corresponding to the pixel of <4-1> in the adjacent region of the block B
<4-4> obtaining correlation information based on a pixel value of the adjacent region in each color space
<4-5> extracting a pixel of block B (2M×2N) corresponding to the pixel of block A (M×N) and pixels adjacent thereto
<4-6> applying down-sampling to the pixels of <4-5> to obtain a pixel value of block B
<4-7> generating a prediction pixel by applying correlation information to the pixel value of <4-6>

Referring to the process of <3>, the down-sampling process of the block B is omitted, and the correlation information is applied to one pixel at a pre-set position. Instead, since the correction process is performed, an effect of eliminating the disadvantages in the down-sampling process may occur.

On the other hand, referring to the process of <4>, the correction process is omitted and the down-sampling process of the block B is performed. Instead, it is possible to use a filter that can produce correction effects during the down-sampling process. Although the correction process may be modified to a configuration included in the down-sampling, the above-described setting in the correction process may be applied as it is. That is, filter selection information for down-sampling may be explicitly determined in an high unit or may be implicitly determined according to encoding/decoding settings. Also, whether to perform down-sampling using only data of the block B, or whether to perform down-sampling by using data of the block B and data in one or more of left, right, top, bottom, top-left, top-right, bottom-left, and bottom-right directions may be determined implicitly or explicitly.

The prediction mode determination unit performs a process for selecting an optimal mode among a plurality of prediction mode candidate groups. In general, it is possible to determine an optimal mode in terms of encoding cost by using a rate-distortion technique that considers distortion of a block {for example, distortion of a current block and a reconstructed block. SAD (Sum of Absolute Difference), SSD (Sum of Square Difference), etc.} and the amount of bits generated according to a corresponding mode. A prediction block generated based on the prediction mode determined through the above process may be transmitted to the subtraction unit and the addition unit.

In order to determine an optimal prediction mode, all prediction modes existing in prediction mode candidate groups may be searched, or the optimal prediction mode may be selected through another decision process for the purpose of reducing computational quantity/complexity. For example, in the first step, some modes having good performance in terms of image quality deterioration are selected for all of the candidates of an intra prediction mode, and in the second step, an optimal prediction mode may be selected by considering not only image quality deterioration but also the amount of bits generated for the mode selected in the first step. In addition to the above methods, various methods of reducing computational quantity/complexity may be applied.

In addition, the prediction mode determining unit may be a configuration generally included only in an encoder, but may also be a configuration included in a decoder according to encoding/decoding settings. For example, in the latter case, where template matching is included as a prediction method or a method of deriving an intra prediction mode in an adjacent region of a current block, a method of implicitly acquiring a prediction mode in a decoder is used.

The prediction mode encoding unit may encode the prediction mode selected through the prediction mode determination unit. In a prediction mode candidate group, index information corresponding to the prediction mode may be encoded, or information on the prediction mode may be encoded by predicting the prediction mode. The former may be a method applied to a luminance component, and the latter may be a method applied to a chrominance component, but is not limited thereto.

When a prediction mode is predicted and encoded, a prediction value (or prediction information) of the prediction mode may be referred to as Most Probable Mode (MPM). The MPM may be configured in one prediction mode or may be configured in a plurality of prediction modes, and the number of MPMs (k. k is an integer greater than or equal to 1, such as 2, 3, 6.) may be determined according to the number of prediction mode candidate groups. When the MPM is configured with a plurality of prediction modes, it may be referred to as an MPM candidate group.

MPM is a concept supported to efficiently encode a prediction mode. In fact, a candidate group may be configured as a prediction mode having a high probability of being generated as a prediction mode of a current block.

For example, a MPM candidate group may be configured with a preset prediction mode (or statistically frequent prediction modes. DC, Planar, Vertical, Horizontal, and some diagonal modes, etc.), a prediction mode of adjacent blocks (Left, top, top left, top right, bottom left blocks, etc.), and the like. In this case, the prediction mode of adjacent blocks may be obtained from L0 to L3 (left block), T0 to T3 (top block), TL (top left block), R0 to R3 (top right block), and B0 to B3 (bottom left block) in FIG. 10.

If an MPM candidate group can be configured from two or more sub-block positions (for example, L0, L2, etc.) in an adjacent block (for example, left block), a prediction mode of a corresponding block may be configured in a candidate group according to a predefined priority (for example, L0-L1-L2, etc.). Alternatively, if a MPM candidate group cannot be configured from two or more sub-block positions, a prediction mode of a sub-block corresponding to a predefined position (for example, L0, etc.) may be configured in a candidate group. Specifically, among the adjacent blocks, a prediction mode of the L3, T3, TL, R0, and B0 positions may be selected as a prediction mode of an adjacent block and included in a MPM candidate group. The above description is a case in which a prediction mode of an adjacent block is configured in a candidate group, but is not limited thereto. In the example described below, it is assumed that a prediction mode of a predefined position is configured in a candidate group.

In addition, when one or more prediction modes are configured as an MPM candidate group, a mode derived from one or more included prediction modes may also be additionally configured as an MPM candidate group. Specifically, when the k mode (directional mode) is included in the MPM candidate group, a mode derivable from the mode (a mode having an interval of +a, −b based on k. a and b are integers equal to or greater than 1 such as 1, 2, 3) may be further included in the MPM candidate group.

Priority for configuring a MPM candidate group may exist, and a MPM candidate group may be configured in the order of a prediction mode of a neighboring block—a preset prediction mode—a derived prediction mode, and the like. The process of constructing the MPM candidate group can be completed by filling the maximum number of MPM candidates according to the priority. In the case of matching with the previously included prediction mode in the above process, the prediction mode may not be configured in the candidate group, and may include a redundancy check process in which the order is passed to the next priority candidate.

The following assumes that a MPM candidate group is composed of six prediction modes.

For example, a candidate group may be configured in the order of L-T-TL-TR-BL-Planar-DC-vertical-horizontal-diagonal mode. It may be a case that a prediction mode of an adjacent block is configured preferentially in a candidate group, and a predetermined prediction mode is additionally configured.

Alternatively, a candidate group may be configured in the order of L-T-Planar-DC-<L+1>-<-L-1>-<T+1>-<T-1>-vertical-horizontal-diagonal mode. It may be a case that some prediction modes of adjacent blocks and some predetermined prediction mode are configured preferentially, and a mode derived from the assumption that a prediction mode in a direction similar to a prediction mode of an adjacent block will occur and some of the preset prediction modes are configured additionally.

The above examples are some cases regarding the configuration of the MPM candidate group, it may not be limited thereto, and examples of various modifications may be possible.

A MPM candidate group may use binarization such as unary binarization and truncated rice binarization based on an index in the candidate group. That is, a mode bit can be expressed by allocating a short bit to a candidate having a small index and a long bit to a candidate having a large index.

Modes not included in a MPM candidate group may be classified as a non-MPM candidate group. In addition, the non-MPM candidate group may be classified into two or more candidate groups according to encoding/decoding settings.

The following is a premise that 67 modes including a directional mode and a non-directional mode exist in a prediction mode candidate group, and 6 MPM candidates are supported and 61 prediction modes are configured in a non-MPM candidate group.

When a non-MPM candidate group is configured as one, since a prediction mode that is not included in the MPM candidate group configuration process remains, an additional candidate group configuration process is not required. Therefore, based on the index in the non-MPM candidate group, binarization such as fixed length binarization and truncated unary binarization can be used.

Assuming that a non-MPM candidate group is composed of two or more candidate groups, in this example, the non-MPM candidate group is classified into non-MPM_A (hereinafter, A candidate group) and non-MPM_B (hereinafter, B candidate group). It is assumed that A candidate group (p. equal to or more than the number of MPM candidate groups) constitutes a candidate group with a prediction mode that is more likely to occur as a prediction mode of the current block than a candidate B group (q. equal to or more than the number of the A candidate group). In this case, the process of configuring the candidate A group may be added.

For example, some prediction modes (for example, mode 2, 4, 6, etc.) having equal intervals among directional modes, or a predetermined prediction mode (For example, a mode derived from a prediction mode included in a MPM candidate group, etc.), may be configured in the A candidate group. The remaining prediction modes through the MPM candidate group configuration and the A candidate group configuration may be composed of a B candidate group, and an additional candidate group configuration process is not required. Binarization such as fixed length binarization and truncated unary binarization may be used based on an index in the A and B candidate groups.

The above examples are some cases in which two or more non-MPM candidate groups are configured, it may not be limited thereto, and examples of various modifications may be possible.

The following shows a process for predicting and encoding a prediction mode.

Information (mpm_flag) on whether a prediction mode of a current block matches a MPM (or some modes in a MPM candidate group) may be checked.

When it matches the MPM, MPM index information (mpm_idx) may be additionally confirmed according to the configuration (1, or 2 or more) of the MPM. Thereafter, an encoding process of a current block is completed.

When it does not match MPM, if a non-MPM candidate group is configured as one, non-MPM index information (remaining_idx) can be checked. Thereafter, the encoding process of the current block is completed.

If non-MPM candidate groups are configured in plural (two in this example), information (non_mpm_flag) on whether a prediction mode of a current block matches some prediction modes in an A candidate group can be checked.

If it matches the A candidate group, the A candidate group index information (non_mpm_A_idx) may be checked, and if it does not match the A candidate group, the B candidate group index information (remaining_idx) may be checked.

When the configuration of the prediction mode candidate group is fixed, a prediction mode supported by a current block, a prediction mode supported by an adjacent block, and a preset prediction mode may use the same prediction number index.

Meanwhile, when a configuration of a prediction mode candidate group is adaptive, a prediction mode supported by a current block, a prediction mode supported by an adjacent block, and a preset prediction mode may use the same prediction number index or different prediction number indexes. Refer to FIG. 4 for the following description.

In the prediction mode encoding process, a process of unifying (or adjusting) a prediction mode candidate group for configuring the MPM candidate group may be performed. For example, a prediction mode of a current block may be one of −5 to 61 mode prediction mode candidate groups, and an adjacent block prediction mode may be one of 2 to 66 mode prediction mode candidate groups. In this case, some the prediction modes of the adjacent block (mode 66) may be a mode that is not supported for the prediction mode of the current block, so a process of unifying it in the prediction mode encoding process may be performed. That is, it may be a process that is not required when a configuration of a fixed intra prediction mode candidate group is supported, and may be a process required when a configuration of an adaptive intra prediction mode candidate group is supported, and detailed description thereof will be omitted.

Unlike the method using the MPM, encoding may be performed by assigning an index to a prediction mode belonging to a prediction mode candidate group.

For example, if an index is assigned to a prediction mode according to a predefined priority and a prediction mode of a current block is selected, a method of encoding the index corresponds to this. This means that a prediction mode candidate group is fixedly configured and a fixed index is allocated to the prediction mode.

Alternatively, when the prediction mode candidate group is configured adaptively, the fixed index allocation method may not be suitable. To this end, an index is allocated to a prediction mode according to an adaptive priority, and when a prediction mode of a current block is selected, a method of encoding the corresponding index can be applied. This makes it possible to efficiently encode the prediction mode by changing the index assigned to the prediction mode due to the adaptive configuration of the prediction mode candidate group. That is, the adaptive priority may be to allocate a candidate that is likely to be selected as a prediction mode of a current block to an index in which a short mode bit occurs.

In the following, it is assumed that 8 prediction modes including a preset prediction mode (directional mode and non-directional mode) in the prediction mode candidate group, a color copy mode, and a color mode are supported (chrominance component).

For example, it is assumed that four preset prediction modes are supported among Planar, DC, horizontal, vertical, and diagonal modes (Diagonal down left in this example), and one color mode (C) and three color copy modes (CP1, CP2, CP3) are supported. The basic order of indexes allocated to a prediction mode may be given as a preset prediction mode—a color copy mode—a color mode, and the like.

In this case, the directional mode, the non-directional mode, and the color copy mode, which are preset prediction modes, can be easily classified into prediction modes in which prediction methods are distinguished. However, in the case of the color mode, it may be a directional mode or a non-directional mode, and there may be a possibility of overlapping with a preset prediction mode. For example, when the color mode is a vertical mode, a case may occur in which the vertical mode, which is one of the preset prediction modes, overlaps.

In the case of adaptively adjusting the number of prediction mode candidate groups according to encoding/decoding settings, the number of candidate groups may be adjusted (8→7) when the overlapping case occurs. Alternatively, if the number of prediction mode candidate groups is kept fixed, when the overlapping case occurs, an index may be allocated by adding and considering other candidates, which will be described later on the assumption of this setting. In addition, an adaptive prediction mode candidate group may be a supported configuration even when a variable mode such as a color mode is included. Therefore, when adaptive index allocation is performed, it can be regarded as an example of the configuration of the adaptive prediction mode candidate group.

The following describes a case where adaptive index allocation is performed according to a color mode. It is assumed that a basic index is allocated in the order of Planar (0)-Vertical(1)-Horizontal(2)-DC (3)-CP1 (4)-CP2 (5)-CP3 (6)-C(7). In addition, it is assumed that index allocation is performed in the above order when the color mode does not match a preset prediction mode.

For example, when a color mode matches one of preset prediction modes (Planar, Vertical, Horizontal, DC mode), the prediction mode matching the index 7 of the color mode is filled. The index of the matching prediction mode (one of 0 to 3) is filled with a preset prediction mode (Diagonal down left). Specifically, when a color mode is the horizontal mode, index allocation such as Planar (0)-Vertical(1)-Diagonal down left (2)-DC (3)-CP1 (4)-CP2 (5)-CP3 (6)-Horizontal(7) may be performed.

Alternatively, when a color mode matches one of preset prediction modes, the prediction mode matching the index 0 is filled. Then, the preset prediction mode (Diagonal down left) is filled in the index 7 of the color mode. In this case, if the filled prediction mode is not an existing index 0 (that is, not a planar mode), the existing index configuration may be adjusted. Specifically, when a color mode is DC mode, index allocation such as DC(0)-Planar (1)-Vertical(2)-Horizontal(3)-CP1 (4)-CP2 (5)-CP3 (6)-Diagonal down left (7) may be performed.

The above examples are some cases of adaptive index allocation, and are not limited thereto, and examples of various modifications may be possible. In addition, based on an index in a candidate group, fixed length binarization, unary binarization, truncated unary binarization, and truncated Rice binarization may be used.

In the following, another example of performing encoding by assigning an index to a prediction mode belonging to a prediction mode candidate group will be described.

For example, the method of classifying into a plurality of prediction mode candidate groups by dividing by a prediction mode, a prediction method, etc., and encoding by assigning an index to a prediction mode belonging to the candidate group for encoding corresponds thereto. In this case, candidate group selection information encoding may precede index encoding. As an example, a directional mode, a non-directional mode, and a color mode, which are prediction modes for performing prediction in the same color space, may belong to one candidate group (hereinafter, S candidate group), and a color copy mode, which is a prediction mode for performing prediction in another color space, may belong to one candidate group (hereinafter, D candidate group).

The following assumes that nine prediction modes including a preset prediction mode, a color copy mode, and a color mode are supported in a prediction mode candidate group (chrominance component).

For example, it is assumed that four preset prediction modes are supported among Planar, DC, horizontal, vertical, and diagonal modes, and one color mode (C) and four color copy modes (CP1, CP2, CP3, CP4) are supported. The S candidate group may have five candidates composed of a preset prediction mode and a color mode, and the D candidate group may have four candidates composed of a color copy mode.

The S candidate group is an example of an adaptively configured prediction mode candidate group, and an example of adaptive index allocation has been described above, so a detailed description thereof will be omitted. Since the D candidate group is an example of a fixedly configured prediction mode candidate group, a fixed index allocation method can be used. For example, index allocation such as CP1 (0)-CP2 (1)-CP3 (2)-CP4 (3) may be performed.

Based on the index in the candidate group, binarization such as fixed length binarization, unary binarization, truncated unary binarization, and truncated Rice binarization can be used. In addition, examples of various modifications may be possible without being limited to the above examples.

Prediction related information generated through the prediction mode encoding unit may be transmitted to the encoding unit and included in a bitstream.

In the image decoding method according to an embodiment of the present invention, intra prediction may be configured as follows. The intra prediction of the prediction unit may include a prediction mode decoding step, a reference pixel construction step, and a prediction block generation step. In addition, the image decoding apparatus may be configured to include a prediction mode decoding unit, a reference pixel configuration unit, and a prediction block generation unit that implement a prediction mode decoding step, a reference pixel configuration step, and a prediction block generation step. Some of the above-described processes may be omitted or other processes may be added, and it may be changed in an order other than the order described above.

Since the reference pixel construction unit and the prediction block generation unit of the image decoding apparatus perform the same role as the corresponding configurations of the image encoding apparatus, detailed descriptions are omitted. The prediction mode decoding unit may be performed using the method used by the prediction mode encoding unit in reverse.

Figure 21:
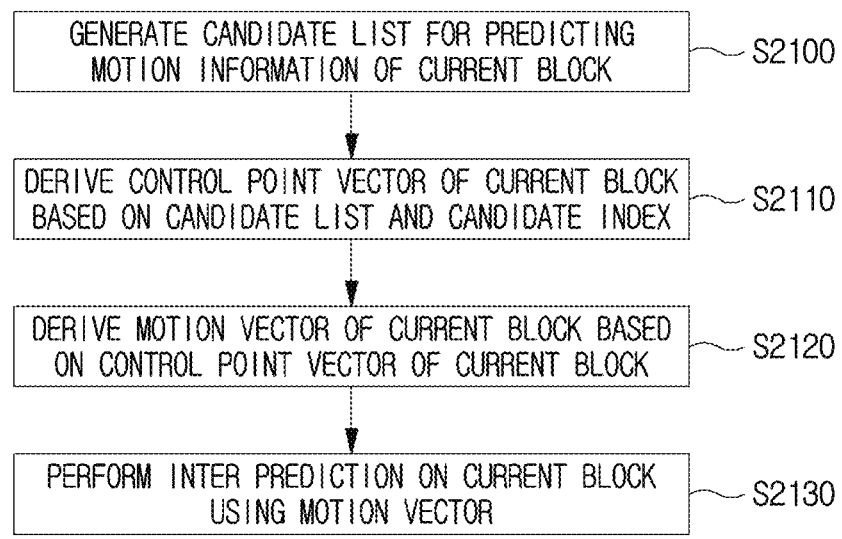
FIG. 21 illustrates an inter prediction method according to an embodiment to which the present invention is applied.

FIG. 21 illustrates an inter prediction method according to an embodiment to which the present invention is applied.

Referring to FIG. 21, a candidate list for predicting motion information of a current block may be generated (S2100).

The candidate list may include one or more affine model-based candidates (hereinafter referred to as affine candidate). The affine candidate may mean a candidate having a control point vector. The control point vector means a motion vector of a control point for an affine model, and may be defined for a corner position of a block (e.g., at least one of a top-left corner, a top-right corner, a bottom-left corner, or a bottom-right corner).

The affine candidate may include at least one of a spatial candidate, a temporal candidate, or a constructed candidate. Here, the spatial candidate may be derived from a vector of a neighboring block spatially adjacent to the current block, and the temporal candidate may be derived from a vector of a neighboring block temporally adjacent to the current block. Here, the neighboring block may mean a block encoded with an affine model. The vector may mean a motion vector or a control point vector.

A method of deriving a spatial/temporal candidate based on a vector of a spatial/temporal neighboring block will be described in detail with reference to FIG. 22.

Meanwhile, the constructed candidate may be derived based on a combination between motion vectors of spatial/temporal neighboring blocks of the current block, which will be described in detail with reference to FIG. 23.

A plurality of affine candidates described above may be arranged in the candidate list based on a predetermined priority. For example, a plurality of affine candidates may be arranged in the candidate list in the order of a spatial candidate, a temporal candidate, and a constructed candidate. Alternatively, a plurality of affine candidates may be arranged in the candidate list in the order of a temporal candidate, a spatial candidate, and a constructed candidate. However, the present invention is not limited thereto, and the temporal candidate may be arranged after the constructed candidate. Alternatively, some of the constructed candidates may be arranged before the spatial candidate, and the rest may be arranged after the spatial candidate.

A control point vector of the current block may be derived based on the candidate list and a candidate index (S2110).

The candidate index may mean an index that is encoded to derive the control point vector of the current block. The candidate index may specify any one of a plurality of affine candidates included in the candidate list. The control point vector of the current block may be derived using the control point vector of the affine candidate specified by the candidate index.

For example, it is assumed that the type of the affine model of the current block is 4-parameter (i.e., it is determined that the current block uses two control point vectors). In this case, when the affine candidate specified by the candidate index has three control point vectors, only two control point vectors (e.g., control point vectors with Idx equal to 0 and 1) are selected among the three control point vectors, these may be set as control point vectors of the current block. Alternatively, the three control point vectors of the specified affine candidates may be set as the control point vectors of the current block. In this case, the type of the affine model of the current block may be updated to 6-parameter.

Conversely, it is assumed that the type of the affine model of the current block is 6-parameter (i.e., it is determined that the current block uses 3 control point vectors). In this case, when the affine candidate specified by the candidate index has two control point vectors, one additional control point vector is generated, and two control point vectors of the affine candidate and the additional control point vector may be set as the control point vectors of the current block. The additional control point vector may be derived based on at least one of two control point vectors of the affine candidate, a size of a current/neighboring block, or position information of a current/neighboring block. Alternatively, the two control point vectors of the specified affine candidate may be set as the control point vectors of the current block. In this case, the type of the affine model of the current block may be updated to 4-parameter.

The motion vector of the current block may be derived based on the control point vectors of the current block (S2120).

The motion vector may be derived in units of sub-blocks of the current block. Here, the N×M sub-block may be a rectangle (N>M or N<M) or a square (N=M). The values of N and M may be 4, 8, 16, 32 or more. The size/shape of the sub-block may be a fixed size/shape pre-defined in the decoding apparatus.

Alternatively, the size/shape of the sub-block may be variably derived based on the attribute of the above-described block. For example, if the size of the current block is greater than or equal to a predetermined threshold size, the current block may be divided into units of a first sub-block (e.g., 8×8, 16×16), otherwise, the current block may be divided into units of a second sub-block (e.g., 4×4). Alternatively, information on the size/shape of the sub-block may be encoded and signaled by an encoding apparatus.

Inter prediction may be performed on the current block using the derived motion vector (S2130).

Specifically, a reference block may be specified using the motion vector of the current block. The reference block may be specified for each sub-block of the current block. The reference block of each sub-block may belong to one reference picture. That is, sub-blocks belonging to the current block may share one reference picture. Alternatively, a reference picture index may be independently set for each sub-block of the current block.

The specified reference block may be set as a prediction block of the current block. The above-described embodiment may be applied in the same/similar manner to not only merge mode but also general inter mode (e.g., AMVP mode). The above-described embodiment may be performed only when the size of the current block is greater than or equal to a predetermined threshold size. Here, the threshold size may be 8×8, 8×16, 16×8, 16×16 or more.

Figure 22:
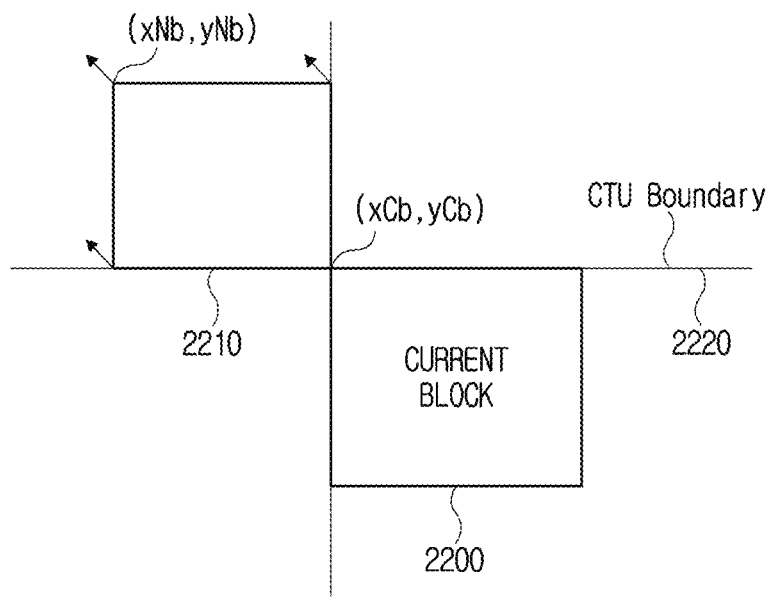
FIG. 22 is an embodiment to which the present invention is applied, and relates to a method of deriving an affine candidate from a spatial/temporal neighboring block.

FIG. 22 is an embodiment to which the present invention is applied, and relates to a method of deriving an affine candidate from a spatial/temporal neighboring block.

For convenience of explanation, in this embodiment, a method of deriving an affine candidate from a spatial neighboring block will be described.

Referring to FIG. 5, the width and height of the current block 2200 are cbW and cbH, respectively, and the position of the current block is (xCb, yCb). The width and height of the spatial neighboring block 2210 are nbW and nbH, respectively, and the position of the spatial neighboring block is (xNb, yNb). FIG. 22 illustrates a top-left block of the current block as a spatial neighboring block, but is not limited thereto. That is, the spatial neighboring block may include at least one of a left block, a bottom-left block, a top-right block, a top block, or a top-left block of the current block.

The spatial candidate may have n control point vectors (cpMV). Here, the value of n may be an integer of 1, 2, 3, or more. The value of n may be determined based on at least one of information on whether to be decoded in units of sub-blocks, information on whether or not a block is encoded with an affine model, or information on a type of the affine model (4-parameter or 6-parameter).

The information may be encoded and signaled from an encoding apparatus.

Alternatively, all or some of the information may be derived, in the decoding apparatus, based on the attribute of the block. Here, the block may mean a current block or a spatial/temporal neighboring block of the current block. The attribute may mean a size, a shape, a position, a division type, an inter mode, a parameter related to a residual coefficient, and the like. The inter mode is a mode predefined in the decoding apparatus and may mean a merge mode, a skip mode, an AMVP mode, an affine model, an intra/inter combination mode, a current picture reference mode, and the like. Alternatively, the value of n may be derived, in the decoding apparatus, based on the above-described attribute of the block.

In this embodiment, n control point vectors may be expressed as a first control point vector (cpMV[0]), a second control point vector (cpMV[1]), a third control point vector (cpMV[2]), . . . a $n^{th}$ control point vector (cpMV[n−1]). For example, a first control point vector (cpMV[0]), a second control point vector (cpMV[1]), a third control point vector (cpMV[2]), and a fourth control point vector (cpMV[3]) may be vectors corresponding to the top-left sample, the top-right sample, the bottom-left sample, and the bottom-right sample, respectively. Here, it is assumed that the spatial candidates have three control point vectors, and the three control point vectors may be arbitrary control point vectors selected from the first to $n^{th}$ control point vectors. However, the present invention is not limited thereto, and the spatial candidate may have two control point vectors, and the two control point vectors may be arbitrary control point vectors selected from the first to $n^{th}$ control point vectors.

Meanwhile, depending on whether the boundary 2220 shown in FIG. 22 is a CTU boundary, a control point vector of a spatial candidate may be derived differently.

1. In Case where the Boundary of the Current Block (2220) is not Located on a CTU Boundary The first control point vector may be derived based on at least one of a first control point vector of a spatial neighboring block, a predetermined difference value, position information (xCb, yCb) of the current block, or position information (xNb, yNb) of the spatial neighboring block.

The number of difference values may be 1, 2, 3 or more. The number of difference values may be variably determined based on the above-described attributes of a block, or may be a fixed value pre-defined in the decoding apparatus. The difference value may be defined as a difference value between one of a plurality of control point vectors and the other. For example, the difference value may include at least one of a first difference value between a second control point vector and a first control point vector, a second difference value between a third control point vector and a first control point vector, a third difference value between a fourth control point vector and a third control point vector, or a fourth difference value between a fourth control point vector and a second control point vector.

For example, the first control point vector may be derived as in Equation 1 below.

$$cpMvLX[0][0] = \\ (mvScaleHor + dHorX * (xCb - xNb) + dHorY * (yCb - yNb)) \quad \text{[Equation 1]}$$
$$cpMvLX[0][1] = (mvScaleVer + dVerX * (xCb - xNb) + dVerY * (yCb - yNb))$$

In Equation 1, the variables mvScaleHor and mvScaleVer may mean a first control point vector of a spatial neighboring block, or a value derived by applying a shift operation by k to the first control point vector. Here, k may be an integer of 1, 2, 3, 4, 5, 6, 7, 8, 9 or more. The variables dHorX and dVerX correspond to the x and y components of the first difference value between the second control point vector and the first control point vector, respectively. The variables dHorY and dVerY correspond to the x and y components of the second difference value between the third control point vector and the first control point vector, respectively. The above-described variable may be derived as in Equation 2 below.

$$mvScaleHor = CpMvLX[xNb][yNb][0][0] << 7 \quad \text{[Equation 2]}$$
$$mvScaleVer = CpMvLX[xNb][yNb][0][1] << 7$$

$$dHorX = \\ (CpMvLX[xNb + nNbW - 1][yNb][1][0] - CpMvLX[xNb][yNb][0][0]) \\ << (7 - \log 2 NbW)$$

$$dVerX = \\ (CpMvLX[xNb + nNbW - 1][yNb][1][1] - CpMvLX[xNb][yNb][0][1]) \\ << (7 - \log 2 NbW)$$

$$dHorY = \\ (CpMvLX[xNb][yNb + nNbH - 1][0][0] - CpMvLX[xNb][yNb][2][0]) \\ << (7 - \log 2 NbH)$$

$$dVerY = \\ (CpMvLX[xNb][yNb + nNbH - 1][2][1] - CpMvLX[xNb][yNb][2][1]) \\ << (7 - \log 2 NbH)$$

The second control point vector may be derived based on at least one of a first control point vector of a spatial neighboring block, a predetermined difference value, position information (xCb, yCb) of the current block, a block size (width or height), or position information of a spatial neighboring block (xNb, yNb). Here, the block size may mean the size of a current block and/or a spatial neighboring block. The difference value is as described in the section related to the first control point vector, and a detailed description thereof will be omitted. However, the range and/or number of difference values used in the process of deriving the second control point vector may be different from the first control point vector.

For example, the second control point vector may be derived as in Equation 3 below.

$$cpMvLX[1][0] = (mvScaleHor + \quad \text{[Equation 3]} \\ dHorX * (xCb + cbWidth - xNb) + dHorY * (yCb - yNb))$$
$$cpMvLX[1][1] = \\ (mvScaleVer + dVerX * (xCb + cbWidth - xNb) + dVerY * (yCb - yNb))$$

In Equation 3, the variables mvScaleHor, mvScaleVer, dHorX, dVerX, dHorY, and dVerY are as described in Equation 1, and detailed descriptions thereof will be omitted.

The third control point vector may be derived based on at least one of a first control point vector of a spatial neighboring block, a predetermined difference value, position information of the current block (xCb, yCb), a block size (width or height), or position information of a spatial neighboring block (xNb, yNb). Here, the block size may mean the size of a current block and/or a spatial neighboring block. The difference value is as described in the section related to the first control point vector, and a detailed description thereof will be omitted. However, the range and/or number of difference values used in the process of deriving the third control point vector may be different from the first control point vector or the second control point vector.

For example, the third control point vector may be derived as in Equation 4 below.

$$cpMvLX[2][0] = (mvScaleHor + \qquad \text{[Equation 4]}$$
$$dHorX * (xCb-xNb) + dHorY * (yCb + cbHeight-yNb))$$
$$cpMvLX[2][1] =$$
$$(mvScaleVer + dVerX * (xCb-xNb) + dVerY * (yCb + cbHeight-yNb))$$

In Equation 4, the variables mvScaleHor, mvScaleVer, dHorX, dVerX, dHorY, and dVerY are as described in Equation 1, and detailed descriptions thereof will be omitted. Meanwhile, through the above-described process, an $n^{th}$ control point vector of a spatial candidate may be derived.

2. In Case where the Boundary of the Current Block (2220) is Located on a CTU Boundary The first control point vector may be derived based on at least one of a motion vector (MV) of a spatial neighboring block, a predetermined difference value, position information (xCb, yCb) of a current block, or position information (xNb, yNb) of a spatial neighboring block.

The motion vector may be a motion vector of a sub-block located at the bottom of the spatial neighboring block. The sub-block may be located at the leftmost, center, or rightmost among a plurality of sub-blocks located at the bottom of the spatial neighboring block. Alternatively, the motion vector may mean an average value, a maximum value, or a minimum value of motion vectors of sub-blocks.

The number of difference values may be 1, 2, 3 or more. The number of difference values may be variably determined based on the above-described attributes of the block, or may be a fixed value pre-defined in the decoding apparatus. The difference value may be defined as a difference value between one of a plurality of motion vectors stored in a unit of a subblock in a spatial neighboring block and the other. For example, the difference value may mean a difference value between a motion vector of a bottom-right sub-block of a spatial neighboring block and a motion vector of a bottom-left sub-block of a spatial neighboring block.

For example, the first control point vector may be derived as in Equation 5 below.

$$cpMvLX[0][0] = \qquad \text{[Equation 5]}$$
$$(mvScaleHor + dHorX * (xCb-xNb) + dHorY * (yCb*-yNb))$$
$$cpMvLX[0][1] =$$
$$(mvScaleVer + dVerX * (xCb-xNb) + dVerY * (yCb*-yNb))$$

In Equation 5, the variables mvScaleHor and mvScaleVer may mean a motion vector (MV) of the spatial neighboring block described above or a value derived by applying a shift operation by k to the motion vector. Here, k may be an integer of 1, 2, 3, 4, 5, 6, 7, 8, 9 or more.

The variables dHorX and dVerX correspond to the x and y components of a predetermined difference value, respectively. Here, the difference value means a difference value between the motion vector of the bottom-right sub-block and the motion vector of the bottom-left sub-block in the spatial neighboring block. The variables dHorY and dVerY may be derived based on the variables dHorX and dVerX. The above-described variable may be derived as in Equation 6 below.

$$mvScaleHor = MvLX[xNb][yNb + nNbH-1][0] << 7 \qquad \text{[Equation 6]}$$
$$mvScaleVer = MvLX[xNb][yNb + nNbH-1][1] << 7$$
$$dHorX = (MvLX[xNb + nNbW - 1][yNb + nNbH - 1][0] -$$
$$MvLX[xNb][yNb + nNhH-1][0]) << (7-\log2NbW)$$
$$dVerX = (MvLX[xNb + nNbW - 1][yNb + nNbH - 1][1] -$$
$$MvLX[xNb][yNb + nNhH-1][1]) << (7-\log2NbW)$$
$$dHorY = dVerX$$
$$dVerY = dHorX$$

The second control point vector may be derived based on at least one of a motion vector (MV) of a spatial neighboring block, a predetermined difference value, position information (xCb, yCb) of a current block, a block size (width or height), or position information of a spatial neighboring block (xNb, yNb). Here, the block size may mean the size of a current block and/or a spatial neighboring block. The motion vector and the difference value are as described in the section related to the first control point vector, and a detailed description thereof will be omitted. However, the position of the motion vector, the range and/or number of the difference values, which are used in the process of deriving the second control point vector, may be different from the first control point vector.

For example, the second control point vector may be derived as in Equation 7 below.

$$cpMvLX[1][0] = (mvScaleHor + \qquad \text{[Equation 7]}$$
$$dHorX * (xCb + cbWidth-xNb) + dHorY * (yCb-yNb))$$
$$cpMvLX[1][1] =$$
$$(mvScaleVer + dVerX * (xCb + cbWidth-xNb) + dVerY * (yCb-yNb))$$

In Equation 7, the variables mvScaleHor, mvScaleVer, dHorX, dVerX, dHorY, and dVerY are as described in Equation 5, and detailed descriptions thereof will be omitted.

The third control point vector is a motion vector (MV) of a spatial neighboring block, a predetermined difference value, location information (xCb, yCb) of a current block, a block size (width or height), or location information of a spatial neighboring block (xNb, yNb).) May be derived based on at least one of. Here, the block size may mean the size of a current block and/or a spatial neighboring block. The motion vector and the difference value are as described in the first control point vector, and a detailed description thereof will be omitted. However, the position of the motion vector, the range and/or the number of the difference values used in the derivation process of the third control point vector may be different from the first control point vector or the second control point vector.

For example, the third control point vector may be derived as in Equation 8 below.

$$cpMvLX[2][0] = (mvScaleHor + \qquad \text{[Equation 8]}$$
$$dHorX * (xCb-xNb) + dHorY * (yCb + cbHeight-yNb))$$

-continued $$cpMvLX[2][1] =$$
$$(mvScaleVer + dVerX*(xCb-xNb) + dVerY*(yCb + cbHeight-yNb))$$

In Equation 8, the variables mvScaleHor, mvScaleVer, dHorX, dVerX, dHorY, and dVerY are as described in Equation 5, and detailed descriptions thereof will be omitted. Meanwhile, through the above-described process, an $n^{th}$ control point vector of a spatial candidate may be derived.

The above-described affine candidate derivation process may be performed for each pre-defined spatial neighboring block. The pre-defined spatial neighboring block may include at least one of a left block, a bottom-left block, a top-right block, a top block, or a top-left block of the current block.

Alternatively, the process of deriving the affine candidate may be performed for each group of the spatial neighboring blocks. Here, the spatial neighboring blocks may be classified into a first group including a left block and a bottom-left block and a second group including a top-right block, a top block, and a top-left block.

For example, one affine candidate may be derived from spatial neighboring blocks belonging to the first group. The derivation may be performed, based on a predetermined priority, until an available affine candidate is found. The priority may be in the order of left block→bottom-left block, or the reverse order.

Similarly, one affine candidate may be derived from spatial neighboring blocks belonging to the second group. The derivation may be performed, based on a predetermined priority, until an available affine candidate is found. The priority may be in the order of top-right block→top block→top-left block, or the reverse order.

The above-described embodiment may be applied in the same/similar manner to the temporal neighboring block. Here, the temporal neighboring block belongs to a picture different from the current block, but may be a block at the same position as the current block. The block at the same location may be a block including a position of a top-left sample of the current block, a center position, or a position of a sample adjacent to the bottom-right sample of the current block.

Alternatively, the temporal neighboring block may mean a block at a position shifted by a predetermined disparity vector from the block at the same position. Here, the disparity vector may be determined based on a motion vector of any one of the above-described spatial neighboring blocks of the current block.

Figure 23:
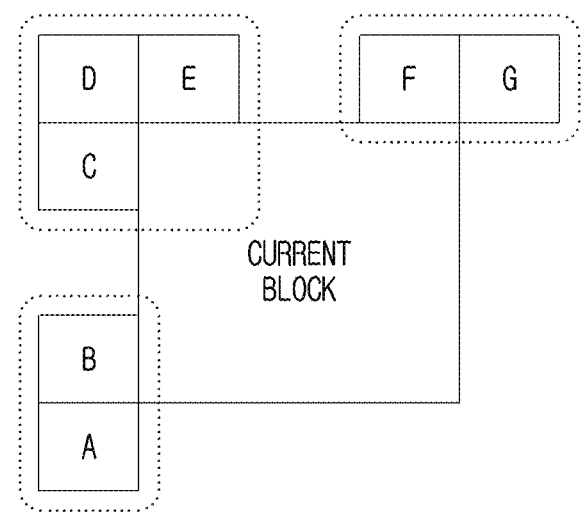
FIG. 23 illustrates a method of deriving a constructed candidate based on a combination of motion vectors of spatial/temporal neighboring blocks in an embodiment to which the present invention is applied.

FIG. 23 illustrates a method of deriving a constructed candidate based on a combination of motion vectors of spatial/temporal neighboring blocks in an embodiment to which the present invention is applied.

The constructed candidate of the present invention may be derived based on a combination of at least two of control point vectors corresponding to corners of the current block (hereinafter referred to as control point vectors (cpMVCorner[n])). Here, n may be 0, 1, 2, or 3.

The control point vector may be derived based on a motion vector of a spatial and/or temporal neighboring block. Here, the spatial neighboring block may include at least one of the first neighboring block (C, D or E) adjacent to the top-left sample of the current block, the second neighboring block (F or G) adjacent to the top-right sample of the current block, or the third neighboring block (A or B) adjacent to the bottom-left sample of the current block. The temporal neighboring block may be a block belonging to a picture different from the current block, and may mean a fourth neighboring block (Col) adjacent to the bottom-right sample of the current block.

The first neighboring block may mean a neighboring block at the top-left (D), top (E), or left (C) of the current block. It may be determined whether motion vectors of neighboring blocks C, D, and E are available according to a predetermined priority, and the control point vector may be determined using an available motion vector of the neighboring block. The availability determination may be performed until a neighboring block having an available motion vector is found. Here, the priority may be in the order of D→E→C. However, it is not limited thereto, and may be in the order of D→C→E, C→D→E, or E→D→C.

The second neighboring block may mean a neighboring block at the top (F) or the top-right (G) of the current block. Similarly, it may be determined whether motion vectors of neighboring blocks F and G are available according to a predetermined priority, and the control point vector may be determined using an available motion vectors of the neighboring block. The availability determination may be performed until a neighboring block having an available motion vector is found. Here, the priority may be in the order of F→G, or in the order of G→F.

The third neighboring block may mean a neighboring block on the left (B) or the bottom-left (A) of the current block. Similarly, it may be determined whether motion vectors of neighboring blocks are available according to a predetermined priority, and the control point vector may be determined using an available motion vector of the neighboring block. The availability determination may be performed until a neighboring block having an available motion vector is found. Here, the priority may be in the order of A→B, or in the order of B→A.

For example, a first control point vector (cpMVCorner[0]) may be set as a motion vector of a first neighboring block, and a second control point vector (cpMVCorner[1]) may be set as a motion vector of second neighboring block. In addition, the third control point vector cpMVCorner[2] may be set as a motion vector of the third neighboring block. The fourth control point vector cpMVCorner[3] may be set as a motion vector of the fourth neighboring block.

Alternatively, any one of the first to fourth control point vectors may be derived based on the other. For example, the second control point vector may be derived by applying a predetermined offset vector to the first control point vector. The offset vector may be a difference vector between the third control point vector and the first control point vector, or may be derived by applying a predetermined scaling factor to the difference vector. The scaling factor may be determined based on at least one of the width or height of the current block and/or the neighboring block.

Through a combination of at least two of the first to fourth control point vectors described above, K constructed candidates (ConstK) according to the present invention may be determined. The K value may be an integer of 1, 2, 3, 4, 5, 6, 7 or more. The K value may be derived based on information signaled by the encoding apparatus or may be a value pre-defined in the decoding apparatus. The information may include information indicating the maximum number of constructed candidates included in the candidate list.

Specifically, the first constructed candidate (Const1) may be derived by combining the first to third control point vectors. For example, the first constructed candidate (Const1) may have control point vectors as shown in Table 1 below. Meanwhile, only when reference picture information of the first neighboring block is the same as reference picture information of the second and third neighboring blocks, the control point vectors may be constructed as shown in Table 1. Here, the reference picture information may mean a reference picture index indicating a position of a reference picture in a reference picture list, or a picture order count (POC) value indicating an output order.

TABLE 1

| Idx | Control point vector |
|-----|----------------------|
| 0   | cpMvCorner[0]        |
| 1   | cpMvCorner[1]        |
| 2   | cpMvCorner[2]        |

The second constructed candidate (Const2) may be derived by combining the first, second, and fourth control point vectors. For example, the second constructed candidate (Const2) may have control point vectors as shown in Table 2 below. Meanwhile, only when the reference picture information of the first neighboring block is the same as the reference picture information of the second and fourth neighboring blocks, the control point vectors may be constructed as shown in Table 2. Here, the reference picture information is as described above.

TABLE 2

| Idx | Control point vector |
|-----|----------------------|
| 0   | cpMvCorner[0]        |
| 1   | cpMvCorner[1]        |
| 2   | cpMvCorner[3] + cpMvCorner[1] − cpMvCorner[0] |

The third constructed candidate (Const3) may be derived by combining the first, third and fourth control point vectors. For example, the third constructed candidate (Const3) may have control point vectors as shown in Table 3 below. Meanwhile, only when the reference picture information of the first neighboring block is the same as the reference picture information of the third and fourth neighboring blocks, the control point vectors may be constructed as shown in Table 2. Here, the reference picture information is as described above.

TABLE 3

| Idx | Control point vector |
|-----|----------------------|
| 0   | cpMvCorner[0]        |
| 1   | cpMvCorner[3] + cpMvCorner[0] − cpMvCorner[2] |
| 2   | cpMvCorner[2]        |

The fourth constructed candidate (Const4) may be derived by combining the second, third, and fourth control point vectors. For example, the fourth constructed candidate (Const4) may have control point vectors as shown in Table 4 below. Meanwhile, only when the reference picture information of the second neighboring block is the same as the reference picture information of the third and fourth neighboring blocks, the control point vectors may be constructed as shown in Table 4. Here, the reference picture information is as described above.

TABLE 4

| Idx | Control point vector |
|-----|----------------------|
| 0   | cpMvCorner[1] + cpMvCorner[2] − cpMvCorner[3] |
| 1   | cpMvCorner[1]        |
| 2   | cpMvCorner[2]        |

The fifth constructed candidate (Const5) may be derived by combining the first and second control point vectors. For example, the fifth constructed candidate (Const5) may have control point vectors as shown in Table 5 below. Meanwhile, only when the reference picture information of the first neighboring block is the same as the reference picture information of the second neighboring block, the control point vector may be constructed as shown in Table 5. Here, the reference picture information is as described above.

TABLE 5

| Idx | Control point vector |
|-----|----------------------|
| 1   | cpMvCorner[0]        |
| 2   | cpMvCorner[1]        |

The sixth constructed candidate (Const6) may be derived by combining the first and third control point vectors. For example, the sixth constructed candidate (Const6) may have control point vectors as shown in Table 6 below. Meanwhile, only when the reference picture information of the first neighboring block is the same as the reference picture information of the third neighboring block, the control point vector may be constructed as shown in Table 6. Here, the reference picture information is as described above.

TABLE 6

| Idx | Control point vector |
|-----|----------------------|
| 1   | cpMvCorner[0]        |
| 2   | cpMvCorner[1]        |

In Table 6, cpMvCorner[1] may be a second control point vector derived based on the first and third control point vectors. The second control point vector may be derived based on at least one of the first control point vector, a predetermined difference value, or the size of the current/neighboring block. For example, the second control point vector may be derived as in Equation 9 below.

$$cpMvCorner[1][0] = (cpMvCorner[0][0] << 7) + \\ ((cpMvCorner[2][1] - cpMvCorner[0][1]) \\ << (7 + \text{Log2}(cbHeight/cbWidth)))$$

$$cpMvCorner[1][1] = (cpMvCorner[0][1] << 7) + \\ ((cpMvCorner[2][0] - cpMvCorner[0][0]) << (7 + \text{Log2}(cbHeight/cbWidth)))$$

[Equation 9]

All of the above-described first to sixth constructed candidates may be included in the candidate list, or only some of them may be included in the candidate list.

The methods according to the present invention may be implemented in the form of program instructions that can be executed through various computer means and recorded in a computer readable medium. Computer readable medium may include program instructions, data files, data structures, or the like alone or in combination. The program instructions recorded on the computer-readable medium may be specially designed and configured for the present invention or may be known and usable by those skilled in computer software.

Examples of computer readable medium may include hardware devices specifically configured to store and execute program instructions, such as ROM, RAM, flash memory, and the like. Examples of program instructions may include machine language codes such as those produced by a compiler, as well as high-level language codes that can be executed by a computer using an interpreter and the like. The above-described hardware device may be configured to operate with at least one software module to perform the operation of the present invention, and vice versa.

In addition, the above-described method or apparatus may be implemented by combining all or part of its configuration or function, or may be implemented separately.

Although described above with reference to preferred embodiments of the present invention, those skilled in the art will appreciate that various modifications and changes can be made to the present invention without departing from the spirit and scope of the invention as set forth in the claims below.

INDUSTRIAL APPLICABILITY

The present invention can be used in an image encoding/decoding method and apparatus.

The invention claimed is:

1. A method of decoding an image, comprising:
determining whether a color copy mode is supported for a current chroma block of a first color space in the image, wherein the color copy mode is a mode of predicting the current chroma block of the first color space by using a luma block of a second color space reconstructed before the current chroma block;
down-sampling the luma block corresponding to the current chroma block in response to the determination that the color copy mode is supported for the current chroma block;
deriving correlation information for the color copy mode based on a pre-determined reference region, wherein the correlation information represents a correlation between the current chroma block and the luma block, and the correlation information is expressed by a weight parameter and an offset parameter to be applied to the down-sampled luma block;
predicting the current chroma block by applying the correlation information to the down-sampled luma block for generating a prediction block of the current chroma block; and
reconstructing the current chroma block based on the prediction block,
wherein the reference region includes at least one of a neighboring region of the current chroma block or a neighboring region of the luma block,
wherein a number of reference pixel lines belonging to the reference region used for deriving the correlation information is adaptively determined based on a determination of whether the current chroma block is located on a boundary of a maximum coding block,
wherein the down-sampling of the luma block is performed using a first pixel of the luma block corresponding to a current pixel of the current chroma block and a plurality of neighboring pixels adjacent to the first pixel, positions of the plurality of neighboring pixels being determined based on a chroma format of the image, and
wherein the neighboring pixels include at least one of a right neighboring pixel, a bottom neighboring pixel or a bottom-right neighboring pixel.

2. The method of claim 1, the method further comprising:
obtaining, from a bitstream, first information indicating whether the color copy mode is supported,
wherein whether the color copy mode is supported for the current chroma block is determined based on the first information.

3. The method of claim 1, wherein the correlation information is derived using only some of pixels in the reference region.

4. The method of claim 1, wherein a number of the correlation information to be applied to the down-sampled luma block is greater than or equal to 3.

5. A method of encoding an image, comprising:
determining whether a color copy mode is supported for a current chroma block of a first color space in the image, wherein the color copy mode is a mode of predicting the current chroma block of the first color space by using a luma block of a second color space reconstructed before the current chroma block;
down-sampling the luma block corresponding to the current chroma block in response to the determination that the color copy mode is supported for the current chroma block;
determining correlation information for the color copy mode based on a pre-determined reference region, wherein the correlation information represents a correlation between the current chroma block and the luma block, and the correlation information is expressed by a weight parameter and an offset parameter to be applied to the down-sampled luma block;
predicting the current chroma block by applying the correlation information to the down-sampled luma block for generating a prediction block of the current chroma block; and
encoding the current chroma block based on the prediction block,
wherein the reference region includes at least one of a neighboring region of the current chroma block or a neighboring region of the luma block,
wherein a number of reference pixel lines belonging to the reference region used for deriving the correlation information is adaptively determined based on a determination of whether the current chroma block is located on a boundary of a maximum coding block,
wherein the down-sampling of the luma block is performed using a first pixel of the luma block corresponding to a current pixel of the current chroma block and a plurality of neighboring pixels adjacent to the first pixel, positions of the plurality of neighboring pixels being determined based on a chroma format of the image, and
wherein the neighboring pixels include at least one of a right neighboring pixel, a bottom neighboring pixel or a bottom-right neighboring pixel.

6. A non-transitory computer readable medium having stored thereon instructions that when executed by a processor perform a method, comprising:
determining whether a color copy mode is supported for a current chroma block of a first color space in an image, wherein the color copy mode is a mode of predicting the current chroma block of the first color space by using a luma block of a second color space reconstructed before the current chroma block;

down-sampling the luma block corresponding to the current chroma block in response to the determination that the color copy mode is supported for the current chroma block;

deriving correlation information for the color copy mode based on a pre-determined reference region, wherein the correlation information represents a correlation between the current chroma block and the luma block, and the correlation information is expressed by a weight parameter and an offset parameter to be applied to the down-sampled luma block;

predicting the current chroma block by applying the correlation information to the down-sampled luma block for generating a prediction block of the current chroma block; and encoding the current chroma block based on the prediction block, wherein the reference region includes at least one of a neighboring region of the current chroma block or a neighboring region of the luma block, wherein a number of reference pixel lines belonging to the reference region used for deriving the correlation information is adaptively determined based on a determination of whether the current chroma block is located on a boundary of a maximum coding block, wherein the down-sampling of the luma block is performed using a first pixel of the luma block corresponding to a current pixel of the current chroma block and a plurality of neighboring pixels adjacent to the first pixel, positions of the plurality of neighboring pixels being determined based on a chroma format of the image, and wherein the neighboring pixels include at least one of a right neighboring pixel, a bottom neighboring pixel or a bottom-right neighboring pixel.

7. A non-transitory computer readable medium storing a bitstream generated by a method of encoding an image, the method comprising:

determining whether a color copy mode is supported for a current chroma block of a first color space in the image, wherein the color copy mode is a mode of predicting the current chroma block of the first color space by using a luma block of a second color space reconstructed before the current chroma block;

down-sampling the luma block corresponding to the current chroma block in response to the determination that the color copy mode is supported for the current chroma block;

determining correlation information for the color copy mode based on a pre-determined reference region, wherein the correlation information represents a correlation between the current chroma block and the luma block, and the correlation information is expressed by a weight parameter and an offset parameter to be applied to the down-sampled luma block;

predicting the current chroma block by applying the correlation information to the down-sampled luma block for generating a prediction block of the current chroma block; and encoding the current chroma block based on the prediction block, wherein the reference region includes at least one of a neighboring region of the current chroma block or a neighboring region of the luma block, wherein a number of reference pixel lines belonging to the reference region used for deriving the correlation information is adaptively determined based on a determination of whether the current chroma block is located on a boundary of a maximum coding block, wherein the down-sampling of the luma block is performed using a first pixel of the luma block corresponding to a current pixel of the current chroma block and a plurality of neighboring pixels adjacent to the first pixel, positions of the plurality of neighboring pixels being determined based on a chroma format of the image, and wherein the neighboring pixels include at least one of a right neighboring pixel, a bottom neighboring pixel or a bottom-right neighboring pixel.

8. A method of transmitting a bitstream generated by an image encoding method, the image encoding method comprising:

determining whether a color copy mode is supported for a current chroma block of a first color space in the image, wherein the color copy mode is a mode of predicting the current chroma block of the first color space by using a luma block of a second color space reconstructed before the current chroma block;

down-sampling the luma block corresponding to the current chroma block in response to the determination that the color copy mode is supported for the current chroma block;

determining correlation information for the color copy mode based on a pre-determined reference region, wherein the correlation information represents a correlation between the current chroma block and the luma block, and the correlation information is expressed by a weight parameter and an offset parameter to be applied to the down-sampled luma block;

predicting the current chroma block by applying the correlation information to the down-sampled luma block for generating a prediction block of the current chroma block; and encoding the current chroma block based on the prediction block, wherein the reference region includes at least one of a neighboring region of the current chroma block or a neighboring region of the luma block, wherein a number of reference pixel lines belonging to the reference region used for deriving the correlation information is adaptively determined based on a determination of whether the current chroma block is located on a boundary of a maximum coding block, wherein the down-sampling of the luma block is performed using a first pixel of the luma block corresponding to a current pixel of the current chroma block and a plurality of neighboring pixels adjacent to the first pixel, positions of the plurality of neighboring pixels being determined based on a chroma format of the image, and wherein the neighboring pixels include at least one of a right neighboring pixel, a bottom neighboring pixel or a bottom-right neighboring pixel.

* * * * *